US010990959B2

(12) United States Patent
Lee et al.

(10) Patent No.: US 10,990,959 B2
(45) Date of Patent: *Apr. 27, 2021

(54) ELECTRONIC DEVICE AND TRANSACTION METHOD USING THE SAME

(71) Applicant: Samsung Electronics Co., Ltd., Suwon-si (KR)

(72) Inventors: Woo-Sup Lee, Suwon-si (KR); Hyun-Ju Hong, Osan-si (KR); Youn-Ju Kim, Suwon-si (KR); Jae-Bong Chun, Suwon-si (KR); Jung-Sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,629

(22) Filed: Feb. 4, 2020

(65) Prior Publication Data

US 2020/0175498 A1 Jun. 4, 2020

Related U.S. Application Data

(63) Continuation of application No. 16/391,097, filed on Apr. 22, 2019, which is a continuation of application (Continued)

(30) Foreign Application Priority Data

Jul. 14, 2015 (KR) ........................ 10-2015-0100129

(51) Int. Cl.
*G06Q 20/32* (2012.01)
*G06K 19/077* (2006.01)
(Continued)

(52) U.S. Cl.
CPC ... *G06Q 20/3278* (2013.01); *G06K 19/07779* (2013.01); *G06Q 20/3274* (2013.01);
(Continued)

(58) Field of Classification Search
CPC .. G06Q 20/3278; H02J 50/005; H02J 7/0042; H02J 50/80; G06K 19/07779; H01Q 7/00
(Continued)

(56) References Cited

U.S. PATENT DOCUMENTS 4,825,056 A 4/1989 Ohta et al.
8,651,386 B2 2/2014 Hepner et al.
(Continued)

FOREIGN PATENT DOCUMENTS

CN 102013557 A 4/2011
CN 102122753 A 7/2011
(Continued)

OTHER PUBLICATIONS

European Office Action dated Nov. 25, 2019, issued in European Application No. 16152313.9-1201.
(Continued)

*Primary Examiner* — Ayodeji O Ayotunde
(74) *Attorney, Agent, or Firm* — Jefferson IP Law, LLP

(57) ABSTRACT

According to various embodiments of the present disclosure, an electronic device may include a housing, a conductive pattern that is arranged within the housing and is formed to generate a magnetic field, a plate that forms at least a part of a first surface of the housing and includes a material that at least partially transmits the magnetic field generated by the conductive pattern, and a communication circuit that is configured to transmit at least one transaction information to an external device by using the conductive pattern. The conductive pattern may include a first end that is electrically connected to the communication circuit, a second end that is (Continued)

electrically connected to the communication circuit, and a coil that is connected between the first end and the second end and includes a plurality of turns that are substantially parallel to a surface of the plate.

20 Claims, 46 Drawing Sheets

Related U.S. Application Data

No. 15/003,563, filed on Jan. 21, 2016, now Pat. No. 10,269,005.

(60) Provisional application No. 62/106,053, filed on Jan. 21, 2015.

(51) Int. Cl.
| | | |
|---|---|---|
| *H01Q 7/00* | (2006.01) | |
| *H02J 50/10* | (2016.01) | |
| *H01Q 1/22* | (2006.01) | |
| *H01Q 1/24* | (2006.01) | |
| *H02J 7/00* | (2006.01) | |
| *H02J 50/80* | (2016.01) | |
| *H02J 50/00* | (2016.01) | |
| *G06K 19/07* | (2006.01) | |

(52) U.S. Cl.
CPC .......... *H01Q 1/2266* (2013.01); *H01Q 1/243* (2013.01); *H01Q 7/00* (2013.01); *H02J 7/0042* (2013.01); *H02J 50/005* (2020.01); *H02J 50/10* (2016.02); *H02J 50/80* (2016.02); *G06K 19/0708* (2013.01)

(58) Field of Classification Search
USPC .......................................... 455/41.1; 705/16
See application file for complete search history.

(56) References Cited

U.S. PATENT DOCUMENTS

| | | |
|---|---|---|
| 8,814,046 B1 | 8/2014 | Wallner |
| 9,105,627 B2 | 8/2015 | Shapiro et al. |
| 9,325,379 B2 | 4/2016 | Luo et al. |
| 10,269,005 B2 | 4/2019 | Lee et al. |
| 2002/0013526 A1 | 1/2002 | Su et al. |
| 2006/0163353 A1 | 7/2006 | Moulette et al. |
| 2008/0126259 A1 | 5/2008 | Lowman et al. |
| 2010/0265037 A1 | 10/2010 | Domsten et al. |
| 2010/0325052 A1 | 12/2010 | Sahota et al. |
| 2011/0108626 A1 | 5/2011 | Hepner et al. |
| 2011/0263292 A1 | 10/2011 | Phillips |
| 2012/0235866 A1 | 9/2012 | Kim et al. |
| 2014/0269946 A1 | 9/2014 | Wallner |
| 2014/0375262 A1 | 12/2014 | Yamaguchi et al. |

FOREIGN PATENT DOCUMENTS

| | | |
|---|---|---|
| CN | 102411806 A | 4/2012 |
| CN | 102684726 A | 9/2012 |
| CN | 103915681 A | 7/2014 |
| KR | 10-2006-0008332 A | 1/2006 |

OTHER PUBLICATIONS

Chinese Office Action dated Jan. 17, 2020, issued in Chinese Application No. 201610040855.6.
International Search Report dated Apr. 28, 2016 in connection with International Application No. PCT/KR2016/000675, 3 pages.
Written Opinion of the International Searching Authority dated Apr. 28, 2016 in connection with International Application No. PCT/KR2016/000675, 9 pages.
European Patent Office, "Partial European Search Report," Application No. 16152313.9-1811, dated Oct. 7, 2016, 10 pages, publisher EPO, Munich, Germany, for more details about this annex : see Official Journal of the European Patent Office, No. 12/82.
Office Action dated Jul. 4, 2018 in connection with Chinese Patent Application No. 201711133610.9.
Padilla, L.; "Track Format of Magnetic Stripe Cards"; retrieved from http://www.gae.ucm.es/~padilla/extrawork/tracks.html; Jan. 20, 2016; 12 pages.

(a)

(b)

(a)

(b)

ically, user authentication information or the like has been equipped in electronic devices (e.g., portable terminals) to be used for on/off-line transaction. For example, when an electronic device is equipped with credit card information or the like, it is possible to use the electronic device as a credit card even if a separate credit card is not carried. In the case where the electronic device is equipped with a credit card function, transaction may be made by a Near Field Communication (NFC) scheme or a scheme that outputs bar codes or the like on a screen and reading the same.

SUMMARY

The embodiments of the present disclosure allow that a POS terminal that supports magnetic stripes can read a credit card that is equipped in an NFC type electronic device or a type of electronic device that outputs bar codes on a screen.

Various embodiments of the present disclosure may provide an electronic device that is equipped with a credit card transaction function that is compatible with various reading methods of POS terminals, and a transaction method using the same.
ELECTRONIC DEVICE AND TRANSACTION METHOD USING THE SAME

CROSS-REFERENCE TO RELATED APPLICATIONS

This application is a continuation application of prior application Ser. No. 16/391,097, filed on Apr. 22, 2019; which is a continuation of application Ser. No. 15/003,563, filed on Jan. 21, 2016, which issued as U.S. Pat. No. 10,269,005 on Apr. 23, 2019, and was based on and claimed priority under 35 U.S.C. § 119(e) of a U.S. Provisional application No. 62/106,053, filed on Jan. 21, 2015, in the U.S. Patent and Trademark Office, and under 35 U.S.C. § 119(a) of a Korean patent application number 10-2015-0100129, filed on Jul. 14, 2015, in the Korean Intellectual Property Office, the disclosure of which is incorporated by reference herein in its entirety.

BACKGROUND

1. Field

Various embodiments of the present disclosure relate to an electronic device, and in particular, although not exclusively, to an electronic device that is equipped with a credit card transaction function, and a transaction method using the same.

2. Description of Related Art

In an on/off-line commercial transaction, traditional transaction methods include cash transaction, credit card transaction, transfer, etc. In an on-line electronic commercial transaction, a credit card transaction method through transfer or user authentication may be used. In an off-line commercial transaction, the credit card transaction is a method of making a transaction by reading a contact or contactless card through a point-of-sale (POS) terminal (POS reader). Credit cards include a magnetic stripe card, an Integrated Circuit (IC), or the like, and are gradually being shifted to the IC card, which has excellent security, or the like.

Various embodiments of the present disclosure may provide an electronic device that allows credit card information or the like to be recognized even through a magnetic reading type POS terminal, and a transaction method using the same.

According to various embodiments of the present disclosure, an electronic device may include: a housing; a conductive pattern that is arranged within the housing and is formed to generate a magnetic field; a plate that forms at least a part of a first surface of the housing and includes a material that at least partially transmits the magnetic field generated by the conductive pattern; and a communication circuit that is configured to transmit at least one transaction information to an external device by using the conductive pattern. The conductive pattern may include a first end that is electrically connected to the communication circuit, a second end that is electrically connected to the communication circuit, and a coil that is connected between the first end and the second end and includes a plurality of turns that are substantially parallel to a surface of the plate. When viewed from the upper side of the plate, the coil may include a first section that includes portions of conductive lines that extend substantially parallel to each other, and a second section that includes other portions of the conductive lines at a position that is different from that of the first section. The first section may have a structure that radiates a greater amount of magnetic fluxes than the second section.

According to various embodiments of the present disclosure, an electronic device may include: a housing, a conductive pattern that is arranged within the housing and includes a plurality of coils; a plate that forms at least a part of a first surface of the housing and includes a material that at least partially transmits a magnetic field or an electric field generated by the conductive pattern, and at least one control circuit that is electrically connected to the conductive pattern. The control circuit may be configured to transmit at least one transaction information outwardly by generating the magnetic field by using at least one of the plurality of coils; transmit at least one transaction information by using near field communication (NFC) by using at least one of the plurality of coils, and receive power wirelessly from outside by using at least one of the plurality of coils.

According to various embodiments of the present disclosure, an electronic device may include a magnetic secure transfer (MST) module, and at least one coil connected to the MST module. The at least one coil may form a first current loop that has a first shape and a first size and a second current loop that has a second shape and a second size.

According to various embodiments of the present disclosure, the electronic device may allow a plurality of coils to be mounted in a flat form or a form that conforms the external appearance of the electronic device, and may transmit transaction information or the like as a signal (e.g., magnetic fluxes) that can be easily recognized by a contact POS terminal (e.g., a magnetic reading type POS terminal).

For example, the electronic device as described above may convert transaction information into various patterns of signals by using at least one of the plurality of coils, and may sequentially or alternately transmit the various patterns of signals so that an external device, such as a POS terminal, can easily recognize the transaction information stored in the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
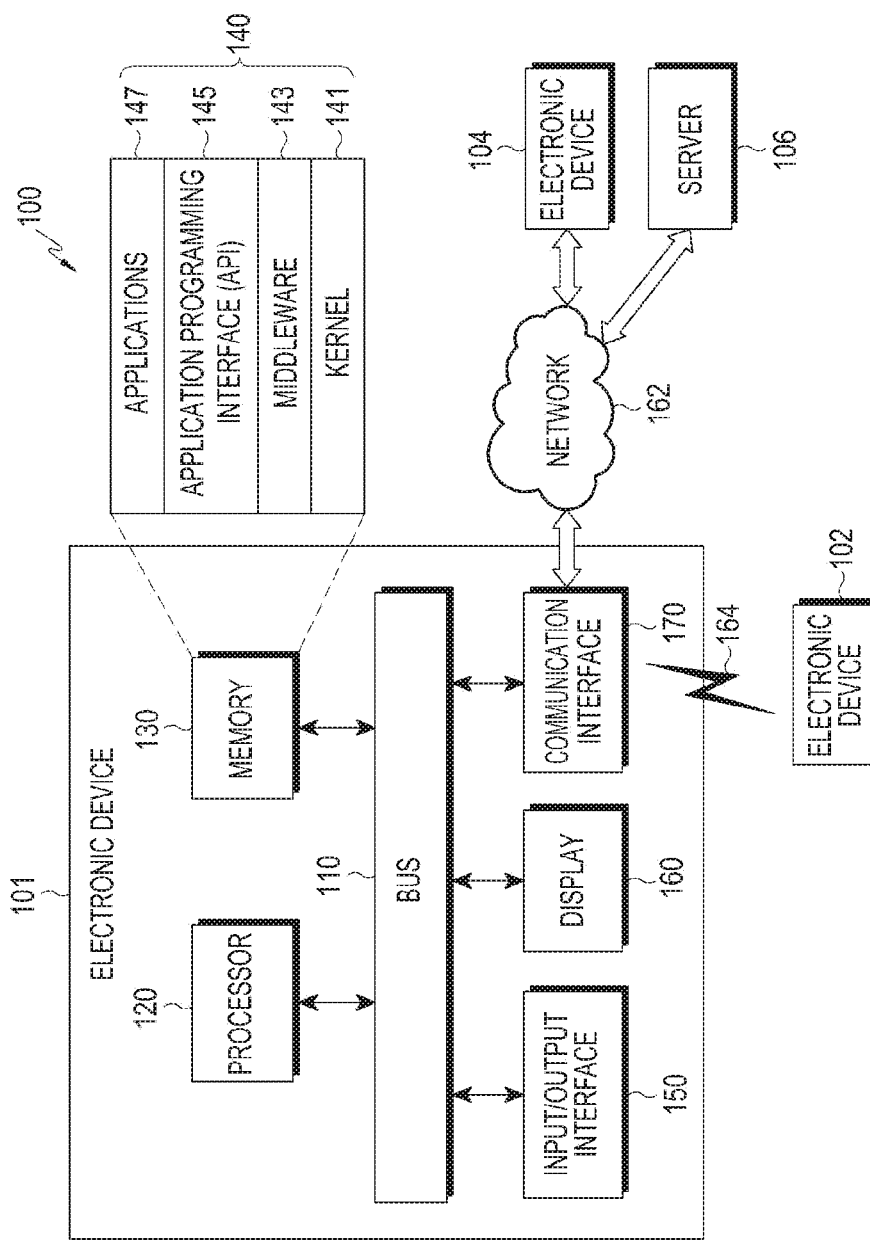
FIG. 1 is a view illustrating a use environment of a plurality of electronic devices according to various embodiments of the present disclosure.

FIGS. 1 through 43D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, various embodiments of the present disclosure will be described with reference to the accompanying drawings.

However, it should be understood that there is no intent to limit various embodiments of the present disclosure to particular forms, and the present disclosure should be construed to cover all modifications, equivalents, and/or alternatives falling within the spirit and scope of various embodiments of the present disclosure. In describing the drawings, similar reference numerals may be used to designate similar constituent elements.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (e.g., second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, even the term defined in the present disclosure should not be interpreted to exclude embodiments of the present disclosure.

In the present disclosure, an electronic device can be a random device, and the electronic device can be called a terminal, a portable terminal, a mobile terminal, a communication terminal, a portable communication terminal, a portable mobile terminal, a display device or the like.

For example, the electronic device can be a smart phone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device can be implemented as a portable communication terminal which has a wireless communication function and a pocket size. Further, the electronic device can be a flexible device or a flexible display device.

The electronic device can communicate with an external electronic device, such as a server or the like, or perform an operation through an interworking with the external electronic device. For example, the electronic device can transmit an image photographed by a camera and/or position information detected by a sensor unit to the server through a network. The network can be a mobile or cellular communication network, a Local Area Network (LAN), a Wireless Local Area Network (WLAN), a Wide Area Network (WAN), an Internet, a Small Area Network (SAN) or the like, but is not limited thereto.

Hereinafter, an electronic device according to various embodiments will be described with reference to the accompanying drawings. As used herein, the term "user" can indicate a person who uses an electronic device or a device (e.g., an artificial intelligence electronic device) that uses an electronic device.

Referring to FIG. 1, descriptions will be made on an electronic device 101 within a network environment 100 in various embodiments. The electronic device 101 can include a bus 110, a processor 120, a memory 130, an input/output interface 150, a display 160, and a communication interface 170. In a certain embodiment, the electronic device 101 can omit at least one of the components or can be additionally provided with another component.

The bus 110 can include, for example, a circuit that connects the above-discussed elements 110 to 170 and transmits communication (e.g., a control message and/or data) between the components.

The processor 120 can include one or more of a Central Processing Unit (CPU), an Application Processor (AP), and a Communication Processor (CP). The processor 120 can execute, for example, an arithmetic operation or data processing related to a control and/or communication of one or more other components of the electronic device 101.

The memory 130 can include a volatile memory and/or a non-volatile memory. The memory 130 can store therein, for example, commands or data related to one or more components of the electronic device 101. According to one embodiment, the memory 130 can store therein software and/or a program 140. The program 140 can include, for example, a kernel 141, a middleware 143, an Application Programming Interface (API) 145, and/or an application program ("application") 147. At least some of the kernel 141, the middleware 143, and the API 145 can be referred to as an Operating System (OS).

The kernel 141 can control or manage, for example, system resources (e.g., the bus 110, the processor 120, or the memory 130) that are used for executing operations or functions implemented by the other programs (e.g., the middleware 143, the API 145, or the application program 147). In addition, the kernel 141 can provide an interface that allows the middleware 143, the API 145, or the application programs 147 to access individual components of the electronic device 101 so as to control or manage the system resources.

The middleware 143 can play an intermediary role such that the API 145 or the application program 147 can communicate with the kernel 141 so as to exchange data.

In addition, the middleware 143 can process, according to priority, one or more task requests received from the application programs 147. For example, the middleware 143 can assign a priority that is capable of using the system resources of the electronic device 101 (e.g., the bus 110, the processor 120, or the memory 130), to at least one of the application programs 147. For example, the middleware 143 can perform scheduling or load balancing for the one or more requested task requests by processing the one or more task requests according to the priority assigned to at least one of the application programs 147.

The API 145 is, for example, an interface to allow the application programs 147 to control functions provided by the kernel 141 or the middleware 143 and can include, for example, at least one interface or function (e.g., commands) for a file control, a window control, an image processing, or a character control.

The input/output interface 150 can serve as an interface that is capable of delivering commands or data that are input from, for example, a user or an external electronic device to the other component(s) of the electronic device 101. Also, the input/output interface 150 can output commands or data received from the other component(s) of the electronic device 101 to the user or the external electronic device.

The display 160 can include, for example, a Liquid Crystal Display (LCD), a Light Emitting Diode (LED) display, an Organic Light Emitting Diode (OLED) display, a Micro Electro Mechanical systems (MEMS) display, or an electronic paper display. The display 160 displays various contents (e.g., text, image, video, icon, or symbol) to, for example, the user. The display 160 can include a touch screen, and can receive a touch input, a gesture input, a proximity input or a hovering input that is made using, for example, an electronic pen or a part of the user's body.

The communication interface 170 can set, for example, communication between the electronic device 101 and an external electronic device (e.g., a first external electronic device 102, a second external electronic device 104, or a server 106). For example, the communication interface 170 can communicate with the external electronic device (e.g., the second external electronic device 104 or the server 106) by being connected with a network 162 through wired or wireless communication.

The wireless communication can use at least one of, for example, Long-Term Evolution (LTE), (LTE Advance) LTE-A, Code Division Multiple Access (CDMA), Wideband CDMA (WCDMA), Universal Mobile Telecommunication System (UMTS), Wireless Broadband (WiBro), and Global System for Mobile communication (GSM), as a cellular communication protocol. In addition, the wireless communication can include, for example, a short range communication 164. The short range communication 164 can include at least one of, for example, Wireless Fidelity (WiFi), Bluetooth, Near Field communication (NFC), and Global Navigation Satellite System (GNSS). According to, for example, a use area or a bandwidth, the GNSS can include at least one of, for example, Global Positioning System (GPS), Global navigation satellite system (Glonass), Beidou navigation satellite system (hereinafter, referred to as "Beidou"), Galileo, and the European global satellite-based navigation system. Hereinafter, in the specification, "GPS" can be interchangeably used with "GNSS". The wired communication can use at least one of, for example, Universal Serial Bus (USB), high definition multimedia interface (HDMI), Recommended Standard 232 (RS-232), and Plain Old Telephone Service (POTS). The network 162 can include a telecommunication network, (e.g., at least one of a computer network (e.g., LAN or WAN), internet, and a telephone network).

Each of the first and second external electronic devices 102 and 104 can be a type of device that is the same as or different from the electronic device 101. According to one embodiment, the server 106 can include one or more groups of servers. According to various embodiments, all or some of the operations executed by the electronic device 101 can be executed by another electronic device or a plurality of other electronic devices (e.g., electronic devices 102 and 104 or the server 106). According to one embodiment, in a case where the electronic device 101 should perform a certain function or service automatically or by a request, the electronic device 101 can request some functions associated therewith from the other electronic devices (e.g., the electronic devices 102 and 104 or the server 106) instead of or in addition to executing the function or service by itself. The other electronic devices (e.g., the electronic devices 102 and 104 or the server 106) can execute the requested functions or additional functions, and can transmit the results to the electronic device 101. The electronic device 101 can provide the requested functions or services by processing the received results as they are or additionally. For this purpose, for example, a cloud computing technique, a distributed computing technique, or a client-server computing technique can be used.

Figure 2:
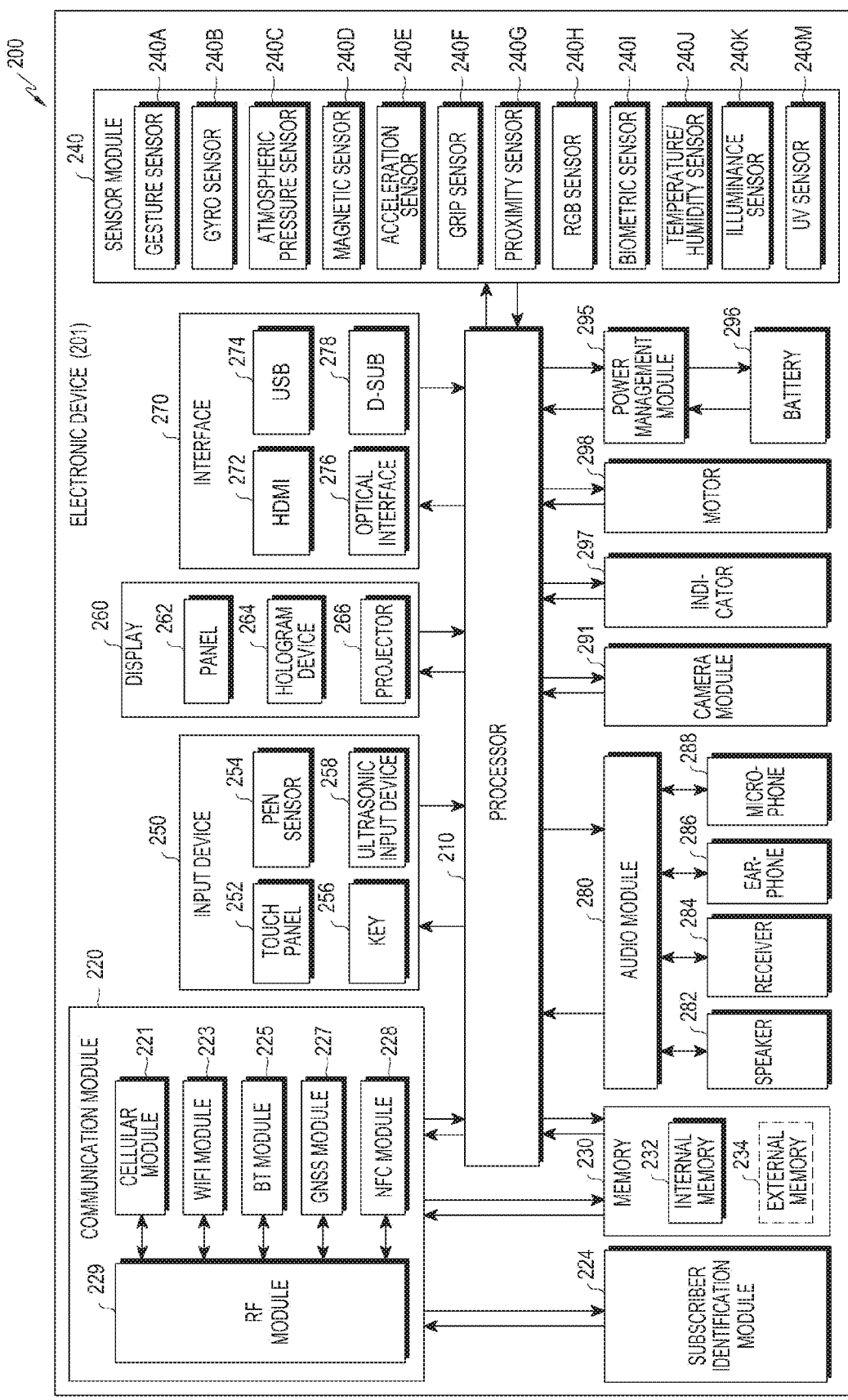
FIG. 2 is a block diagram of an electronic device according to various embodiments of the present disclosure.

FIG. 2 is a block diagram 200 illustrating an electronic device 201 according to various embodiments of the present disclosure. The electronic device 201 can form, for example, the whole or a part of the electronic device 101 illustrated in FIG. 1. Referring to FIG. 2, the electronic device 201 can include at least one processor 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 can drive, for example, an operating system or an application program so as to control a plurality of hardware or software components connected thereto, and can also perform various data processing and arithmetic operations. The processor 210 can be implemented by, for example, a System-on-Chip (SoC). According to one embodiment, the processor 210 can further include a Graphic Processing Unit (GPU) and/or an image signal processor. The processor 210 can include at least some (e.g., the cellular module 221) among the components illustrated in FIG. 2. The processor 210 can load and process a command or data received from at least one of the other components (e.g., the non-volatile memory) in a volatile memory, and can store various data in the non-volatile memory.

The communication module 220 can have a configuration that is the same as or similar to the communication interface 170 of FIG. 1. The communication module 220 can include, for example, a cellular module 221, a WiFi module 223, a Bluetooth module 225, a GNSS module 227 (e.g., a GPS module, a Glonass module, a Beidou module or a Galileo module), an NFC module 228, and a Radio Frequency (RF) module 229.

The cellular module 221 can support, for example, a voice call, a video call, a text message service, or an internet service through a communication network. According to one embodiment, the cellular module 221 can perform discrimination and authentication of the electronic device 201 within the communication network by using a subscriber identification module (e.g., a SIM card) 224. According to one embodiment, the cellular module 221 can perform at least some of the functions that can be provided by the processor 210. According to one embodiment, the cellular module 221 can include a Communication Processor (CP).

Each of the WiFi module 223, the BT module 225, the GNSS module 227, and the NFC module 228 can include, for example, a processor to process data transmitted/received there through. According to a certain embodiment, at least some (two or more) of the cellular module 221, the WiFi module 223, the Bluetooth module 225, the GNSS module 227, and the NFC module 228 can be incorporated in a single Integrated Chip (IC) or an IC package.

The RF module 229 can transmit/receive a communication signal (e.g., an RF signal). The RF module 229 can include, for example, a transceiver, a Power Amp Module (PAM), a frequency filter, a Low Noise Amplifier (LNA), or an antenna. According to another embodiment, at least one of the cellular module 221, the WiFi module 223, the Bluetooth module 225, the GNSS module 227, and the NFC module 228 can transmit/receive an RF signal through a separate RF module.

The subscriber identification module 224 can include, for example, a card including a subscriber identification module and/or an embedded SIM, and can also include intrinsic identification information (e.g., Integrated Circuit Card IDentifier (ICCID)) or subscriber information (e.g., International Mobile Subscriber Identity (IMSI).

The memory 230 (e.g., the memory 130) can include an internal memory 232 or an external memory 234. The internal memory 232 can include at least one of, for example, a volatile memory (e.g., Dynamic RAM (DRAM), Static RAM (SRAM), or Synchronous DRAM (SDRAM)), a nonvolatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory (e.g., NAND flash memory, or NOR flash memory), hard drive, or Solid State Drive (SSD)).

The external memory 234 can further include a flash drive, e.g., Compact Flash (CF), Secure Digital (SD), Micro Secure Digital (Micro-SD), Mini Secure Digital (Mini-SD), extreme Digital (xD), Multi-Media Card (MMC), or memory stick. The external memory 234 can be functionally and/or physically connected to the electronic device 201 through various interfaces.

The sensor module 240 can measure a physical quantity or sense an operating status of the electronic device 201, and then convert measured or sensed information into electric signals. The sensor module 240 can include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature/humidity sensor 240J, an illuminance sensor 240K, and a Ultra-Violet (UV) sensor 240M. Additionally or alternatively, the sensor module 240 can include, for example, an E-nose sensor (not illustrated), an Electro Myo Graphy (EMG) sensor (not illustrated), an Electro Encephalo Gram (EEG) sensor (not illustrated), an Electro Cardio Gram (ECG) sensor (not illustrated), an Infra-Red (IR) sensor (not illustrated), an iris sensor (not illustrated), or a fingerprint sensor (not illustrated). The sensor module 240 can further include a control circuit for controlling one or more sensors incorporated therein. In a certain embodiment, the electronic device 201 can further include a processor configured to control the sensor module 240 as a part of the processor 210 or separate from the processor 210 so as to control the sensor module while the processor 210 is in the sleep state.

The input device 250 can include a touch panel 252, a (digital) pen sensor 254, a key 256, or an ultrasonic input device 258. As the touch panel 252, at least one of, for example, a capacitive type touch panel, a resistive type touch panel, an infrared type touch panel, and an ultrasonic type touch panel can be used. Also, the touch panel 252 can further include a control circuit. In addition, the touch panel 252 can further include a tactile layer so as to provide a tactile reaction to a user.

The (digital) pen sensor 254 can be, for example, a part of the touch panel or can include a separate recognition sheet. The key 256 can include, for example, a physical button, an optical key, or a keypad. The ultrasonic input device 258 can sense ultrasonic waves that are generated by an input tool through a microphone (e.g., a microphone 288) so that data corresponding to the sensed ultrasonic waves can be confirmed.

The display 260 (e.g., the display 160) can include a panel 262, a hologram device 264, or a projector 266. The panel 262 can include a configuration that is the same as or similar to that of the display 160 of FIG. 1. The panel 262 can be implemented to be flexible, transparent, or wearable. The panel 262 can be configured as a single module with the touch panel 252. The hologram device 264 can show a stereoscopic image in the air using interference of light. The projector 266 can project light onto a screen so as to display an image. The screen can be located inside or outside the electronic device 201. According to one embodiment, the display 260 can further include a control circuit to control the panel 262, the hologram device 264, or the projector 266.

The interface 270 can include, for example, a High-Definition Multimedia Interface (HDMI) 272, a Universal Serial Bus (USB) 274, an optical interface 276, or a D-sub-miniature (D-sub) 278. The interface 270 can be included, for example, in the communication interface 170 illustrated in FIG. 1. Additionally or alternatively, the interface 270 can include, for example, a Mobile High-definition Link (MHL) interface, a Secure Digital (SD) card/Multi-Media Card (MMC) interface, or an Infrared Data Association (IrDA) standard interface.

The audio module 280 can bi-directionally convert, for example, sounds and electric signals. At least some of the components of the audio module 280 can be included, for example, in the input/output interface 150 illustrated in FIG. 1. The audio module 280 can process sound information input or output through, for example, a speaker 282, a receiver 284, an earphone 286, or a microphone 288.

The camera module 291 is a device capable of photographing, for example, a still image and a moving image. According to one embodiment, the camera module 291 can include at least one image sensor (e.g., a front sensor or a rear sensor), a lens, an Image Signal Processor (ISP), or a flash (e.g., LED or xenon lamp).

The power management module 295 can manage, for example, the electric power of the electronic device 201. According to one embodiment, the power management module 295 can include a Power Management Integrated Circuit (PMIC), a charger Integrated Circuit (IC), or a battery or fuel gauge. The PMIC can be configured in a wired and/or wireless charge type. The wireless charge type can include, for example, a magnetic resonance type, a magnetic induction type, or an electromagnetic wave type, and can further include an additional circuit for wireless charging, such as a coil loop, a resonance circuit, or a rectifier. The battery gauge can measure the residual amount of the battery 296 and a voltage, current, or temperature during charging. The battery 296 can store or create electric power and can supply the electric power to the electronic device 201. The battery 296 can include, for example, a rechargeable battery or a solar battery.

The indicator 297 can indicate a specific status of the electronic device 201 or a part thereof (e.g., the processor 210), such as a booting status, a message status, or a charged status. The motor 298 can convert an electric signal into a mechanical vibration, and can generate a vibration or a haptic effect. Although not illustrated, the electronic device 201 can include a processor (e.g., GPU) to support a mobile TV. The processor to support a mobile TV can process media data that complies with the standards of, for example, Digital Multimedia Broadcasting (DMB), Digital Video Broadcasting (DVB), or mediaFlo™.

Each of the above-described component elements of hardware according to the present disclosure can be configured with one or more components, and the names of the corresponding component elements can vary based on the type of electronic device. The electronic device according to various embodiments of the present disclosure can include at least one of the aforementioned elements. Some elements can be omitted or other additional elements can be further included in the electronic device. Also, some of the hardware components according to various embodiments can be combined into one entity, which can perform functions identical to those of the relevant components before the combination.

Figure 3:
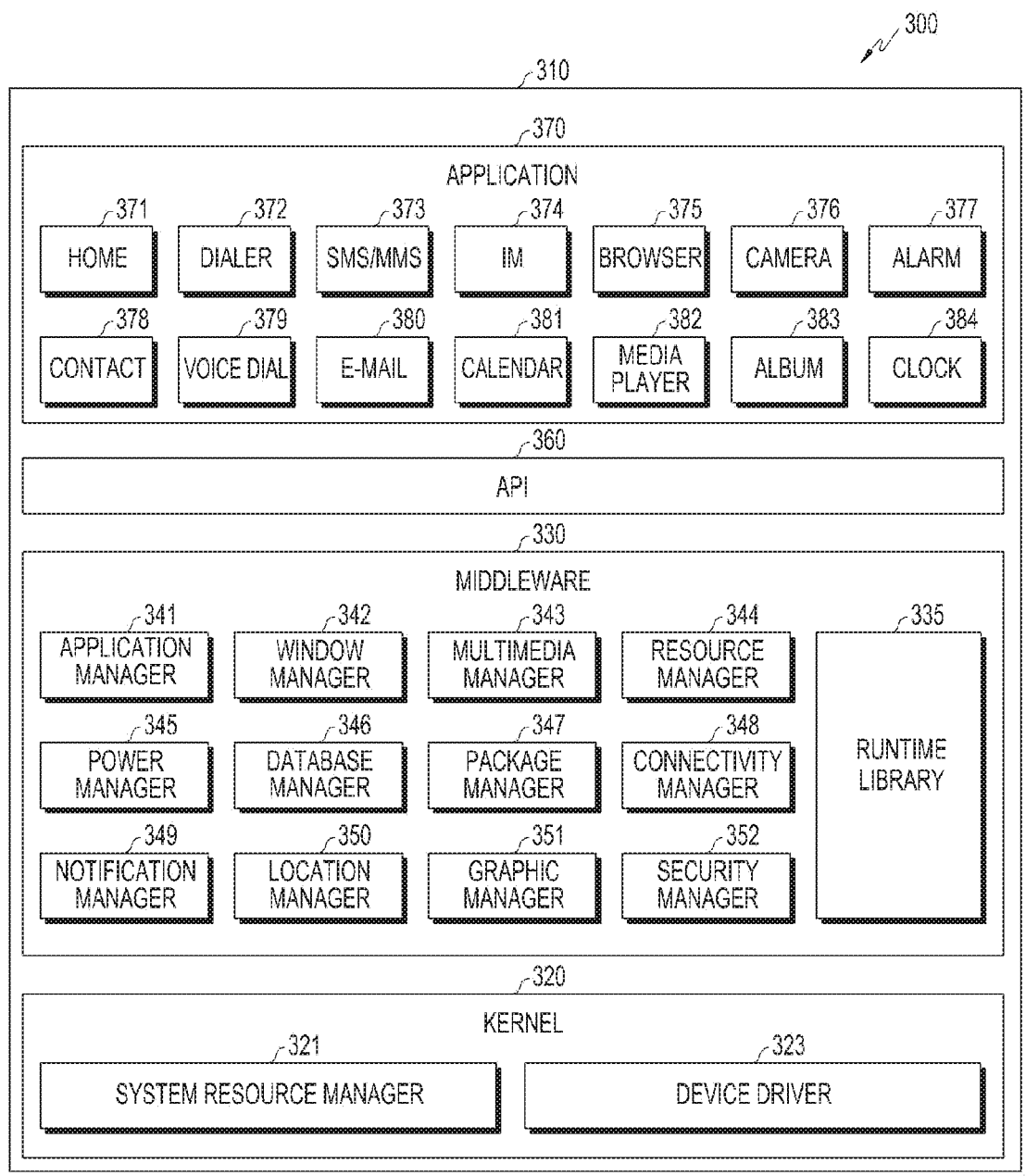
FIG. 3 is a block diagram of a program module according to various embodiments.

FIG. 3 is a block diagram 300 of a program module according to various embodiments of the present disclosure. According to one embodiment, a program module 310 (e.g., the program 140) can include an Operating System (OS) that controls resources associated with an electronic device (e.g., the electronic device 101) and/or various applications (e.g., the application programs 147) that are driven on the operating system. The operating system can be, for example, Android, iOS, Windows, Symbian, Tizen, Bada, or the like.

The program module 310 can include a kernel 320, a middleware 330, an Application Programming Interface (API) 360, and/or an application 370. At least a part of the program module 310 can be preloaded on the electronic device, or can be downloaded from an external electronic device (e.g., the external electronic devices 102 and 104, and the server 106).

The kernel 320 (e.g., the kernel 141) can include, for example, a system resource manager 321 and/or a device driver 323. The system resource manager 321 can, for example, control, allocate, or a recover system resource. According to one embodiment, the system resource manager 321 can include a process management unit, a memory management unit, a file system management unit, or the like. The device driver 323 can include, for example, a display driver, a camera driver, a Bluetooth driver, a common memory driver, a USB driver, a keypad driver, a WiFi driver, an audio driver, or an Inter-Process Communication (IPC) driver.

The middleware 330 can provide, for example, a function that is commonly required by the applications 370, or can provide various functions to the applications 370 through the API 360 such that the applications 370 can efficiently use the limited system resources within the electronic device. According to one embodiment, the middleware 330 (e.g., the middleware 143) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module that is used by a compiler in order to add a new function through a program language while the applications 370 are executed. The runtime library 335 can perform input/output management, memory management, a function for an arithmetic function, or the like.

The application manager 341 can manage, for example, a life cycle of at least one application among the applications 370. The window manager 342 can manage a GUI resource that is used in a screen. The multimedia manager 343 can grasp a format required for reproducing various media files, and can perform encoding or decoding of the media files by using a codec that is suitable for the corresponding format. The resource manager 344 can manage a resource, such as a source code, a memory, a storage space, or the like of at least one application among the applications 370.

The power manager 345 is operated together with, for example, a Basic Input/output System (BIOS) so as to manage a battery or a power source, and can provide, for example, power information that is required for operating the electronic device. The database manager 346 can generate, retrieve, or change a database to be used by at least one application among the applications 370. The package manager 347 can manage the installation or update of an application that is distributed in the form of a package file.

The connectivity manager 348 can manage, for example, a wireless connection of WiFi or Bluetooth. The notification manager 349 can display or notify events, such as an arrival message, appointment, and proximity notification in a manner that does not disturb the user. The location manager 350 can manage position information of the electronic device. The graphic manager 351 can manage a graphic effect to be provided to the user or a user interface associated therewith. The security manager 352 can provide all security functions required for system security, user authentication, or the like. According to one embodiment, in the case where the electronic device (e.g., the electronic device 101) includes a phone function, the middleware 330 can include a telephony manager to manage a voice or video call function of the electronic device.

The middleware 330 can include a middleware module that forms a combination of various functions of the above-described components. The middleware 330 can provide a module that is specialized for each kind of operation system in order to provide differentiated functions. In addition, the middleware 330 can dynamically delete some of the existing components or add new components.

The API 360 (e.g., the API 145) is, for example, a collection of API programming functions, and can be provided in different configurations according to operation systems. For example, Android or iOS can provide one API set for each platform and Tizen can provide two or more API sets for each platform.

The applications 370 (e.g., the application programs 147) can include, for example, one or more applications that can execute the functions of home 371, dialer 372, SMS/MMS 373, Instant Message (IM) 374, browser 375, camera 376, alarm 377, contact 378, voice dial 379, e-mail 380, calendar 381, media player 382, album 383, and watch 384, health care (e.g., measurement of a quantity of motion, blood sugar, or the like), provision of environmental information (e.g., provision of atmospheric pressure, humidity, or temperature information), etc.

According to one embodiment, the applications 370 can include an application that supports information exchange between the electronic device (e.g., the electronic device 101) and the external electronic devices (e.g., the electronic devices 102 and 104) (hereinafter, the application will be referred to as an "information exchange application" for the convenience of description). The information exchange application can include, for example, a notification relay application to transmit specific information to the external electronic devices, or a device management application to manage the external electronic devices.

For example, the notification relay application can include a function of relaying notification information generated from any other application of the electronic device (e.g., an SMS/MMS application, an e-mail application, a healthcare application, or an environment information application) to the external electronic devices (e.g., the electronic devices 102 and 104). In addition, the notification relay application can receive notification information from, for example, an external electronic device, and can provide the notification information to the user.

The device management application can manage (e.g., install, delete, or update) at least one function of an external electronic device (e.g., the electronic device 102 or 104) that communicates with the electronic device (e.g., turn-on/turn-off of the external electronic device itself (or some components thereof) or adjustment of brightness (or resolution) of a display), an application operated in the external electronic device, or a service provided by the external electronic device (e.g., a telephony service or a message service).

According to one embodiment, the applications 370 can include an application designated according to an attribute of an external electronic device (e.g., the electronic device 102 or 104) (e.g., a healthcare application of a mobile medical device). According to one embodiment, the applications 370 can include an application received from an external electronic device (e.g., the server 106 or the electronic device 102 or 104). According to one embodiment, the applications 370 can include a preloaded application or a third party application that is capable of being downloaded from the server. Names of the elements of the program module 310, according to the above-described embodiments of the present disclosure, can change depending on the type of OS.

According to various exemplary embodiments of the present disclosure, at least some of the program module 310 can be implemented in software, firmware, hardware, or a combination of two or more thereof. At least some of the program module 310 can be implemented (e.g., executed) by, for example, the processor (e.g., the processor 120). At least some of the program module 310 can include, for example, a module, a program, a routine, a set of instructions, and/or a process for performing one or more functions.

The term "module" as used herein can, for example, mean a unit including one of hardware, software, and firmware or a combination of two or more of them. The "module" can be interchangeably used with, for example, the term "unit", "logic", "logical block", "component", or "circuit". The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure can be implemented by a command stored in a computer-readable storage medium in a programming module form. The instruction, when executed by a processor (e.g., the processor 120), can cause the one or more processors to execute the function corresponding to the instruction. The computer-readable storage medium can be, for example, the memory 130.

The computer readable recoding medium can include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

The programming module according to the present disclosure can include one or more of the aforementioned components or can further include other additional components, or some of the aforementioned components can be omitted. Operations executed by a module, a programming module, or other component elements according to various embodiments of the present disclosure can be executed sequentially, in parallel, repeatedly, or in a heuristic manner. Further, some operations can be executed according to another order or can be omitted, or other operations can be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4A:
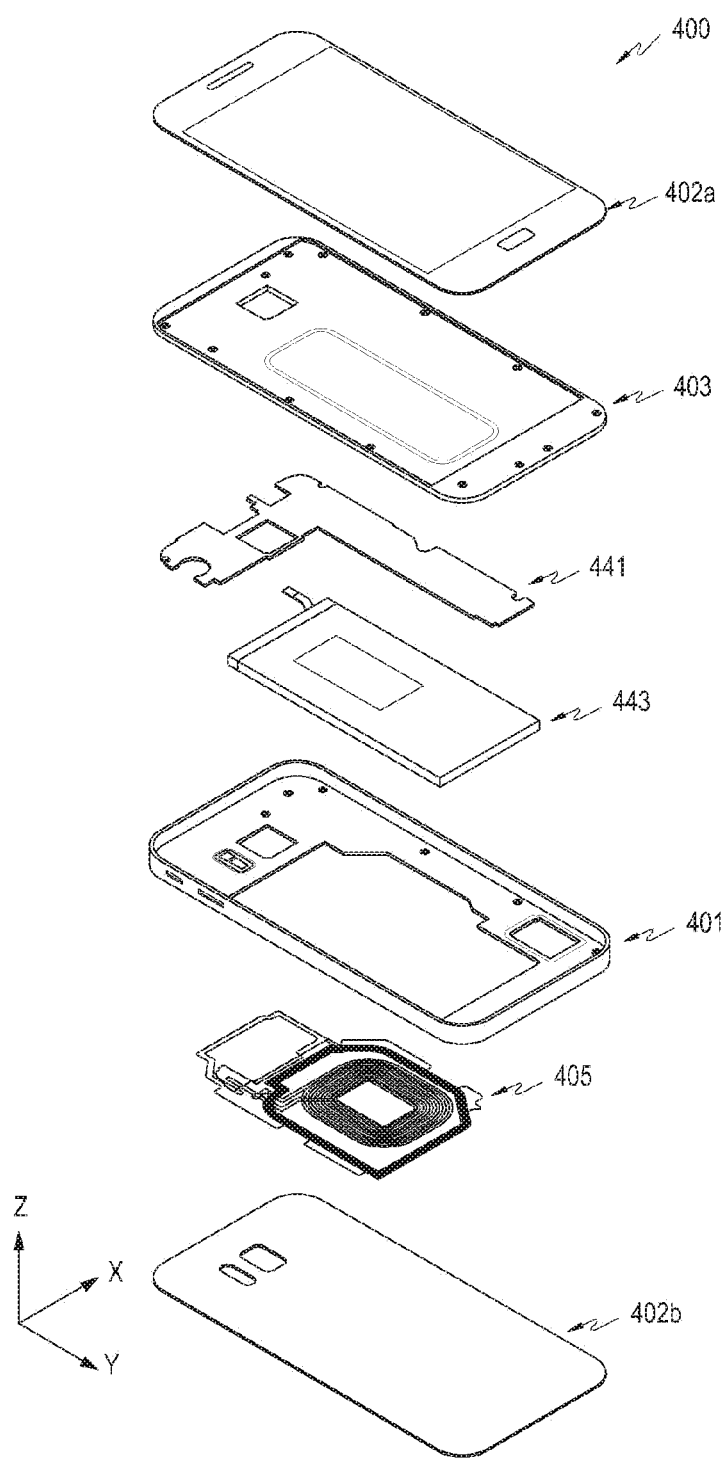
FIG. 4A is a perspective view illustrating an electronic device according to one of various embodiments of the present disclosure, in a disassembled state.
Figure 4B:
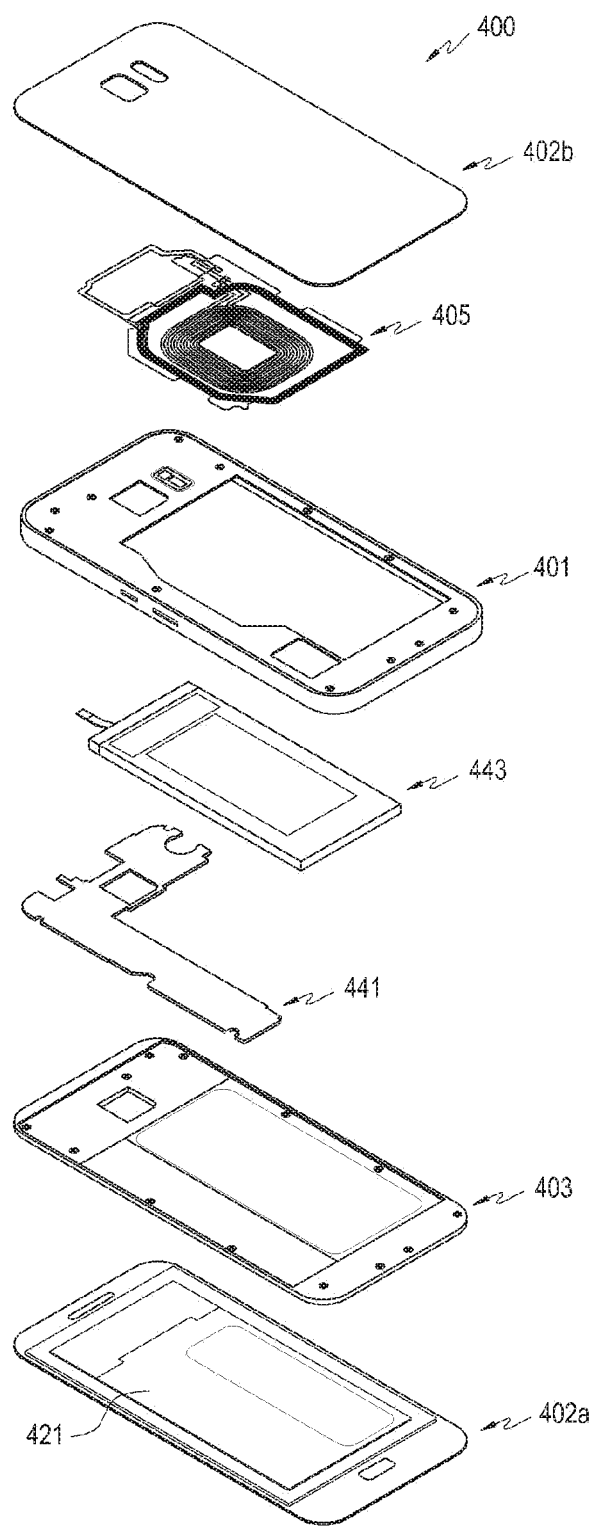
FIG. 4B is a perspective view illustrating the electronic device according to one of various embodiments of the present disclosure, in a disassembled state, which is viewed in a different direction.
Figure 4C:
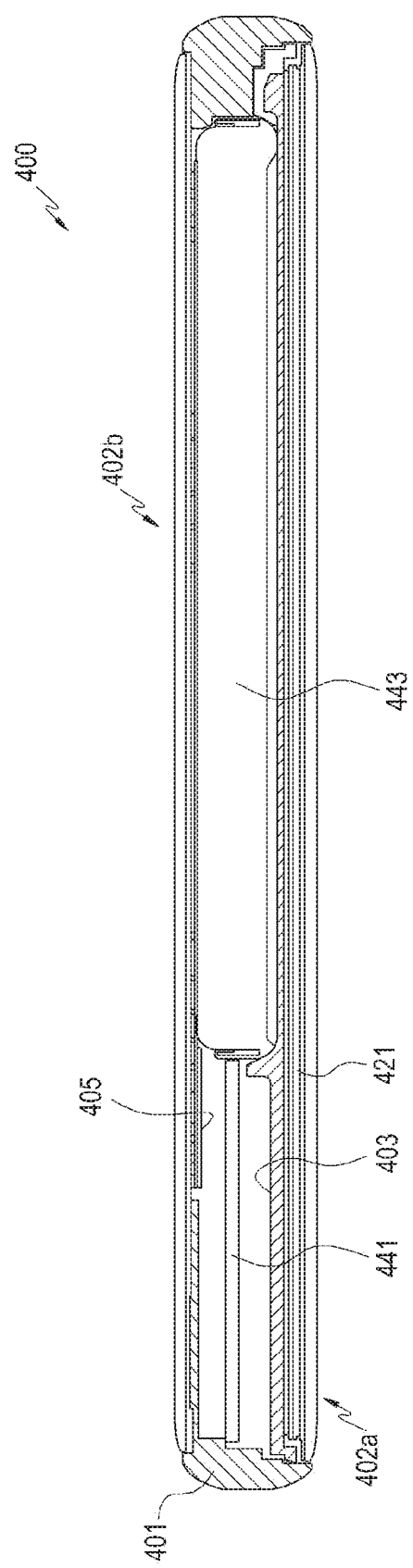
FIG. 4C is a sectional view illustrating the electronic device according to one of various embodiments of the present disclosure.

FIG. 4A is a perspective view illustrating an electronic device 400, according to one of various embodiments of the present disclosure, in a disassembled state. FIG. 4B is a perspective view illustrating the electronic device 400, according to one of various embodiments of the present disclosure, in a disassembled state, which is viewed in a different direction. FIG. 4C is a sectional view illustrating the electronic device, according to one of various embodiments of the present disclosure. The electronic device 400 of FIGS. 4A to 4C can be the electronic device 101.

In FIG. 4A, the "X" axis in an orthogonal coordinate system of three axes can indicate a width direction of the electronic device 400, the "Y" axis can indicate the length direction of the electronic device 400, and the "Z" axis can indicate the thickness direction of the electronic device 400.

Referring to FIGS. 4A to 4C, the electronic device 400 can include a housing 401, one or more plates 402a and 402b, a conductive pattern unit 405, and a control circuit (e.g., a control circuit 857 in FIG. 8) connected to the conductive pattern unit 405.

According to various embodiments, the housing 401 accommodates various electronic components or the like, and at least a part of the housing 401 can be formed of a conductive material. For example, the housing 401 can include side walls that form the external side surfaces of the electronic device 400, and a portion exposed to the exterior of the electronic device 400 can be made of a conductive metal material. Within the housing 401, a circuit board 441 and/or a battery 443 can be accommodated. On the circuit board 441, a processor (e.g., the processor 210), a communication module, various interfaces (e.g., the interface 270), a power management module (e.g., the power management module 295 of FIG. 2), or the like can be mounted in the form of IC chips, and the control circuit (e.g., the control circuit 857 of FIG. 8) can also be configured as an IC chip to be mounted on the circuit board 441. In certain embodiments the control circuit can be a part of the processor or the communication module.

According to various embodiments, the plates 402a and 402b (which may also be described as elements, components, or members of the device assembly) can be made of a material that at least partially transmits a wireless electromagnetic wave or a magnetic field, and can include a front cover 402a mounted as a front surface of the housing 401 and a rear cover 402b mounted as a rear surface of the housing 401. The front cover 402a can include, for example, a display device 421. For example, the front cover 402a can include a window member of a tempered glass material, and the display device 421 mounted on the inner surface of the window member. A touch panel can be mounted between the window member and the display device 421. For example, the front cover 402a can be used as an input device that is equipped with a touch screen function while serving as an output device that outputs a screen. The rear cover 402b is mounted to face a direction opposite to the front cover 402a, and can be made of a material that is capable of transmitting a wireless electromagnetic wave or a magnetic field (e.g., a tempered glass or a synthetic resin). The plates (e.g., the front cover 402a and the rear cover 402b) are mounted on the housing 401 to form the exterior of the electronic device 400 together with the housing 401.

According to various embodiments, within the housing 401, a support member 403 can be mounted. The support member 403 can be made of a metallic material, and can be placed within a space formed by the housing 401 and the front cover 402a. For example, the support member 403 can be interposed between the display device 421 and the circuit board 441. The support member 403 can prevent the IC chips mounted on the circuit board 441 from coming in contact with the display device 421, and can prevent electromagnetic interference between the IC chips by providing an electromagnetic shielding function. The support member 403 can strengthen the rigidity of the electronic device 400. For example, a plurality of openings or recessed portions can be formed in the housing 401 according to the arrangement of the electronic components within the electronic device 400 which can deteriorate the rigidity of the housing 401 or the electronic device 400. The support member 403 can improve the rigidity of the housing 401 or the electronic device 400 by being mounted and fastened within the housing 401.

Although not illustrated in detail in the drawing, according to various embodiments, various structures can be formed on a surface of the housing 401 or the support member 403 according to an arrangement of the electronic components that are arranged within the electronic device 400 or a binding structure between the housing 401 and the support member 403. For example, a space that accommodates the IC chips mounted on the circuit board can be formed in the housing 401 and/or the support member 403. The space that accommodates the IC chips can be formed by a recess, a rib that encloses the IC chips, or the like. According to various embodiments, in the housing 401 and the support member 403, fastening bosses and fastening holes, which correspond to each other, can be formed. For example, when fastening members, such as screws, are fastened to the fastening bosses or the fastening holes, the housing 401 and the support member 403 can be bound to each other in a state where they face each other, or the support member 403 can be bound in a state where it is accommodated in the housing 401.

According to various embodiments, the conductive pattern unit 405 can be mounted on a surface of the housing 401 that is opposite to the circuit board 441. For example, the conductive pattern unit 405 can be positioned within a space formed by the rear cover 402b and the housing 401. The conductive pattern unit 405 can include at least one conductive pattern (e.g., a flat coil), and can transmit/receive a wireless electromagnetic wave or can generate a magnetic field through the conductive pattern. The conductive pattern unit 405 will be described in more detail with reference to FIGS. 5A and 5B or the like.

According to various embodiments, the wireless electromagnetic wave transmitted/received through the conductive pattern unit 405 or the magnetic field generated by the conductive pattern unit 405 can pass through the plates (e.g., the rear cover 402b). For example, the rear cover 402b can be made of a tempered glass material or a synthetic resin material. In the case where the rear cover 402b is made of a transparent material, such as the tempered glass, a painting layer can be formed on the inner or outer surface so as to conceal the structures or the electronic components (e.g., the conductive pattern unit 405) inside the rear cover 402b.

Figure 5A:
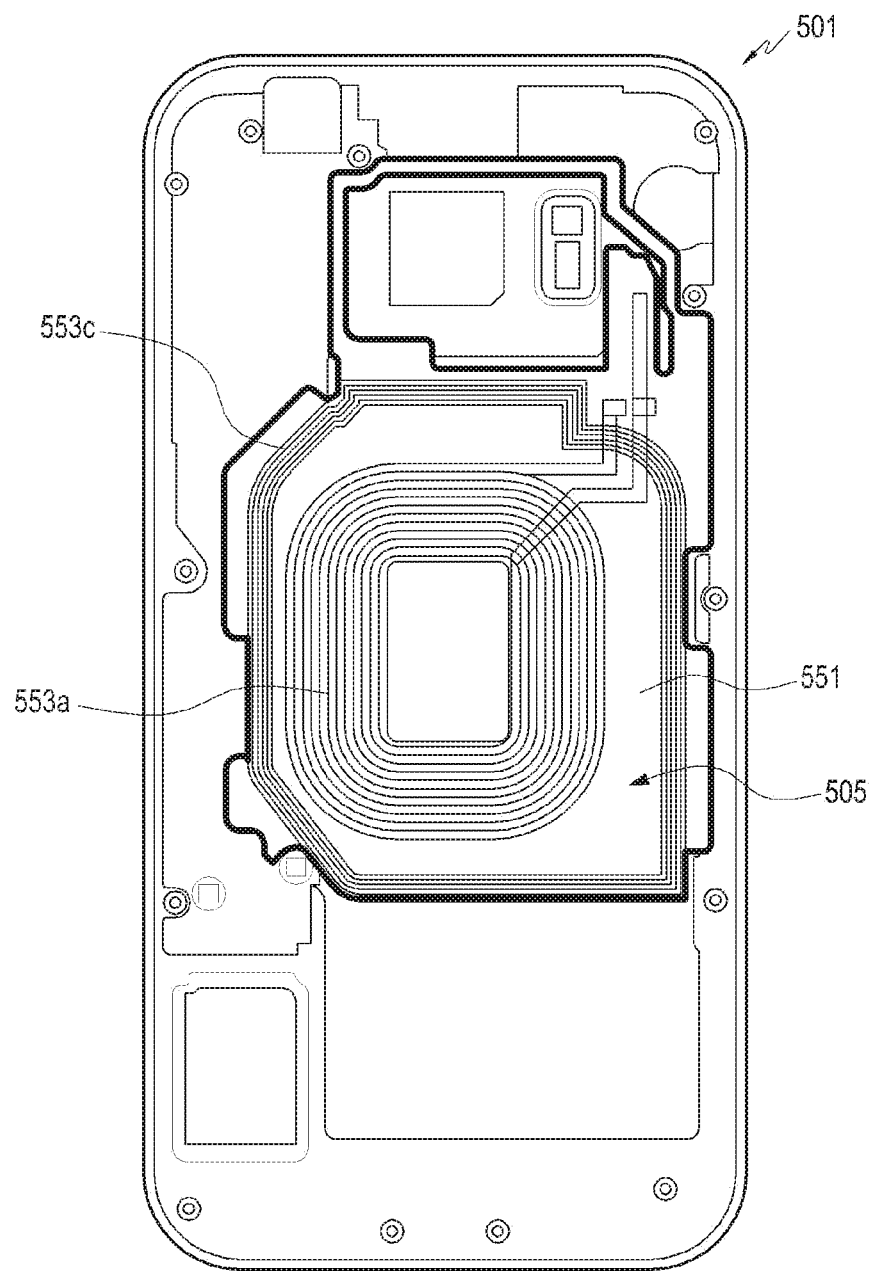
FIG. 5A is a plan view illustrating an appearance in which the conductive pattern unit is installed in the housing in the electronic device according to one of various embodiments of the present disclosure.
Figure 5B:
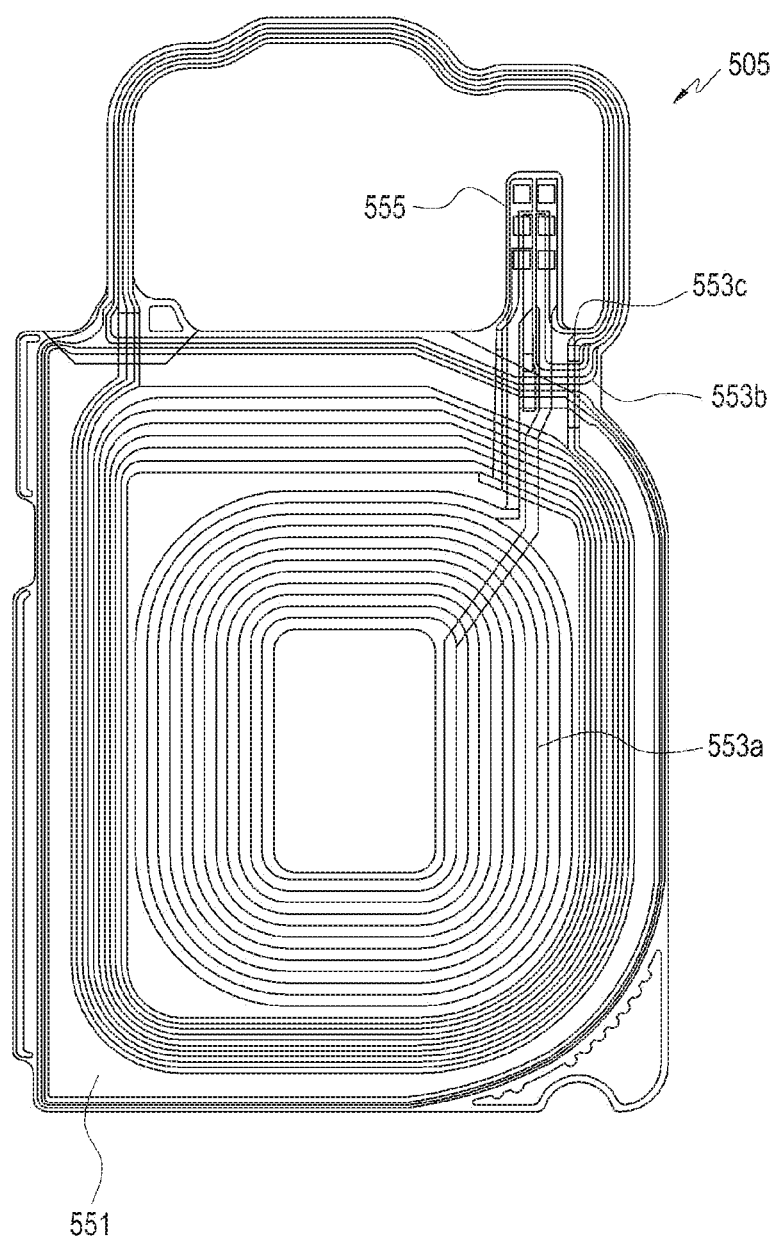
FIG. 5B is a plan view illustrating a conductive pattern unit of the electronic device according to one of various embodiments of the present disclosure.

FIG. 5A is a plan view illustrating an appearance in which the conductive pattern unit 505 is installed in the housing 501 in the electronic device, according to one of various embodiments of the present disclosure. FIG. 5B is a plan view illustrating a conductive pattern unit 505 of the electronic device, according to one of various embodiments of the present disclosure. The conductive pattern unit 505 of FIGS. 5A and 5B can be the conductive pattern unit 405 of FIGS. 4A and 4B. According to one embodiment, the housing 501 of FIGS. 5A and 5B may be the housing 401 of FIGS. 4A and 4B.

Referring to FIGS. 5A and 5B, the conductive pattern unit 505 may include a base member 551 and one or more conductive patterns 553a, 553b, and 553c.

The base member 551 may include a film that is made of an insulator or a dielectric material, and can provide an area to form the conductive patterns 553a, 553b, and 553c. The conductive pattern unit 505 can have an appearance corresponding to that of the flexible printed circuit board. Alternatively, the conductive pattern unit 505 can be a flexible printed circuit board and can have a multi-layer circuit board structure. Each of the conductive patterns 553a, 553b, and 553c can be formed on one surface of the base member 551 or the other surface. When the base member 551 has the multi-layer circuit board structure, a plurality of conductive patterns 553a, 553b, and 553c can be properly formed in the layers of the base member 551, respectively. The conductive patterns 553a, 553b, and 553c can be formed by etching (e.g., wet etching or dry etching) a part of a conductive layer formed on the base member 551 through printing using a conductive ink, vapor deposition, painting, and/or plating.

According to one embodiment, the conductive patterns 553a, 553b, and 553c can form a loop antenna, and in the case where the loop antenna is in the form of a flexible printed circuit board, one flexible printed circuit board can include a plurality of loop antennas for communication.

According to one embodiment, an antenna formed as a single flexible printed circuit board can include loop antennas for NFT, MST, and wireless communication. In the case of an electronic device of which the front and rear surfaces are glasses, a flexible printed circuit board antenna can be positioned between the rear glass and the inner housing (e.g., the above-mentioned housing 501) of the electronic device (terminal). At least a part of the inner housing can include a non-conductive material (e.g., an injection molded plastic). At least a part of the inner housing can include an opening. At least a part of the flexible printed circuit board antenna can overlap with the battery within the electronic device (terminal).

According to one embodiment, a loop antenna for MST can include a conductive lines that is wound 8 to 10 times.

According to one embodiment, the flexible printed circuit board antenna can further include a heat radiation sheet (e.g., a graphite sheet) and a shielding material (e.g., ferrite).

According to one embodiment, a transaction card or a fingerprint sensor for user authentication can be included in a home key on a front surface, a key on a side surface, or a separate key on a rear surface in the electronic device (terminal). In addition, the fingerprint sensor can be included as at least a part of the display panel.

According to various embodiments, the base member 551 can include a connection piece 555. The connection piece 555 can provide a means for connecting the conductive patterns 553a, 553b, and 553c to the control circuit, the communication module, or the like of the electronic device (e.g., the electronic device 101, 201, or 400 of FIG. 1, 2, 4A, or the like). For example, one end of each of the conductive patterns 553a, 553b, and 553c can be positioned on the connection piece 155, and can be connected to the control circuit or the communication module through a connection member, such as a connector, a pogo pin, or a C-clip.

When the conductive pattern unit 505 is viewed from the upper side (e.g., when the conductive pattern unit 505 disposed in the housing 501 is viewed from the rear side of the electronic device 100), the conductive patterns 553a, 553b, and 553c can be arranged such that the conductive patterns are adjacent to each other, such that the conductive patterns partially overlap with each other, and/or such that one conductive pattern encloses another conductive pattern. A specific embodiment of the present disclosure discloses an example in which each of the first, second, and third conductive pattern 553a, 553b, and 553c is formed on the base member 551, and the first conductive pattern 553a is arranged to be enclosed by the second conductive pattern 553b and/or the third conductive pattern 553c.

According to various embodiments, the first conductive pattern 553a can include a plurality of turns of a conductive line wound in a circular shape or a polygonal shape, and when the base member 551 is mounted in the housing 501, the first conductive pattern 553a can be arranged substantially parallel to the housing 501 or the plate (e.g., the rear cover 402b). The first conductive pattern 553a can be connected to the control circuit (e.g., the control circuit 857 of FIG. 8) so as to transmit/receive a wireless electromagnetic wave or power, or to generate a magnetic field.

According to various embodiments, each of the second conductive pattern 553b and the third conductive pattern 553c can include a plurality of turns of a conductive line wound to form a circular shape, a polygonal shape, or a closed loop shape formed by a combination of a curve line and a straight line. The second conductive pattern 553b and/or third conductive pattern 553c can be arranged to be substantially parallel to the housing 501 or the rear cover 402b. Each of the second conductive pattern 553b and the third conductive pattern 553c can be connected to the control circuit so as to transmit/receive a wireless electromagnetic wave or power, or to generate a magnetic field.

According to various embodiments, the second conductive pattern 553b and/or the third conductive pattern 553c can be arranged in the substantially same plane as the first conductive pattern 553a. In one embodiment, when the base member 551 is in the form of a multi-layer circuit board, the first conductive pattern 553a, the second conductive pattern 553b, and/or the third conductive pattern 553c can be formed in different layers, respectively. Even if the first conductive pattern 553a, the second conductive pattern 553b, and/or the third conductive pattern 553c are formed in the different layers of the multi-layer circuit board, respectively, the first conductive pattern 553a, the second conductive pattern 553b, and/or the third conductive pattern 553c can be arranged in the substantially same plane when the base member 551 is in the form of a film. In arranging the first conductive pattern 553a, the second conductive pattern 553b, and/or the third conductive pattern 553c, each of the conductive patterns can be in the form of a closed loop shape, and can be arranged such that the conductive patterns are adjacent to each other, such that one conductive pattern encloses one or two other conductive patterns, and/or such that the conductive patterns do not at least partially overlap with each other.

According to various embodiments, each of the first to third conductive patterns 553a, 553b, and 553c can transmit/receive a wireless electromagnetic wave, can transmit/receive wireless power, or can generate a magnetic field. According to various embodiments, according to the control of the control circuit, a wireless electromagnetic wave can be transmitted/received, wireless power can be transmitted/received, or a magnetic field can be generated, through one conductive pattern or through a combination of two or more conductive patterns.

According to various embodiments, on a line that connects the control circuit to each of the first to third conductive patterns 553a, 553b, and 553c, for example, a matching circuit, a lumped element, and/or a switch element can be arranged so as to adjust, for example, a resonance frequency of each of the conductive patterns or a magnetic flux distribution. For example, when the control circuit includes a wireless charge module and an NFC module, it is possible to cause the first conductive pattern 553a to perform one of the wireless charge function and a near field communication function by connecting the first conductive pattern 553a to one of the wireless charge module and the NFC module using the switch element. On each line that connects the first conductive pattern 553a to one of the wireless charge module and the NFC module, for example, a matching circuit can be arranged to adjust the operation characteristic of the first conductive pattern 553a to be suitable for each of the functions.

According to various embodiments, the control circuit can further include a magnetic secure transfer (MST) module. Each of the first to third conductive patterns 553a, 553b, and 553c can be connected at least one of the wireless charge module, an NFC module, and an MST module so as to conduct at least one of the wireless charge function, the NFC function, and the MST function under the control of the control circuit. A conductive pattern connected to the MST module can generate a magnetic field under the control of the control circuit.

According to one embodiment, unlike those illustrated in FIGS. 5A and 5B, the NFC transaction coil (the first conductive pattern 553a), the MST transaction coil (the second conductive pattern 553b), and the wireless charge coil (the third conductive pattern 553c) within the electronic device can be configured in the form of a circle, and all the centers of the circles of respective coils coincide with each other. According to one embodiment, among the plurality of coils, the NFC transaction coil is subjected to modulation in a frequency band (e.g., 15 MHz) that is higher than those of two remaining coils, and is the coil that gets the most interference from a peripheral coil antenna. Thus, the NFC transaction coil can be mounted in the outermost area among the plurality of coils. According to one embodiment, the MST transaction coil can have a size that coincides with the operating range of the corresponding coil. Accordingly, the MST transaction coil can be mounted in the middle area of the plurality of coils. A shunt capacitor or a serial inductor can reduce the resonance frequency of the coil to a low frequency, which can consequently result in an effect of causing the resonance frequency to be spaced away from the resonance frequency of the NFC transaction coil. Among the plurality of coils, the MST transaction coil and the wireless charge coil conduct communication at a lower frequency and transmit a higher power compared to the NFC transaction coil, and thus can be less affected by a peripheral coil than the other coils. According to one embodiment, a coupling prevention circuit of the transaction coil can be mounted at the output end of the MST transaction coil. In such a case, the resonance frequency of the MST coil can be operated due to the parasite of the inductor of NFC transaction coil.

Figure 6:
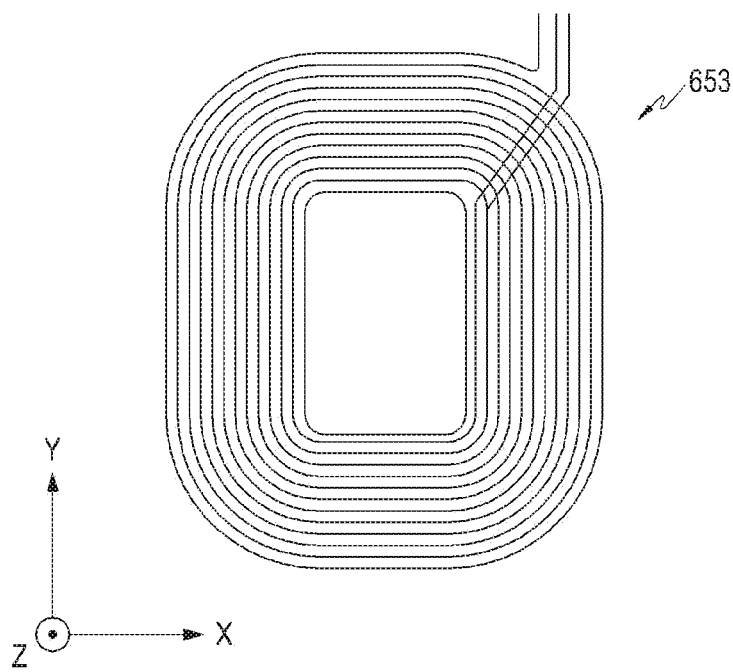
FIG. 6 is a plan view illustrating a flat coil according to various embodiments of the present disclosure.

FIG. 6 is a plan view illustrating a flat coil 653 according to various embodiments of the present disclosure.

Referring to FIG. 6, the flat coil 653, which transmits/receives a wireless electromagnetic wave or generates a magnetic field, can take various shapes, but can take a circular shape or a polygonal shape which is substantially vertically and horizontally symmetric. For example, the flat coil 653 can be formed of a plurality of turns of a conductive line wound on a base member in a circular or polygonal shape.

Figure 7:
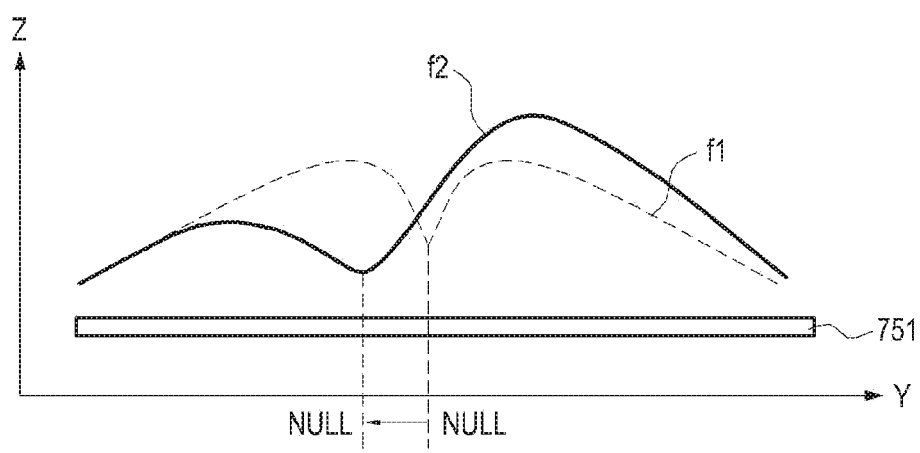
FIG. 7 shows graphs representing exemplary measurement values that were obtained by measuring magnetic fluxes generated by each conductive pattern unit of the electronic device according to various embodiments of the present disclosure.

FIG. 7 shows graphs representing exemplary measurement values that were obtained by measuring magnetic fluxes generated by each conductive pattern of the electronic device 400 (e.g., the electronic device 101) according to various embodiments of the present disclosure.

In FIG. 7, the graph indicated by "f1" represents a distribution of magnetic fields (e.g., magnetic fluxes, or magnetic flux density, B) when a current was applied to the flat coil which is vertically and horizontally symmetric. Magnetic fluxes generated by a symmetric flat coil (e.g., the flat coil 653 of FIG. 6) can be symmetric with reference to a predetermined point (e.g., a central point). As described above, by using the magnetic fluxes generated by the symmetric flat coil, various information items (e.g., transaction information) can be transmitted to/received from an external device (e.g., a POS terminal).

According to various embodiments, a reader header of a magnetic reading type POS terminal can receive transaction information or the like when a magnetic recording medium, such as a magnetic stripe, comes in contact therewith or when magnetic fluxes are generated within a recognition distance range of the reader header. In the magnetic reading type POS terminal, a magnetic recording medium, such as a magnetic stripe, (or a magnetic flux generating medium, such as a coil) should come in direct contact with the reader header or should be positioned within the recognition distance range of the reader header. The user can use such a magnetic recording medium (or the magnetic flux generating medium, such as a coil) while carrying it. For example, when magnetic fluxes of a level to be recognizable by the reader header are generated by the flat coil in a wide range to be recognizable by the reader header, the reader header can recognize and receive the information (e.g., transaction information) that is transmitted through the magnetic fluxes generated by the flat coil.

According to various embodiments, while the flat coil can be easily mounted in an electronic device that is carried by the user, the magnetic flux-generated area or the intensity of the generated magnetic fluxes can be restricted. For example, while the flat coil mounted in the electronic device can generate the magnetic fluxes in an area that is proportional to the size of the electronic device, the intensity of the magnetic fluxes can be restricted in consideration of power consumption, interference with an external transceiver (e.g., an antenna) or the like. In addition, in a vertically and horizontally symmetric coil, a null point or section (indicated by "NULL" in FIG. 7) is formed in the central area so that the transaction information or the like may not be smoothly transmitted. The "null section" can refer to a point, an area, and/or a section in which the fluxes generated according to a current flow of a flat coil are offset with each other so that the intensity of the magnetic fluxes (or the overall magnetic flux density, B) is relatively weaker than other areas.

According to various embodiments, the electronic device 400 (e.g., the electronic device 101) can shift or suppress the null section NULL or can generate stronger magnetic fluxes (higher magnetic flux densities) by variously designing, in forming the conductive patterns 553a, 553b, and 553c on a flat coil, for example, conductive pattern unit 505 of FIG. 5B, a partial thickness (or width) of the conductive lines that form the conductive patterns 553a, 553b, and 553c, arrangement areas of the conductive lines, the number of conductive lines, or the like. For example, referring to the graph indicated by "f2" in FIG. 7, the null section NULL can be shifted leftward from the central portion on the base member 751 (e.g., the base member 551 of FIG. 5A), and stronger fluxes (higher flux densities) can be generated between the null section NULL and the right end of the base member 751. Various embodiments related to the structure of the conductive patterns will be described in more detail with reference to FIG. 12.

Figure 8:
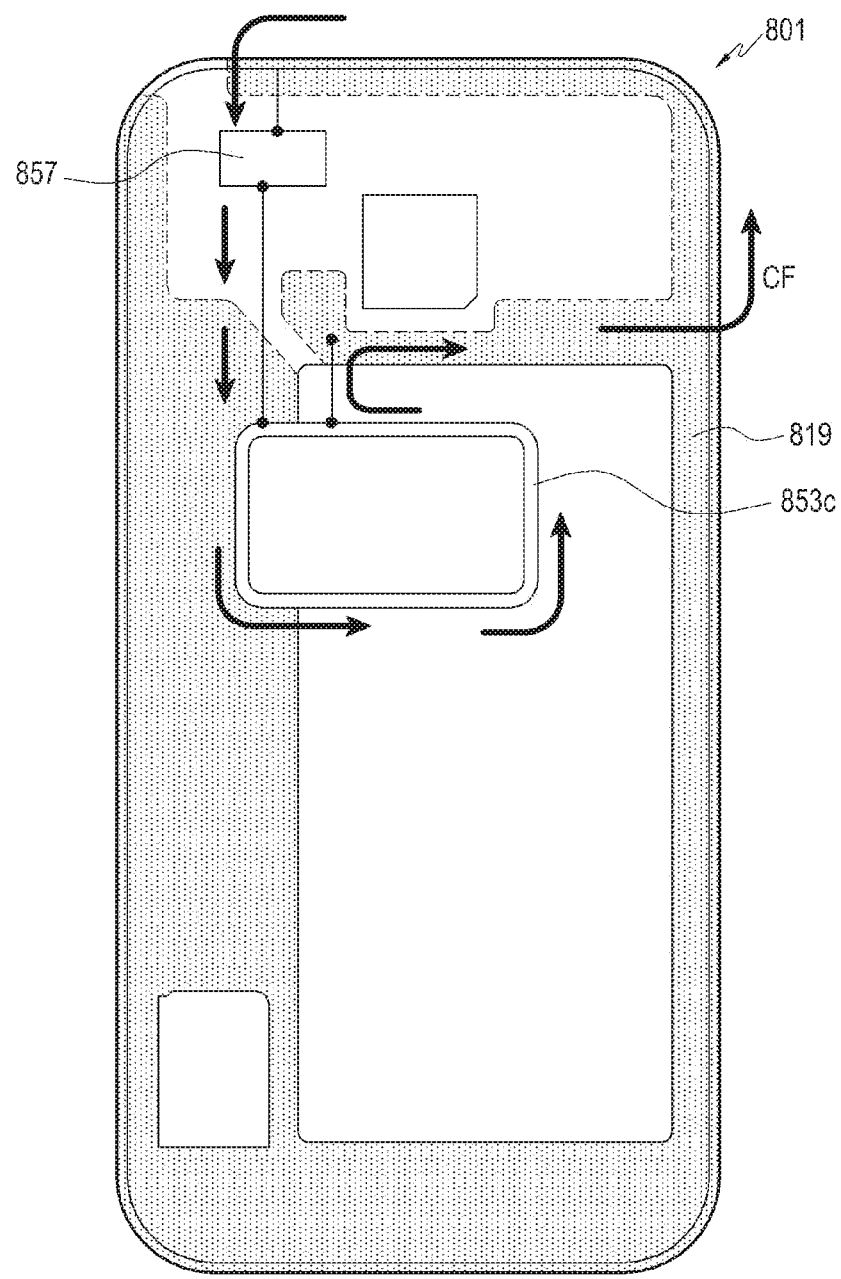
FIGS. 8 and 9 are views illustrating application forms of a conductive pattern unit of an electronic device according to one of various embodiments of the present disclosure.
Figure 9:
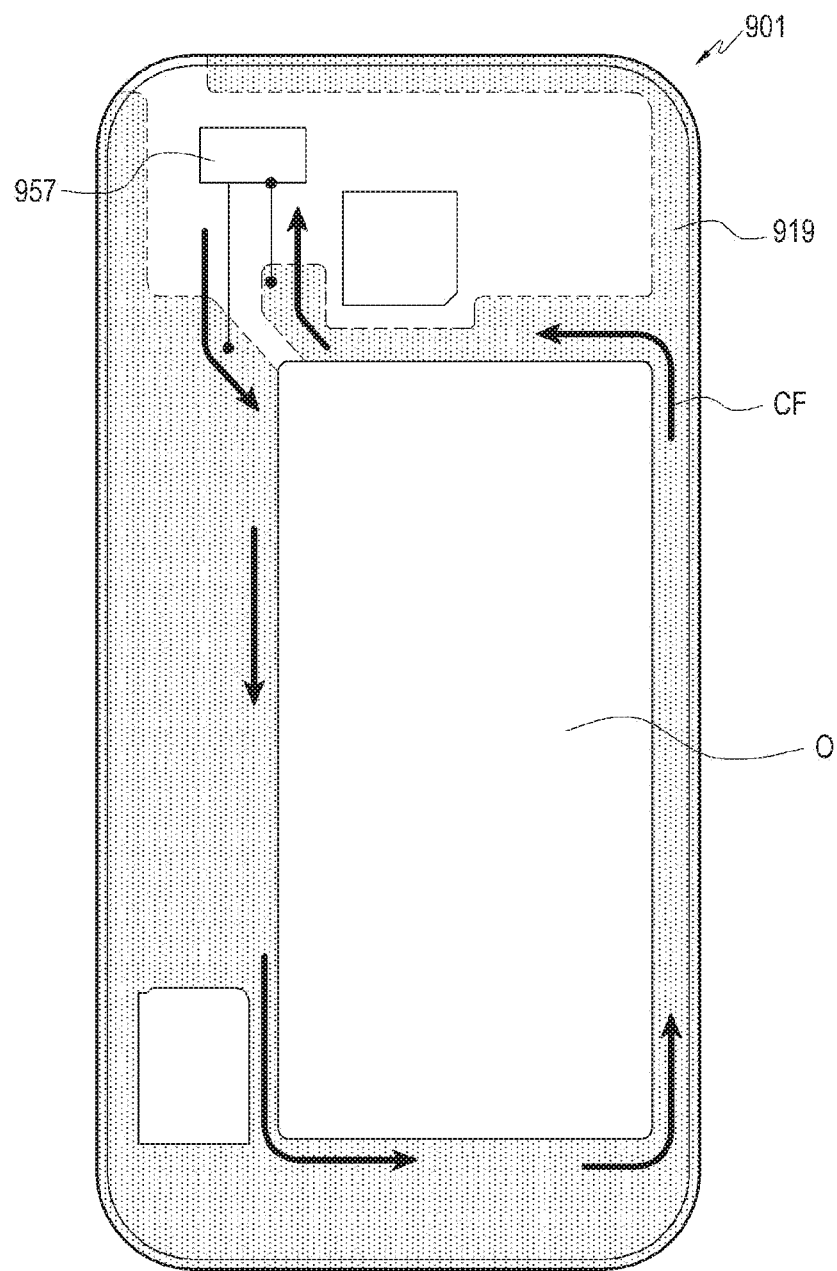

FIGS. 8 and 9 are views illustrating application forms of a conductive pattern unit of an electronic device 400 according to one of various embodiments of the present disclosure (e.g., the electronic device 101 illustrated in FIG. 1).

Referring to FIG. 8, conductive materials arranged on a housing 801 of the electronic device (e.g., the housing 501 of FIG. 5A) can be connected to a conductive pattern (e.g., the above-mentioned third conductive pattern 553c of FIG. 5A) to form a current flow CF path.

According to various embodiments, at least a part of the housing 801 (hereinafter, referred to as a "conductive member 919") of the electronic device can be formed of a conductive material, and one point of the conductive member 919 can be connected to the control circuit 857 and another point can be connected to one of the conductive patterns (e.g., the third conductive pattern 853c). The control circuit 857 can apply a signal current to the third conductive pattern 853c, and by the signal current applied to the third conductive pattern 853c, a current flow CF path can be formed along the third conductive pattern 853c and a part of the conductive member 819. For example, the third conductive pattern 853c and a part of the conductive member 819 can be formed by a flat coil. According to various embodiment, the conductive member 819 can include a slit (not illustrated) that is formed across a part of the conductive member 819 so that the conductive member 819 can have an electric characteristic, such as an electric length (e.g., an electric length corresponding to a resonance frequency) or an inductance.

According to another embodiment, the loop antenna (coil antenna) can take a form that interconnects a pattern implemented on an FPCB and a mechanical element of the electronic device (terminal). At least a part of the exterior of the electronic device (terminal) can include a conductive material (e.g., a metal) that allows a current to flow there through. In addition, when at least some portions of the exterior of the electronic device (terminal) are separated (is not electrically connected), the portions can be electrically interconnected through a connection element. The connection element can be a passive element, such as an inductor or a capacitor, or a structure that contains a conductive material.

Referring to FIG. 9, in housing 901 of the electronic device (e.g., the electronic device 400 illustrated in FIG. 4A), a conductive pattern (e.g., a flat coil) can be formed only by a part of the conductive member 819. For example, the conductive member 819 can be formed along at least a part of the circumference of an opening O formed on the housing 901, and as the control circuit 957 applies a signal current to the conductive member 919, a current flow CF path can be formed along the circumference of the opening O. For example, apart from the above-described conductive pattern unit (e.g., the conductive pattern unit 505), a flat coil can be formed using the conductive member 919 that forms a part of the housing 901. According to various embodiments, since the conductive member 919 includes a slit (not illustrated) that is formed across the conductive member 919, the conductive member 919 can have an electric character, such as an electric length (e.g., an electric length corresponding to a resonance frequency) or an inductance.

Although not illustrated in the drawings, the loop antenna can be connected to a component including a coil (or an inductor) within the electronic device. For example, a coil (or an inductance) that is formed within a component of the electronic device, such a speaker, a motor, or a pen can be electrically connected to the loop antenna so as to be used as a loop antenna.

According to still another embodiment, the loop antenna can be formed on a display panel unit. The loop antenna can be implemented in the lower end of the cover glass using a transparent electrode.

While FIGS. 8 and 9 illustrate the current flow path CF in one direction (e.g., the counterclockwise direction), the current flow path can be formed to be different from the direction illustrated in FIGS. 8 and 9 according to a signal current applied by the control circuit 857 or 957. In addition, the current flow path and the direction thereof can be more variously changed in consideration of, for example, the position where the conductive material is disposed on the housing 801 or 901.

Figure 10:
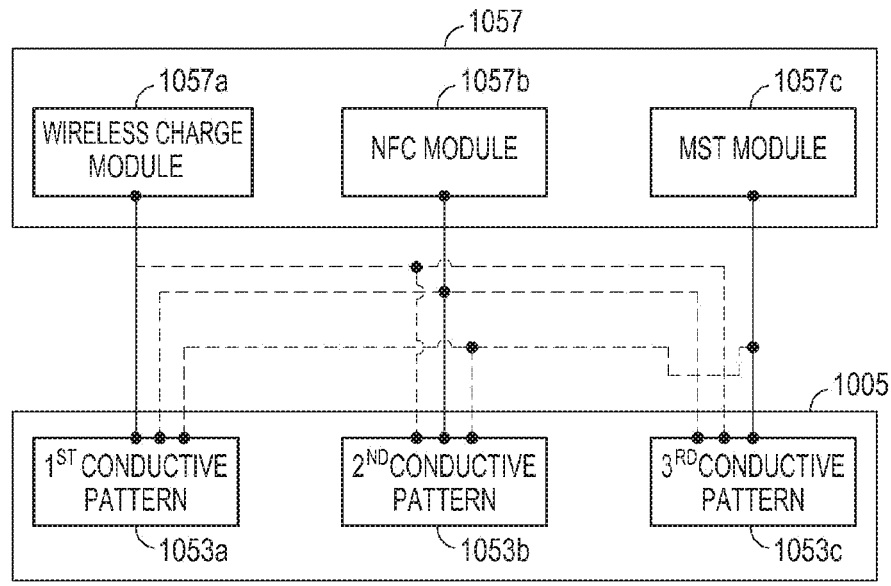
FIG. 10 is a block diagram for describing configurations of a conductive pattern unit and a control circuit in an electronic device according to one of various embodiments of the present disclosure.

FIG. 10 is a block diagram for describing configurations of a conductive pattern unit 1005 and a control circuit 1057 in an electronic device 400 (e.g., the electronic device of FIG. 1) according to one of various embodiments of the present disclosure.

Referring to FIG. 10, the control circuit 1057 can include at least one of a wireless charge module 1057a, an NFC module 1057b, and an MST module 1057c. The control circuit of FIG. 10 can be the control circuit 857 of FIG. 8. Each of the wireless charge module 1057a, the NFC module 1057b, and the MST module 1057c can take an independent IC chip form, and two or three modules can be integrated and formed in an IC chip. For example, in a specific embodiment of the present disclosure, the control circuit 1057 is described with reference to an example in which the wireless charge module 1057a, the NFC module 1057b, and/or the MST module 1057c are integrated. However, it shall be noted that it does not mean that the control circuit 1057 is an IC chip in which the wireless charge module 1057a, the NFC module 1057b, and/or the MST module 1057c are integrated. The conductive pattern unit 1005 can include at least one of the first to third conductive patterns 1053a, 1053b, and 1053c.

According to various embodiments, the wireless charge module 1057a can wirelessly receive power through the conductive pattern unit 1005 and can charge a battery (e.g., the battery 443 of FIG. 4A). The wireless charge module 1057a can be individually or selectively connected to each of the first to third conductive patterns 1053a, 1053b, and 1053c through a switch member (not illustrated). For example, between the wireless charge module 1057a and at least one of the first to third conductive patterns 1053a, 1053b, and 1053c, the switch member is disposed so as to connect at least one of the first to third conductive patterns 1053a, 1053b, and 1053c to the wireless charge module 1057a. On a line that interconnects the switch member and each of the first to third conductive patterns 1053a, 1053b, and 1053c, a matching circuit or the like can be disposed to make each of the first to third conductive patterns 1053a, 1053b, and 1053c suitable for wireless power transmission/reception.

According to various embodiments, the NFC module 1057b can conduct near field communication through the conductive pattern unit 1005. The NFC module 1057b can be connected to each of the first to third conductive patterns 1053a, 1053b, and 1053c through a switch member (not illustrated). On a line that interconnects the switch member and each of the first to third conductive patterns 1053a, 1053b, and 1053c, a matching circuit or the like can be disposed to make each of the first to third conductive patterns 1053a, 1053b, and 1053c suitable for near field communication.

According to various embodiments, the MST module 1057c can generate magnetic fluxes through the conductive pattern unit 1005. For example, the MST module 1057c can generate magnetic fluxes through at least one of the first to third conductive patterns 1053a, 1053b, and 1053c so as to transmit information (e.g., transaction information) to an external device (e.g., a magnetic recording type POS terminal). For example, the electronic device (e.g., the electronic device 101 of FIG. 1) can periodically transmit an MTS signal, in which transaction information is included, several times through the MST module. For example, the MST signal can include transaction information that is included in at least a part of a credit card.

According to various embodiments, the MST module 1057c can be connected to each of the first to third conductive patterns 1053a, 1053b, and 1053c through a switch member (not illustrated). On a line that interconnects the switch member and each of the first to third conductive patterns 1053a, 1053b, and 1053c, a matching circuit or the like can be disposed to allow magnetic fluxes to be generated using the first to third conductive patterns 1053a, 1053b, and 1053c.

According to various embodiments, when the MST module 1057c is in the state of being connected to the third conductive pattern 1053c through the switch member, the wireless charge module 1057a or the NFC module 1057b can be controlled not to be connected to the third conductive pattern 1053c. When the third conductive pattern 1053c is in the state of being connected to the NFC module 1057b through the switch member, the MST module 1057c can be controlled to be connected to the first conductive pattern 1053a and/or the second conductive pattern 1053b when a condition at which magnetic fluxes should be generated occurs. In this way, the control circuit 1057 can select and operate a suitable one among the first to third conductive patterns 1053a, 1053b, and 1053c according to an operation condition or a command that occurs in the electronic device.

Figure 11:
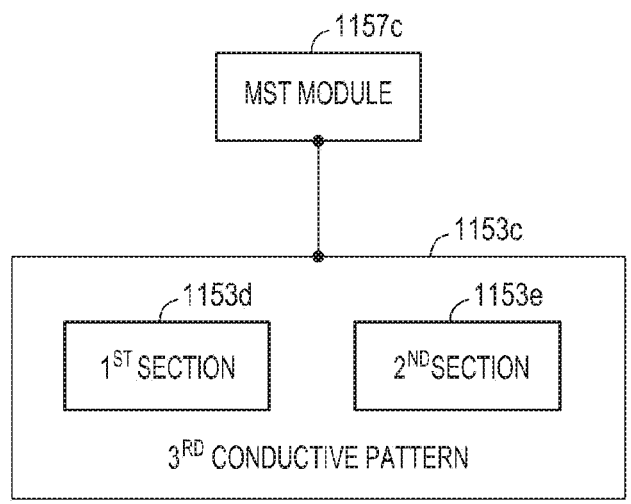
FIG. 11 is a block diagram for describing a configuration for transmitting transaction information from an electronic device according to one of various embodiments of the present disclosure.

FIG. 11 is a block diagram for describing a configuration for transmitting transaction information from an electronic device 400 according to one of various embodiments of the present disclosure (e.g., the electronic device 101 of FIG. 1).

In various embodiments of the present disclosure, a configuration for generating magnetic fluxes using the above-mentioned conductive pattern 1153c (e.g., the third conductive pattern 553c illustrated in FIG. 5A or the like) will be described. However, the description will not limit the present disclosure, and the configuration, the operation, or the like of the third conductive pattern disclosed in various embodiments to be described later can be implemented through the first conductive pattern 553a and/or the second conductive pattern 553b illustrated in FIG. 5A or the like.

Referring to FIG. 11, a conductive pattern 1153c according to various embodiments (e.g., the third conductive pattern 553c illustrated in FIG. 5A or the like) can be formed by a plurality of turns of a single conductive line that is wound in a polygonal shape or extends, and can include first and second sections 1153d and 1153e that include conductive lines having different specifications, respectively.

Figure 12:
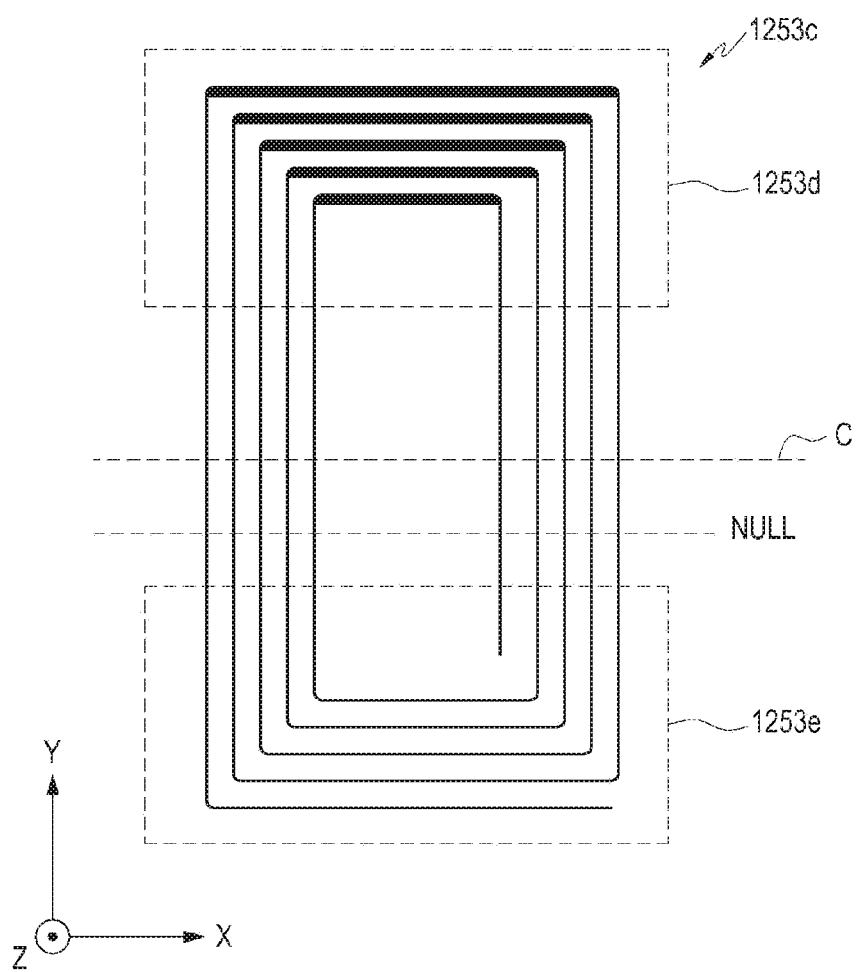
FIG. 12 is a plan view illustrating an exemplary conductive pattern for transmitting transaction information in an electronic device according to various embodiments of the present disclosure.

FIG. 12 is a plan view illustrating an exemplary conductive pattern 1253c for transmitting transaction information in an electronic device according to various embodiments of the present disclosure (e.g., the electronic device 101 of FIG. 1).

Referring to FIG. 12, the conductive coil portions disposed in the first section 1253d in the area where the conductive line forming the conductive pattern 1253c (e.g., the third conductive pattern 553c illustrated in FIG. 5A) is arranged can have a width wider than that of the conductive line portions arranged in the second section 1253e. For example, in FIG. 12, the third conductive pattern 1253c (e.g., the third conductive pattern 553c illustrated in FIG. 5A or the like) can be formed by a flat coil having a vertically asymmetric shape.

According to one embodiment, the conductive pattern 1253c can be a loop antenna. The conductive pattern 1253c can be designed to have different intensities of magnetic fields from area to area. A shadow area of the conductive pattern (e.g., the above-mentioned null section NULL), which occurs within the electronic device (terminal), can be shifted. For example, the width of the antenna pattern (e.g., the conductive line) of the first section 1253d can be implemented to be wider than the antenna pattern arranged in the second section 1253e. As a result, when a current flows, the resistance of the area of the first section 1253d becomes lower than that of the second section 1253e, and thus, the intensity of the magnetic field generated in the first section 1253d can be stronger than the intensity of the magnetic field generated in the second section 1253e. In the case where the intensity of the magnetic field generated in the first section 1253d is stronger than the intensity of the magnetic field generated in the second section 1253e, the shadow area of the loop antenna can be formed in the lower end portion of the electronic device (terminal) rather than in the central portion of the electronic device (terminal). For example, as in FIGS. 28 to 31, while the transaction is being performed, the electronic device (e.g., the electronic device 101 of FIG. 1) can indicate an MST recognition range (e.g., the "area between the center to the upper end of the electronic device (terminal)") so as to cause the user to bring the MST recognition range close to a reader so that the recognition rate of the MST can be improved. According to one embodiment, even if the thickness of the pattern in the first section 1253d area is the same, separate conductive patterns can be formed in the lower end of the first section 1253d area, and thus, the intensity of the generated magnetic fluxes can be implemented more strongly.

Figure 13:
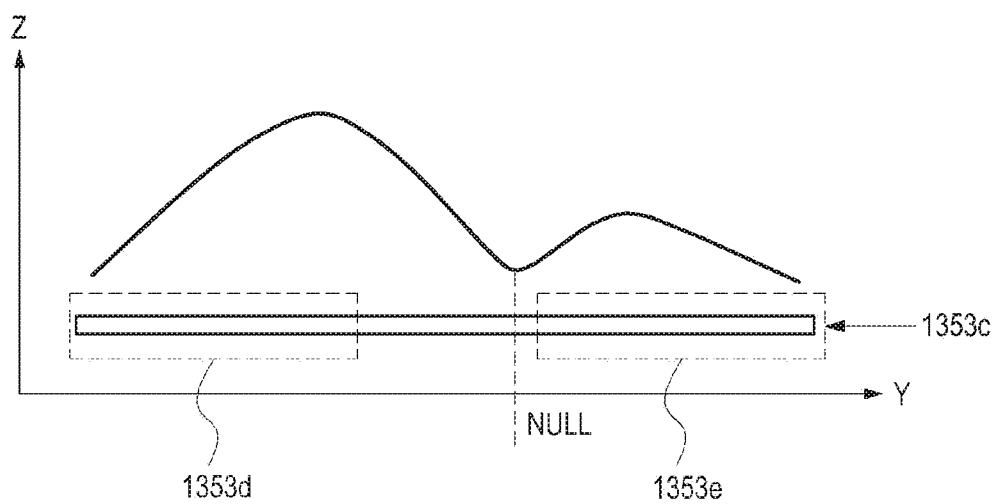
FIG. 13 is a graph representing exemplary measurement values obtained by measuring magnetic fluxes generated by the conductive pattern illustrated in FIG. 12.

FIG. 13 is a graph representing exemplary measurement values obtained by measuring magnetic fluxes generated by the conductive pattern illustrated in FIG. 12.

Referring to FIG. 13, the magnetic fluxes generated by the conductive pattern 1353c (e.g., the third conductive pattern 553c illustrated in FIG. 5A or the like) can have an asymmetric shape. For example, the magnetic fluxes generated in the first section 1353d can be larger than the magnetic fluxes generated in the second section 1353e. In addition, as the magnetic fluxes radiated from the first section 1353d on the conductive pattern 1353c (e.g., the third conductive pattern 553c illustrated in FIG. 5A or the like) increases more and more, the null section NULL can be shifted to be offset to the direction where the second section 1353e is positioned from the central portion of the conductive pattern 1353c (e.g., the third conductive pattern 553c illustrated in FIG. 5A or the like).

According to various embodiments, as described above, in a vertically and horizontally symmetric flat coil, a null section occurs in the central portion, and symmetric magnetic fluxes are generated. When the flat coil illustrated in FIG. 12 is manufactured to be the same as the symmetric flat coil in terms of an arrangement area and the number of turns of the conductive line and the same signal current is applied thereto, the flat coil illustrated in FIG. 12 (e.g., the third conductive pattern 553c illustrated in FIG. 5A or the like) can generate magnetic fluxes of which the null section is shifted from the central portion to one side edge. Alternatively, it will be understood that the flat coil illustrated in FIG. 12 radiates magnetic fluxes from the first section to a wider area than the symmetric flat coil. Accordingly, compared to the symmetric flat coil, information (e.g., transaction information) can be easily transmitted to an external device (e.g., a magnetic reading type POS terminal) through the magnetic fluxes generated by the conductive pattern 1353c (e.g., the third conductive pattern 553c illustrated in FIG. 5A or the like).

FIGS. 14 to 18 are plan views illustrating various exemplary conductive patterns for transaction information transmission in the electronic device (e.g., the electronic device 101 of FIG. 1) according to one of various embodiments of the present disclosure, respectively.

Figure 14:
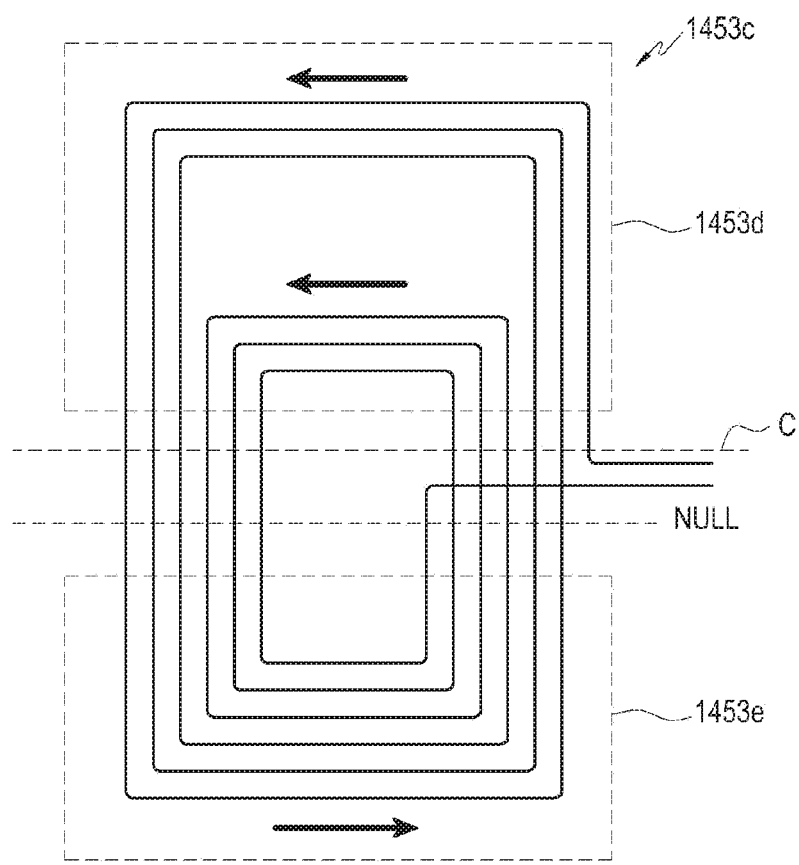
FIGS. 14 to 18 are plan views illustrating various exemplary conductive patterns for transaction information transmission in the electronic device according to one of various embodiments of the present disclosure, respectively.

Referring to FIG. 14, in arranging one conductive coil that forms the conductive pattern 1453c (e.g., the third conductive pattern 553c illustrated in FIG. 5A or the like), even if the conductive coil portions of the same number of turns are arranged in each of the first and second sections 1453d and 1453e, the conductive coil portions arranged in the first section 1453d can be arranged to be distributed in a wider area. For example, by forming the first section 1453d in an wider area than the second section 1453e, the null section NULL can be shifted from the central portion of the conductive pattern 1453c (e.g., the third conductive pattern 553c illustrated in FIG. 5A or the like) to one side (e.g., the lower side in FIG. 14), and more magnetic fluxes can be radiated from the first section 1453d.

Figure 15:
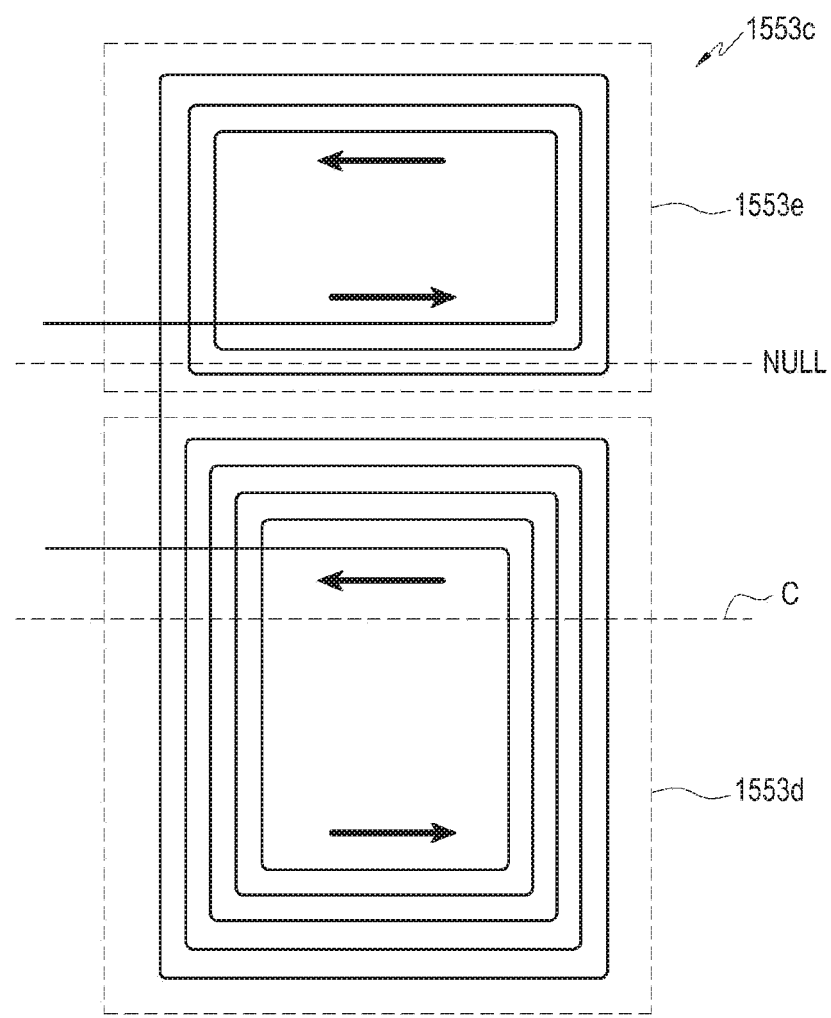

Referring to FIG. 15, in arranging one conductive line that forms the conductive pattern 1553c (e.g., the third pattern 553c illustrated in FIG. 5A or the like), a plurality of turns wound in the form of a coil can be arranged in each of the first and second sections 1553d and 1553e. The plurality of turns wound in the form of a coil in each of the first and second sections 1553d and 1553e can generate a current flow in the same direction (e.g., counterclockwise). According to a signal current applied to the conductive line that forms the third conductive pattern 1553c, the current generated in the first and second sections 1553d and 1553e can flow clockwise.

According to various embodiments, the coil arranged in the first section 1553d can be arranged to occupy a wider area and more turns compared to the coil arranged in the second section 1553e. For example, in the first section 1553d, the conductive line can be arranged to be wound five times, and in the second section 1553e, the conductive coil can be arranged to be wound three times. By setting the number of turns of the coil and the area in which the coil is arranged to be different from section to section, the null section NULL can be shifted from the central portion of the third conductive pattern 1553c (e.g., the third conductive pattern 553c illustrated in FIG. 5A or the like) to one side (e.g., upward in FIG. 15), and more magnetic fluxes can be radiated from the first section 1553d. In addition, according to one embodiment, even if the number of turns arranged in the first section 1553d and the number of turns arranged in the second section 1553e are the same, the null section can be formed on one side (e.g., the area between the null section and the third conductive pattern in FIG. 12) from the central portion of the third conductive pattern 1553c (e.g., the third conductive pattern 553c illustrated in FIG. 5A or the like). According to one embodiment, the null section formed according to the shape of FIG. 15 can be more widely distributed compared to the case where the areas occupied by respective sections are the same. That is, as described above, the position where the null section is formed and the area of the section where the magnetic fluxes are radiated can vary depending on the arrangement of the conductive pattern.

Figure 16:
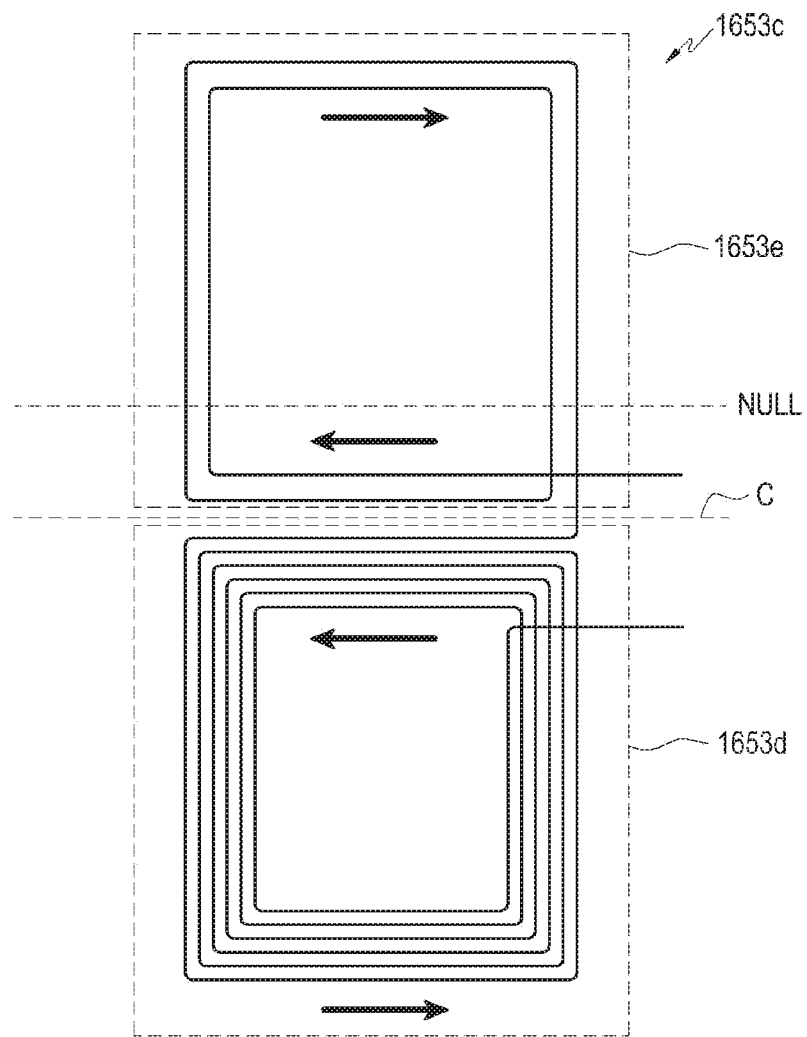

Referring to FIG. 16, in arranging one conductive line that forms the third conductive pattern 1653c (e.g., the third conductive pattern 553c illustrated in FIG. 5A or the like), a plurality of turns wound in the form of a coil can be arranged in each of the first and second sections 1653d and 1653e. The plurality of turns, which are wound in the form of a coil in each of the first and second sections 1653d and 1653e, can generate current flows in the opposite directions (e.g., clockwise and counterclockwise directions) in relation to each other, respectively. For example, when the current flow generated in the first section 1653d is formed in the counterclockwise direction, the current flow generated in the second section 1653e can be formed in the clockwise direction.

The coils, which are formed in the first and second sections 1653d and 1653e by the conductive line, respectively, can be formed in the same area while being different from each other in the number of wound times (e.g., the number of turns). For example, the coil arranged in the first section 1653d can have more turns, and the magnetic fluxes radiated from the first section 1653d can be more than the magnetic fluxes radiated from the second section 1653e. Accordingly, the null section NULL of the magnetic fluxes radiated by the conductive pattern 1653c (e.g., the third conductive pattern 553c illustrated in FIG. 5A or the like) can be shifted from the central portion of the conductive pattern 1653c (e.g., the third conductive pattern 553c illustrated or the like) to one side (e.g., the upper side in FIG. 16), and more magnetic fluxes can be radiated from the first section 1653d. In addition, according to one embodiment, when the number of turns of the coil arranged in the first section 1653d is the same as the number of turns arranged in the second section 1653e, the magnetic fluxes generated by the coils arranged in the plurality of sections can be further concentrated to the central portion C of the conductive pattern 1653c (e.g., the third conductive pattern 553c illustrated in FIG. 5A or the like) so that the recognition rate of the MST module can be enhanced. That is, as described above, depending on the arrangement of the conductive patterns, the null section forming position and the area of the magnetic flux radiation section can be differently formed.

Figure 17:
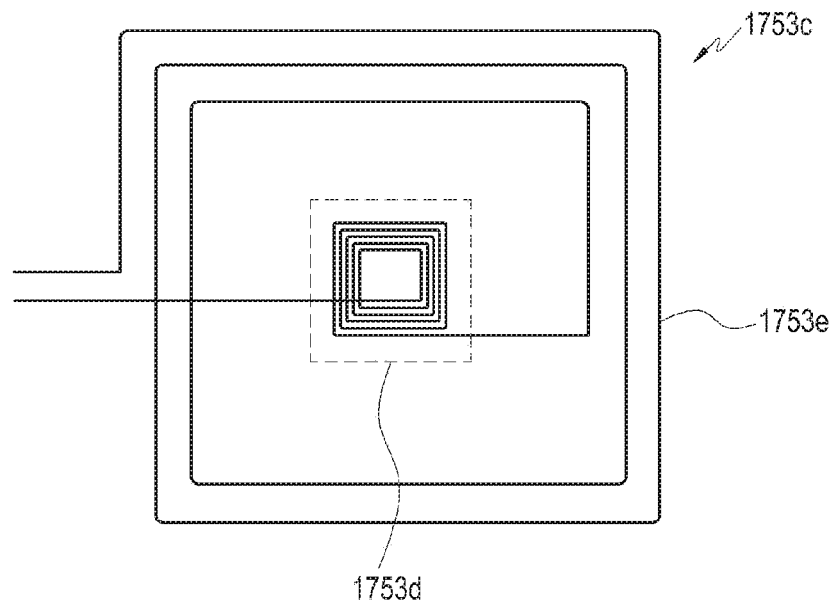
Figure 18:
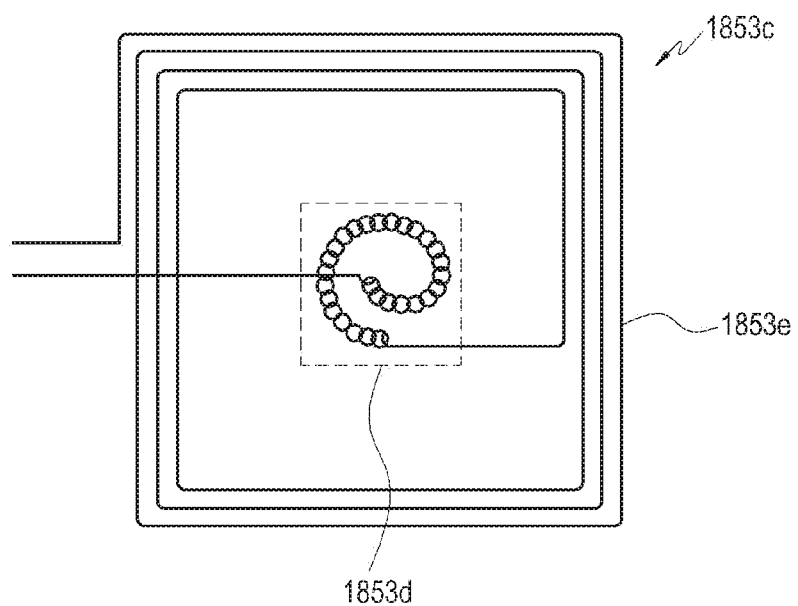

Referring to FIGS. 17 and 18, the conductive pattern 1753c or 1853c (e.g., the third conductive pattern illustrated in FIG. 5A or the like) can be formed in the form of a coil. For example, the first section 1753d or 1853d is arranged in the central portion and the second section 1753e or 1853e can be arranged to enclose the periphery of the first section 1753d or 1853d. The first section 1753d or 1853d is formed to occupy a smaller area than the second section 1753e or 1853*e*, but can include more conductive line portions than the second section 1753*e* or 1853*e*. For example, the first section 1753*d* or 1853*d* can include more conductive line portions in a narrow area or space, like a solenoid coil, so that the first section 1753*d* or 1853*d* can radiate more magnetic fluxes than a flat coil (e.g., a coil formed by conductive lines in the second section). For example, the magnetic fluxes radiated by the second section 1753*e* or 1853*e* can be horizontally symmetric with reference to the central portion, and the null section can be formed in the central portion. The first section 1753*d* or 1853*d* can be arranged in the central portion of the second section 1753*e* or 1853*e* and can radiate strong magnetic fluxes to compensate the null section of the magnetic fluxes formed by the second section 1753*e* or 1853*e*. For example, each of the third conductive patterns 1753*c* or 1853*c* illustrated in FIGS. 17 and 18 can generate magnetic fluxes of which the intensity increases from the peripheral edge toward the central portion.

The shapes of the conductive patterns described in the above-described various embodiments can be used for forming the first conductive pattern 553*a* and/or the second conductive pattern 553*b* illustrated in FIG. 5A or the like. According to another embodiment, the present disclosure is not necessarily limited to the conductive patterns of the above-described various embodiments (e.g., the third conductive pattern 553*c* illustrated in FIG. 5A or the like), and the conductive patterns can be variously formed according to a direction, to which it is desired to shift the null section and/or an area in which it is desired to form a stronger magnetic field and/or magnetic fluxes by shifting the null section.

As described above, according to various embodiments of the present disclosure, the conductive patterns (e.g., the above-mentioned third conductive pattern 153*c*) can provide a plurality of current flow paths. For example, first and second current flow paths can be provided and it is possible to design such that the directions of the currents flowing in the first and second paths are the same. According to various embodiments of the disclosure, the conductive patterns can further provide a third current flow path, and according to the direction and intensity of the current flowing in each of the first to third paths, and the arrangement of the conductive lines, each of which forms one of the path, the null section can be shifted to be close to one side of the conductive patterns (e.g., to the lower side of the conductive patterns) and a stronger magnetic field and/or magnetic fluxes can be generated in the other side (e.g., in the upper portion and/or central portion of the conductive patterns).

Figure 19:
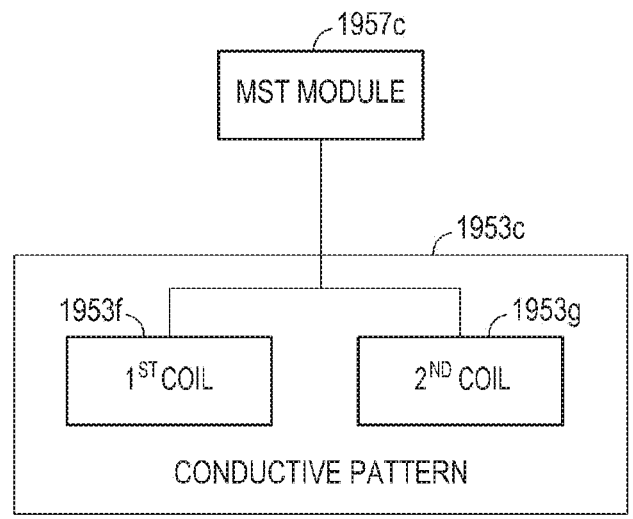
FIG. 19 illustrates a block diagram for describing another exemplary configuration for transaction information transmission of an electronic device according to one of various embodiments of the present disclosure.

FIG. 19 illustrates a block diagram for describing another exemplary configuration for transaction information transmission of an electronic device 400 according to one of various embodiments of the present disclosure (e.g., the electronic device 101 of FIG. 1).

Referring to FIG. 19, according to various embodiments, a conductive pattern 1953*c* (e.g., the third conductive pattern 553*c* illustrated in FIG. 5A or the like) can include a plurality of coils 1953*f* and 1953*g*, the same signal can be applied to each of the coils from a control circuit (e.g., the MST module 1957*c*). For example, the third conductive pattern 1953*c* can include first and second coils 1953*f* and 1953*g* that are arranged to be independent from each other, the same signals can be simultaneously applied to the first and second coils 1953*f* and 1953*g* from the MST module 1957*c*. The first and second coils 1953*f* and 1953*g* can be arranged to be adjacent to each other.

According to various embodiments, when the conductive pattern 1953*c* (e.g., the third conductive pattern 553*c* illustrated in FIG. 5A or the like) is formed in a multi-layer circuit board, (e.g., a flexible printed circuit board, the first and second coils 1953*f* and 1953*g* can be formed in the same layer or different layers (or surfaces) of the flexible printed circuit board. According to various embodiments, when the first and second coils 1953*f* and 1953*g* are formed in different layers of the flexible printed circuit board, the first and second coils 1953*f* and 1953*g* can be arranged to be adjacent to each other or to partially overlap with each other when viewed from the upper side of the flexible printed circuit board.

FIGS. 20 to 23 are plan views illustrating various exemplary conductive patterns for transaction information transmission in an electronic device 400 according to one of various embodiments of the present disclosure (e.g., the electronic device 101), respectively.

Figure 20:
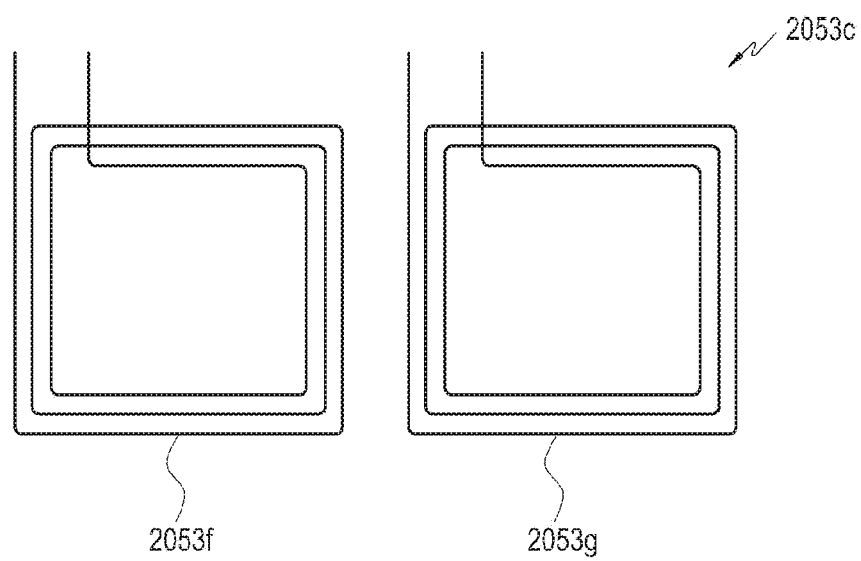
FIGS. 20 to 23 are plan views illustrating various exemplary conductive patterns for transaction information transmission in an electronic device according to one of various embodiments of the present disclosure, respectively.

Referring to FIG. 20, the first and second coils 2053*f* and 2053*g*, to which the same signals are simultaneously applied from the MST module (e.g., the MST module 1957*c* of FIG. 19) can be arranged to have the same specifications (e.g., such that the conductive lines have the same number of turns and occupy the same area while being wound in the same direction). When the same signals are simultaneously applied to the first and second coils 2053*f* and 2053*g*, the first and second coils 2053*f* and 2053*g* generate current flows in the same direction (e.g., in the clockwise direction). The conductive pattern 2053*c* (e.g., the third conductive pattern 553*c* illustrated in 5A or the like), which is formed of the first and second coils 2053*f* and 2053*g*, can generate magnetic fluxes of which the null section is positioned to be offset to one side or the other side depending on the magnetic fluxes generated by each of the first and second coils 2053*f* and 2053*g*.

Figure 21:
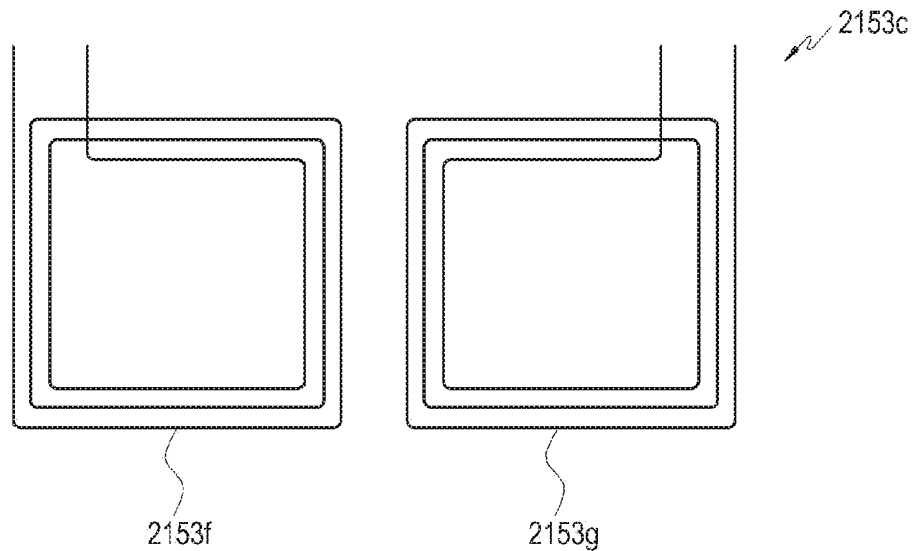

Referring to FIG. 21, the first and second coils 2153*f* and 2153*g*, which receive the same signals simultaneously applied from the MST module (e.g., the MST module 1957*c* of FIG. 19), can be formed such that the conductive lines are wound in the opposite directions while being arranged to have the same number of turns and to occupy the same area. When the same signals are simultaneously applied to the first and second coils 2153*f* and 2153*g*, the first and second coils 2153*f* and 2153*g* can generate current flows in the opposite directions in relation to each other. For example, when the first coil 2153*f* generates a current flow in the clockwise direction, the second coil 2153*g* can generate a current flow in the counterclockwise direction. The conductive pattern 2153*c* (e.g., the third conductive pattern 553*c* illustrated in FIG. 5A or the like) formed of the first and second coils 2153*f* and 2153*g* can generate magnetic fluxes of which the null section is positioned to be offset to one side or the other side according to the magnetic fluxes generated by each of the first and second coils 2153*f* and 2153*g*.

Figure 22:
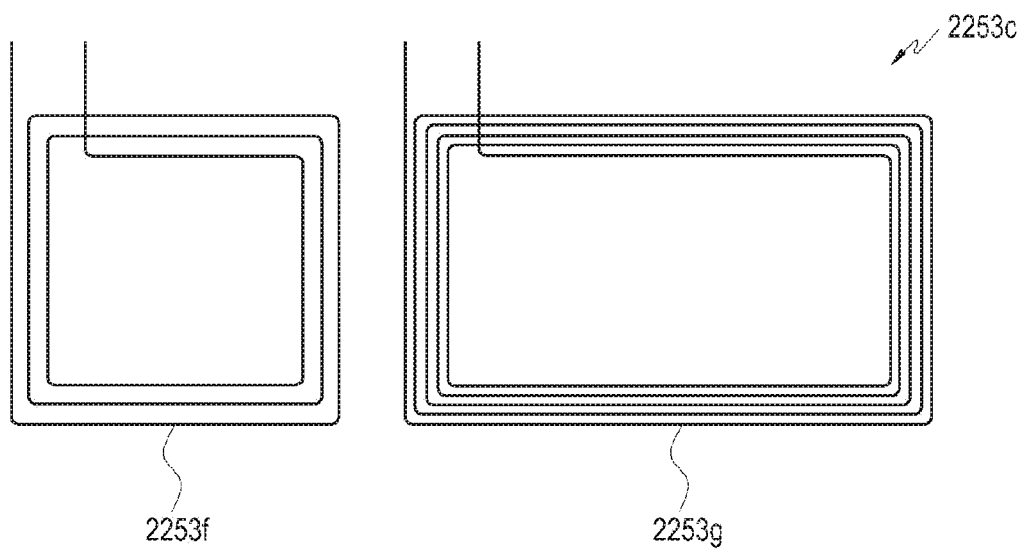

Referring to FIG. 22, the first and second coils 2253*f* and 2253*g*, which receive the same signals simultaneously applied from the MST module (e.g., the MST module 1957*c* of FIG. 19), can be arranged to have different numbers of turns and to occupy different areas. When the same signals are simultaneously applied to the first and second coils 2253*f* and 2253*g*, the second coil 2253*g*, which is formed to occupy a larger area while having more turns, can radiate more magnetic fluxes than the first coil 2253*f*. For example, when the same signals are applied to the first and second coils 2253*f* and 2253*g* arranged as illustrated in FIG. 22, respectively, the null section generated by the conductive pattern 2253*c* (e.g., the third conductive pattern 553*c* illustrated in FIG. 5A or the like) formed of the first and second coils 2253f and 2253g can be formed to be offset to the left side from the central portion.

According to various embodiments, the first and second coils forming the conductive pattern (e.g., the third conductive pattern 553c illustrated in FIG. 5A or the like) can take the form of a flat coil arranged in the same plane, but can take the form of a solenoid coil. For example, referring to FIG. 23, the conductive lines forming the first coil 2353f can take a form in which they are wound on the outer peripheral surface of the housing 2301 of the electronic device 2300 while being arranged to extend in the longitudinal direction of the electronic device 2300, while the conductive lines forming the second coil 2353g can take a form in which they are wound on the outer peripheral surface of the housing 2301 of the electronic device 2300 while being arranged to extend in the width direction of the electronic device 2300.

Figure 23:
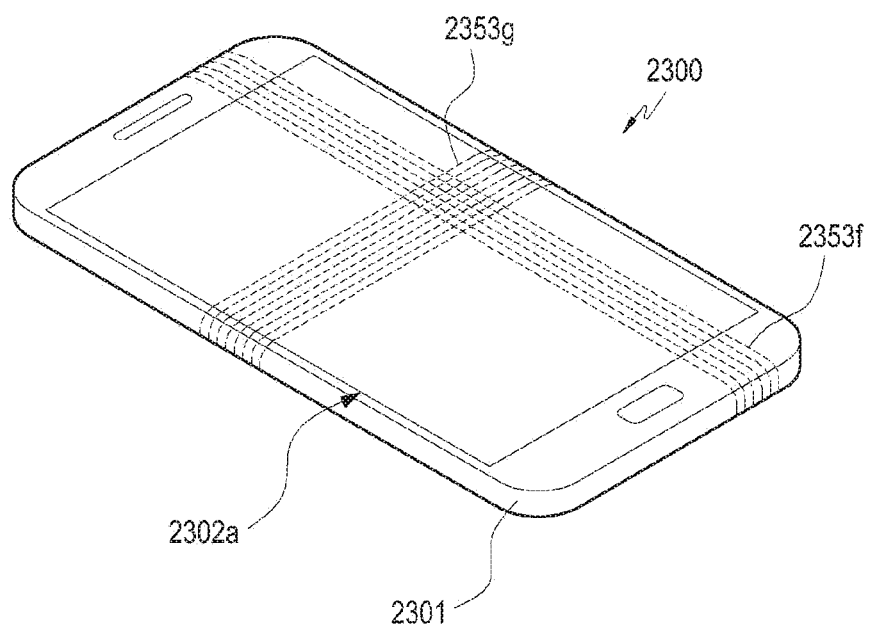

According to various embodiments of the present disclosure, when the conductive pattern (e.g., the third conductive pattern 553c illustrated in FIG. 5A or the like) takes the form of a flat coil, the magnetic fluxes generated by the conductive pattern (e.g., the third conductive pattern 553c illustrated in FIG. 5A or the like) can be radiated toward one surface (e.g., the rear surface) of the electronic device 101 or the other surface (e.g., the front surface) of the electronic device 101. Alternatively, according to various embodiments of the present disclosure, when the third conductive pattern takes the form of a solenoid coil as illustrated in FIG. 23, the magnetic fluxes can be radiated in more directions (e.g., in the directions toward the upper end, lower end and/or side) compared to the case where the third conductive pattern takes the form of a flat coil. When the first and second coils are formed as flat coils, any one of the conductive patterns (e.g., the third conductive pattern 553c illustrated in FIG. 5A or the like) illustrated in FIGS. 12 to 18 can be included.

While FIG. 23 illustrates the first and second coils 2353f and 2353g by dotted lines for the convenience of illustration and description, the conductive lines that form the first and second coils 2353f and 2353g can be formed of a transparent material (e.g., an indium-tin oxide). For example, even if the first and coils 2353f and 2353g are arranged on the display device 2302a, it is possible to prevent image quality from being deteriorated FIGS. 24A to 24F are views for another exemplary configuration for transaction information transmission in an electronic device according to one of various embodiments of the present disclosure (e.g., the electronic device illustrated in FIG. 1).

Figure 24A:
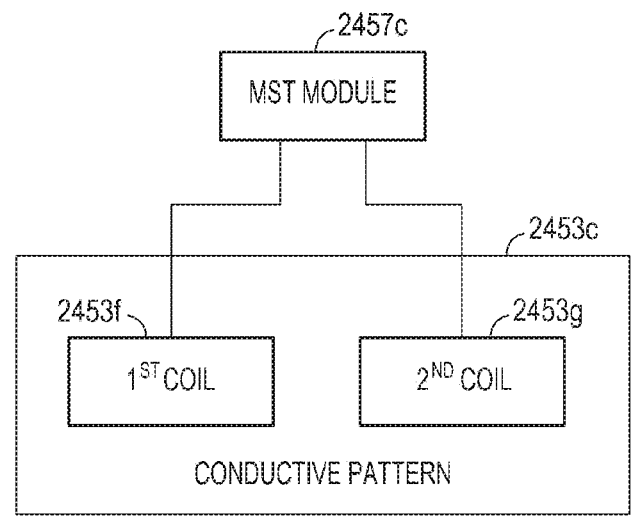
FIGS. 24A to 24F are block diagrams for describing still another exemplary configuration for transaction information transmission in an electronic device according to various embodiments of the present disclosure.
Figure 24A:
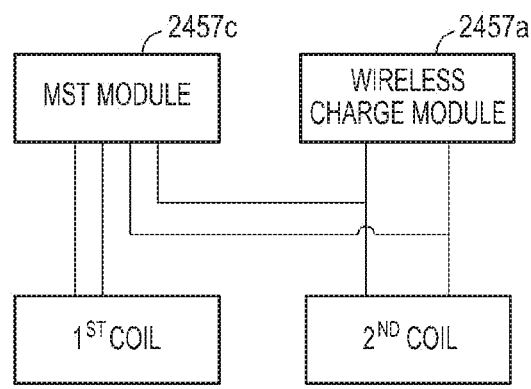

Referring to FIG. 24A(a), according to various embodiments, the conductive pattern 2453c (e.g., the third conductive pattern 553c illustrated in FIG. 5A or the like) can include a plurality of coils 2453f and 2453g, and a signal can be independently applied to each of the coils 2453f and 2453g from a control circuit (e.g., the MST module 2457c). For example, the conductive pattern 2453c can include first and second coils 2453f and 2453g which are independently arranged in relation to each other, and the same signals or different signals can be simultaneously applied to the first and second coils 2453f and 2453g from the MST module 2457c. The first and second coils 2453f and 2453g can be arranged to be adjacent to each other. The conductive pattern 2453c (e.g., the third conductive pattern 553c illustrated in FIG. 5A or the like) can generate magnetic fluxes in variously different distributions according to a time point when a signal is applied to each of the first and second coils 2453f and 2453g, a time interval for which a signal application state is maintained, or the direction of a signal current.

According to various embodiments of the present disclosure, the electronic device can sense an alignment state with an external device and can differently set the time point when a signal is applied to each of the first and second coils 2453f and 2453g, a time interval for which a signal application state is maintained, or the direction of a signal current. For example, according to the repetition of an action that brings the electronic device 2400 (illustrated in FIG. 24D) to the external device or the moving direction of the electronic device 2400, according to an alignment angle and distance between the electronic device 2400 and the external device, or according the location where the electronic device 2400 is gripped by the user, the rotation of the electronic device 2400, or the inclined angle of the electronic device 2400, a signal can be applied to each of the first and second coils 2453f and 2453g such that magnetic fluxes, which are easily transmitted to the external device, can be generated.

For example, first and second signals, which are different from each other, can be applied to the first and second coils 2453f and 2453g, respectively. In consideration of the relative positions or the like between the electronic device 2400 and the external device, the first and second signals can be applied, simultaneously, sequentially, alternately, and/or partially overlapping in time, to the first and second coils 2453f and 2453g, respectively. The first and second signals can be equal to each other.

According to various embodiments, the first and second signals can cause the first and second coils 2453f and 2453g to generate current flows in the same direction or in different directions. For example, when the first signal is applied to the first coil 2453f for a predetermined length of time to generate a current flow in a first direction, the second signal may not be applied to the second coil 2453g. In another time interval, when the second signal is applied to the second coil 2453g to generate a current flow in a second direction, the first signal may not be applied to the first coil 2453f. The first and second directions of the current flows, which are generated by the first and second coils 2453f and 2453g, respectively, can be equal to each other or different from each other.

According to various embodiments, the control circuit (e.g., the control circuit 857 of FIG. 8) can variously control the time points when the first and second signals as described above are applied, an application pattern, a time interval for which the application state is maintained, the direction of the signal current, etc. according to the alignment state between the electronic device 100 and the external device and/or whether the information transmission is successful.

According to various embodiments, the conductive pattern 2453c (e.g., the third conductive pattern 553c illustrated in FIG. 5A or the like) includes a plurality of coils, and the shapes and arrangements of the coils forming the conductive pattern 2453c (e.g., the third conductive pattern 553c illustrated in FIG. 5A or the like) in the structure where the signal is independently applied to each of the coils can be similar to those of the embodiments described above with reference to FIGS. 19 to 23. Accordingly, detailed descriptions for the shapes or arrangements of the coils forming the conductive patterns 2453c (e.g., the third conductive pattern 2453c illustrated in FIG. 5A or the like) according to the present embodiments will be omitted. According to various embodiments, each of the above-described first and second coils 2453f and 2453g can be formed of a part or the entirety of any one of the conductive patterns of the embodiments described above with reference to FIGS. 5B to 18. According to various embodiments, each of the above-described first and second coils 2453f and 2453g can be formed of any one of the conductive patterns of the embodiments described above with reference to FIGS. 5B to 18 or a combination of two or more of the conductive patterns.

Referring to FIG. 24A(b), the plurality of coils can include a first coil (e.g., the first coil 2453f of FIG. 24A(a)) and a second coil (e.g., the second coil 2453g of FIG. 24A(a)), and the first coil or the second coil can be electrically connected to the MST module 2457c or the wireless charge module 2457a.

For example, according to one embodiment, the MST module 2457c can apply the same signals or different signals through a plurality of coils within the MST module 2457c. According to one embodiment, the same signals or different signals can be simultaneously applied to the first and second coils, respectively, from the MST module 2457c or the wireless charge module 2457a. For example, according to the time points when the signals are applied to the first and second coils, respectively, the time intervals for which signal application states are maintained, or the directions of the signal currents, the conductive pattern (e.g., the conductive pattern 2453c of FIG. 24A(a)) can generate magnetic fluxes in variously different distributions.

For example, the MST module 2457c can transmit transaction information through one or more of the first coil and the second coil. For example, the MST module 2457c can select one or more of the first coil and the second coil according to a pre-set selection condition, and can transmit the transaction information through the selected coil(s). The pre-set selection condition can include a case in which the selection is made based on the distance between the external device to receive the transaction information and the electronic device. For example, the MST module 2457c can transmit the transaction information through the selected one of the first coil and the second coil, and can transmit the transaction information again through the other non-selected one of the first and second coils based on whether a response to the transaction information is received or based on the response contents. For example, the MST module 2457c can be set to transmit the transaction information through the selected one of the first coil and the second coil, and in response to the response indicating that the transaction information has been received, to refrain from a connection between the selected coil and the external device.

For example, the wireless charge module 2457a can acquire power from one or more of the first coil and the second coil or can transmit power.

Figure 24B:
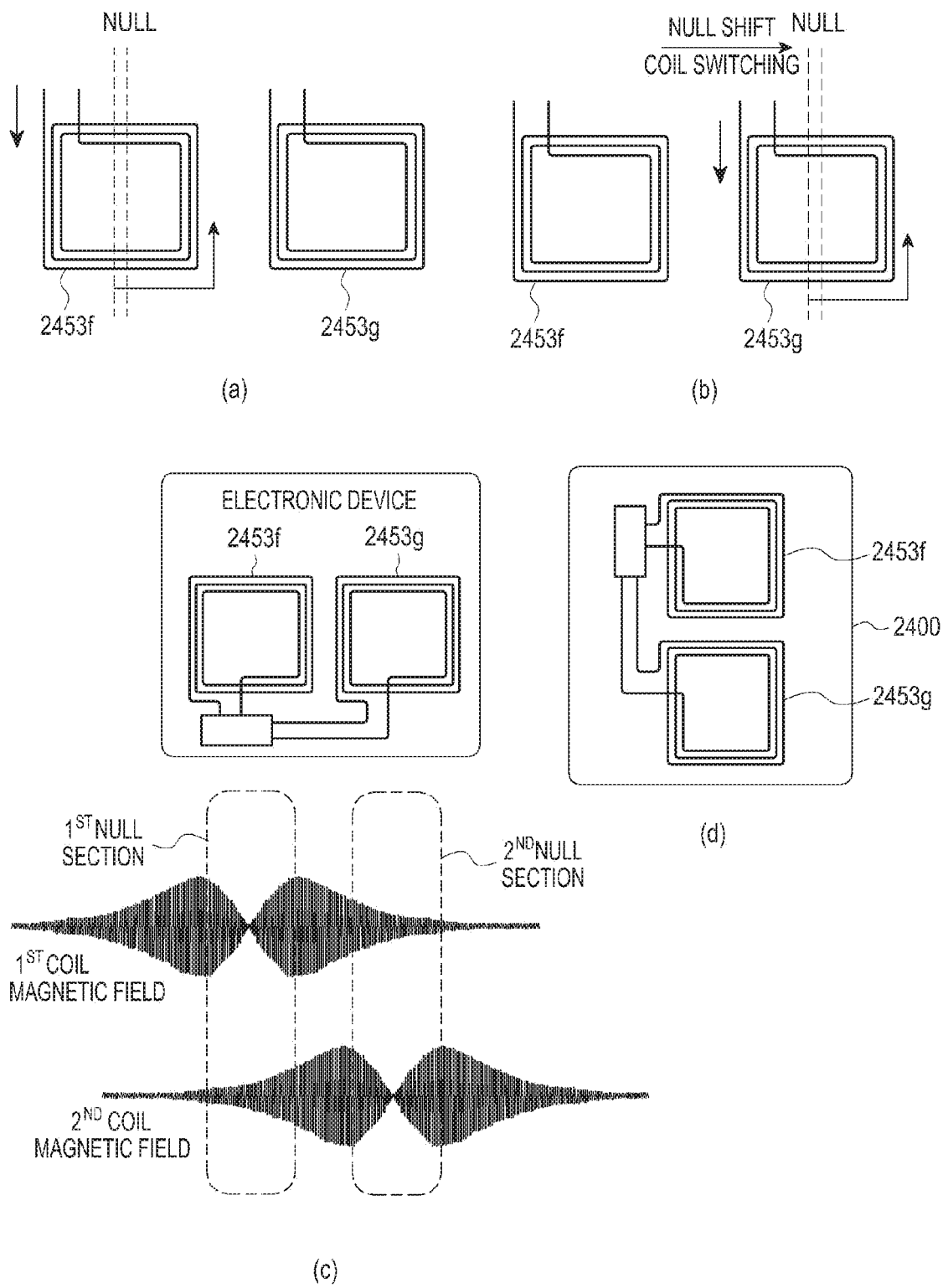

FIG. 24B is a view illustrating a plurality of coils according to various embodiments of the present disclosure.

Although not illustrated, the NFC can operate in a polling mode during the transmission of an MST signal. The electronic device 2400 (e.g., the electronic device 101 of FIG. 1) can transmit a signal to a POS terminal at least once through one or more coils (e.g., the first coil 2453f and the second coil 2453g), and the signal can include pulses indicating the entire transaction information (the entirety of first transaction data and/or second transaction data). Among signals transmitted for one sec, one or more pulses can include different data. As another example, one or more pulses can be transmitted through different MST modules (coil antennas), respectively. Although not illustrated, during the transmission of the MST signal, the NFC can operate in a polling mode.

Referring to FIG. 24B(a), among a plurality of coils, when a current in the counterclockwise direction flows in the first coil 2453f and no current flows in the second coil 2453g, a null can be formed in the central portion of the first coil 2453f among the plurality of coils and no null can be formed in a portion corresponding to the second coil 2453g.

Referring to FIG. 24B(b), when a current in the counterclockwise direction flows in the second coil 2453g and no current flows in the first coil 2453f among the plurality of coils, a null can be formed in the central portion of the second coil 2453g among the plurality of coils and no null can be formed in a portion corresponding to the first coil 2453f.

In the case where only one coil is selected among the first coil 2453f and the second coil 2453g as in FIGS. 24B(a) and 24B(b), a current is caused to alternately flow in the selected coil, and transaction information is transmitted to an external POS terminal only through the one selected coil in which the current alternately flows, a null can be alternately formed only in the central portion of the one coil among the first coil 2453f and the second coil 2453g. Thus, even if a reader of the POS terminal is provided in the central portion of each coil, the transaction information can be transmitted to the POS terminal regardless of whether the null is formed.

As illustrated in FIG. 24B(c), the null sections, which are generated by the first coil 2453f and the second coil 2453g, respectively, may not overlap with each other. According to various embodiments, an electronic device 2400 (e.g., the electronic device 101 of FIG. 1) can transmit a signal to the POS terminal through a plurality of coils at least once, and can generate a sequence of a plurality of signals using first transaction information and/or second transaction information. For example, the electronic device 101 can transmit a transaction signal through the first coil 2453f in a first MST signal section, and can transmit the transaction signal through the second coil 2453g in the second MST signal section. As a result, while the transaction progresses (e.g., while the MST signal is transmitted 16 times), the electronic device 101 can give an effect as if the null section of a magnetic field input to the reader of an external device (a POS terminal) moves. When the reader of the external device (the POS terminal) is positioned in a first null section, the electronic device 101 can complete the transaction by receiving an input of transaction information of a second section that is transmitted through the second coil 2453g, or can complete the transaction by receiving an input of transaction information of the MST signal section. As another example, an electronic device 2400 (e.g., the electronic device 101) can transmit a signal to the POS terminal at least once through one or more coils, and can generate a sequence of a plurality of signals using first transaction information and/or second transaction information. The electronic device can store instructions that cause the sequence of the plurality of signals to be magnetically transmitted to the outside through a conductive pattern (e.g., the third conductive pattern 2453c of FIG. 24A). One or more signals among the sequence of the plurality of signals can include pulses indicating the entirety of first transaction information and/or second transaction information (the entirety of the first transaction data and/or the second transaction data).

As illustrated in FIG. 24B(d), the first coil 2453f and the second coil 2453g can be, but not exclusively, arranged in an upper/lower structure in relation to each other within an electronic device 2400 (e.g., the electronic device 101 of FIG. 1).

Figure 24C:
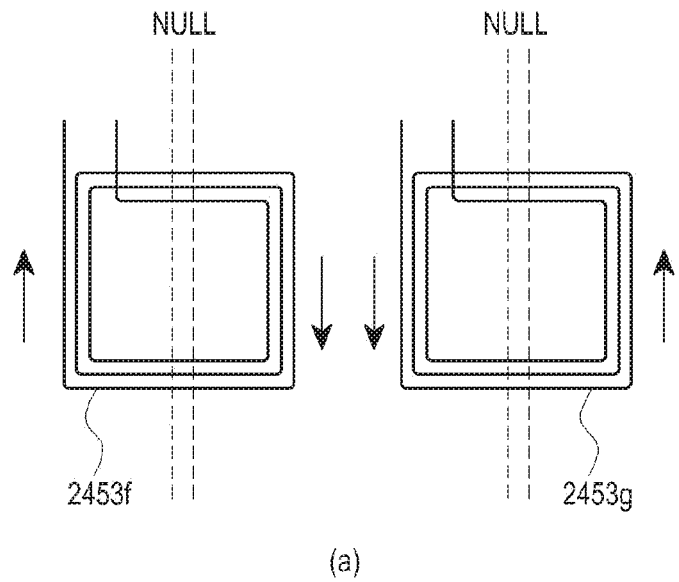
Figure 24C:
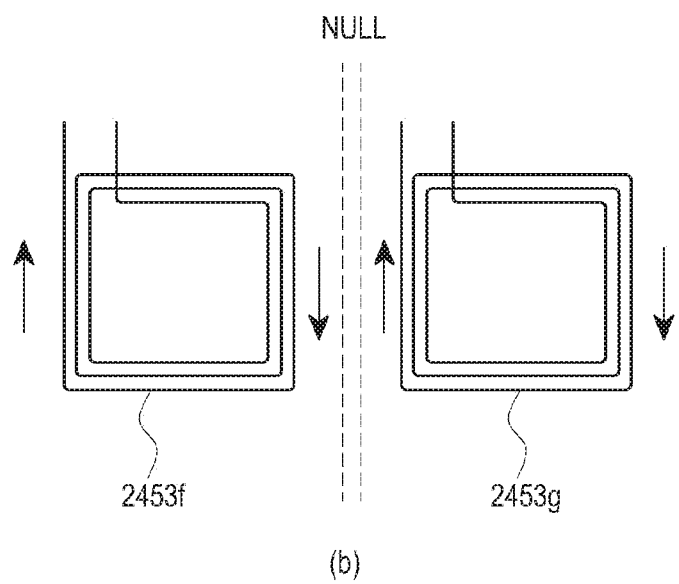

FIG. 24C illustrates a plurality of coils according to various embodiments of the present disclosure.

Referring to FIG. 24C(a), according to various embodiments, when a current in a first direction (e.g., a counterclockwise direction) flows in the first coil 2453f and a current in a second direction (e.g., a clockwise direction) flows through the second coil 2453g, the magnetic fluxes generated by the first coil 2453f and the magnetic fluxes generated by the second coil 2453g can transmit transaction information to an external device while forming nulls in the central portion of the first coil 2453f and the central portion of the second coil 2453g, respectively.

Referring to FIG. 24C(b), according to various embodiments, when a current in a first direction (e.g., a clockwise direction) flows in the first coil 2453f and the second coil 2453g, the magnetic fluxes generated by the first coil 2453f and the magnetic fluxes generated by the second coil 2453g can transmit transaction information to an external device while forming a null in a central portion between the first coil 2453f and the second coil 2453g.

When currents in the same direction and currents in opposite directions are caused to flow in the first coil 2453f and the second coil 2453g alternately with a specific time interval as in FIGS. 24C(a) and 24C(b), transaction information can be more easily transmitted to a POS terminal regardless whether a null is formed even if the reader of the POS terminal is provided in the central portion of each coil or in the central portion between two coils.

The methods described above with reference to FIGS. 24B and 24C can be used in a mixed manner.

Figure 24D:
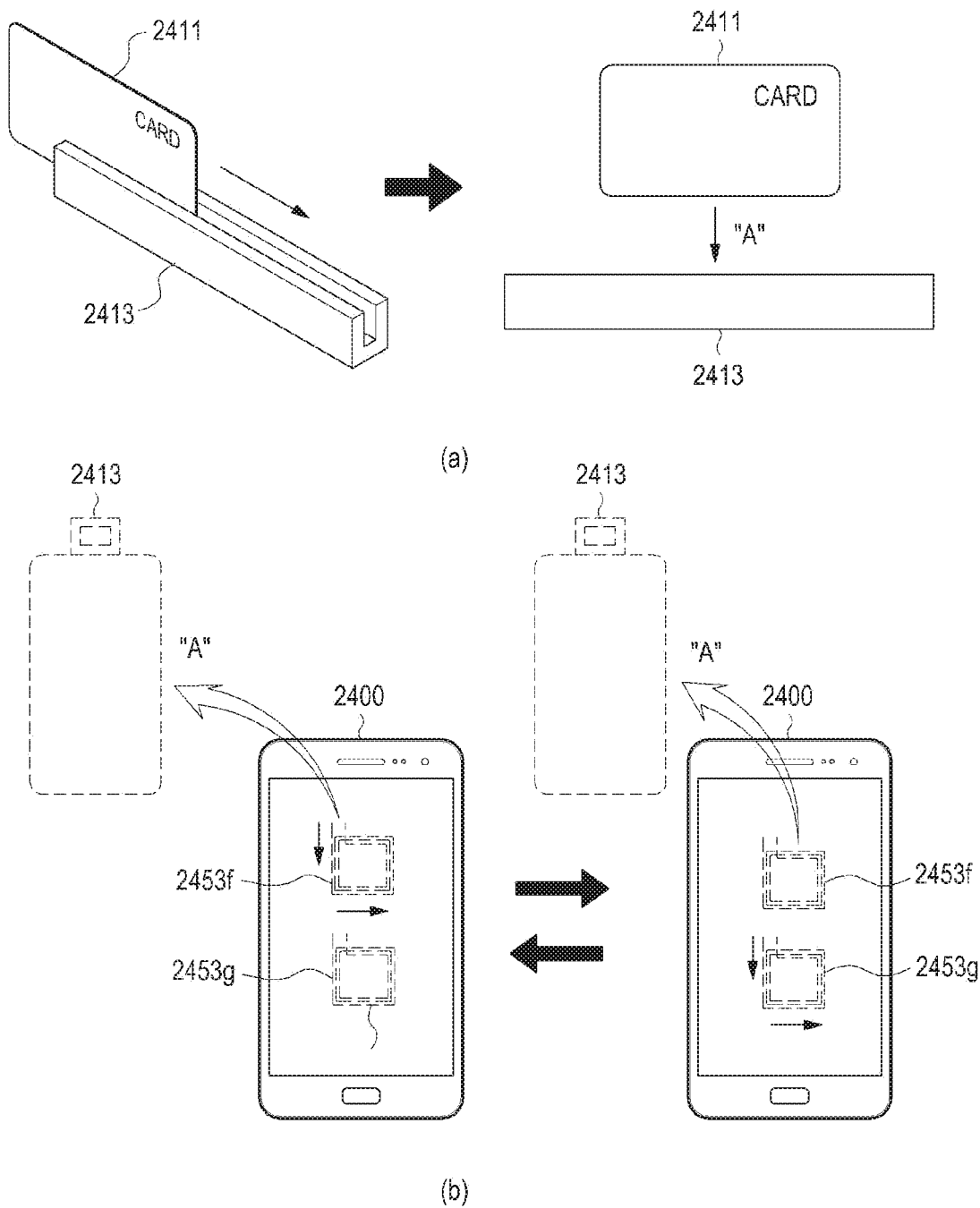

FIG. 24D is a view illustrating one method of transmitting transaction information according to various embodiments of the present disclosure.

Referring to FIG. 24D(a), according to various embodiments, when a card (e.g., a magnetic card) 2411 comes in contact with a POS terminal (e.g., a POS reader) 2413 and is swiped, the POS terminal 2413 can receive transaction information called "A" from the card 2411.

According to various embodiments, an electronic device 2400 (e.g., the electronic device 101 of FIG. 1) can receive transaction information (e.g., Track 1, Track 2, Track 3, or token information) included in at least a part of a magnetic stripe of the card 2411 from a card company server or a bank server through a communication module, and can store the transaction information in a processor (e.g., the processor of FIG. 2) or a separate embedded security module in a necessary form.

According to various embodiments, the magnetic card (e.g., the card 2411 of FIG. 24D(a)) can store data for each of Track 1, Track 2, and Track 3. The card reader (e.g., the POS terminal 2413 of FIG. 24D(a)) can be provided with a header and a coil to read the data recorded in the tracks (magnetic stripe tracks) of the magnetic card. When a track of the magnetic card (e.g., a magnetized black line) is swiped at the position of the header in the rail portion of the card reader, magnetic force lines, which pass through the coil connected to the header, can be changed. A current corresponding to the change of the magnetic force lines is generated in the carder reader, and the card reader can read and process the data recorded in the track from the current. In other words, the static magnetic field associated with the magnetic stripe, when the card is swiped through the reader, results in a time-varying magnetic flux linking the pick-up coil arrangement, and that changing magnetic flux causes a corresponding voltage to be induced.

According to various embodiments, the electronic device (e.g., the electronic device 2400 of FIG. 24D(b)) can store the data recorded in the tracks of the magnetic card, and can be provided with a module for magnetic field communication (e.g., an MST module). The MST module can put the data, which are recorded in the tracks, in the magnetic field signal to transmit the data to the card reader through an antenna (e.g., the first coil 2453f and the second coil 2453g of FIG. 24D(b)). Then, a current, which is the same as the current generated when the magnetic card is swiped at the position of the header of the card reader, can be generated in the card reader. That is, the user can pay costs or the like by bringing the electronic device to be close to the card reader or to come in contact with the carder.

According to various embodiments, the data put in an MST signal and transmitted by the MST module can be transmitted in the form of token. In a transaction method using the token, not Tracks 1, 2, and 3 but at least a part of data of Tracks 1, 2, and 3 can be substituted with a token or a cryptogram. For example, in Track 1, 2, and 3, PAN can be substituted with a token. Additional data and discretionary data in Tracks 1 and 2, and use and security data and additional data in Track 3 can be substituted with a cryptogram. Substituted values can be converted into bits and the bits can be put in the MST signal to be transmitted to the card reader. For example, when the track data format is used, the token information can be sent to the card company without separately making a change in the card reader. Here, the token can include an ID for identifying the card. In addition, the token can include information for identifying the card company. Transaction data can include the expiration date of the card, a merchant ID, etc. and can be made by combining some pieces of information related to a transaction.

According to various embodiments, the electronic device 2400 can generate a magnetic field signal. For example, the magnetic field signal generated in the electronic device 2400 can be a signal similar to a magnetic field signal that is generated as the card 2411 is swiped in the card reader of a card reading device (or a POS terminal) 2413. For example, a user can pay purchase costs or the like by bringing a portable electronic device (e.g., the electronic device 2400), which has generated a magnetic field signal, to be close to or to come in contact with the card reading device (e.g., a POS terminal 2413) without using a separate magnetic card (e.g., the card 2411).

According to one embodiment, the transaction information transmitted by at least one coil (e.g., the coil 2453f or 2453g of FIG. 24D) can include data in a token form including information for the transaction card. For example, the data in the token form can include token information and cryptogram information, the token information can include card identification (ID) information received from a card company, and the cryptogram information can include transaction data which can include at least one of expiration date information of the card used at the time of transaction and card member store identification (ID) information received from the POS terminal.

According to one embodiment, at least one coil (e.g., the coil 2453f or 2453g of FIG. 24D) can transmit the first track data, the second track data, and the third track data to the POS terminal in a form in which one or more track data are substituted with token information and cryptogram information by the control circuit. For example, among the track data, AD (Additional Data) and DD (Discretionary Data) can be substituted with the cryptogram information, and PAN information can be substituted with token information. In this case, there is an advantage in that because data of track units, which have been used when using the existing card, can be used in transmitting the transaction information, the transaction can be performed only with the token information without changing separate data on the POS terminal.

According to one embodiment, among the one or more coils, the first coil 2453f can transmit the data of the first track to the POS terminal, and the second coil 2453g can transmit the data of the second track to the POS terminal.

According to various embodiments, even in the case where the electronic device is provided with a plurality of coils rather than a single coil, each of the plurality of coils can have the shapes that have described above with reference to FIGS. 11 to 18. Referring to FIG. 24D(b), according to various embodiments, one coil selected among a first coil 2453f and a second coil 2453g that are provided in the electronic device 2400, for example, the first coil 2453f can transmit transaction information including at least a part of transaction information "A", which is transmitted by a card 2411 to a POS terminal 2413, to the POS terminal 2413 in the form of magnetic fluxes (or, in other words, in the form of a magnetic signal). In addition, the second coil 2453g, which is alternately selected with the first coil 2453f, can transmit transaction information including at least a part of the transaction information "A" to the POS terminal 2413 in the form of magnetic fluxes.

Even in the case where a signal including transaction information is transmitted to an external device (e.g., a POS terminal) using a single coil rather than a plurality of coils as described above with reference to FIGS. 24D(a) and 24D(b), the above-described method is also applicable. For example, one first coil (e.g., the coil 24530 can transmit transaction information including at least a part of the transaction information "A" to the POS terminal 2413 in the form of magnetic fluxes.

Figure 24E:
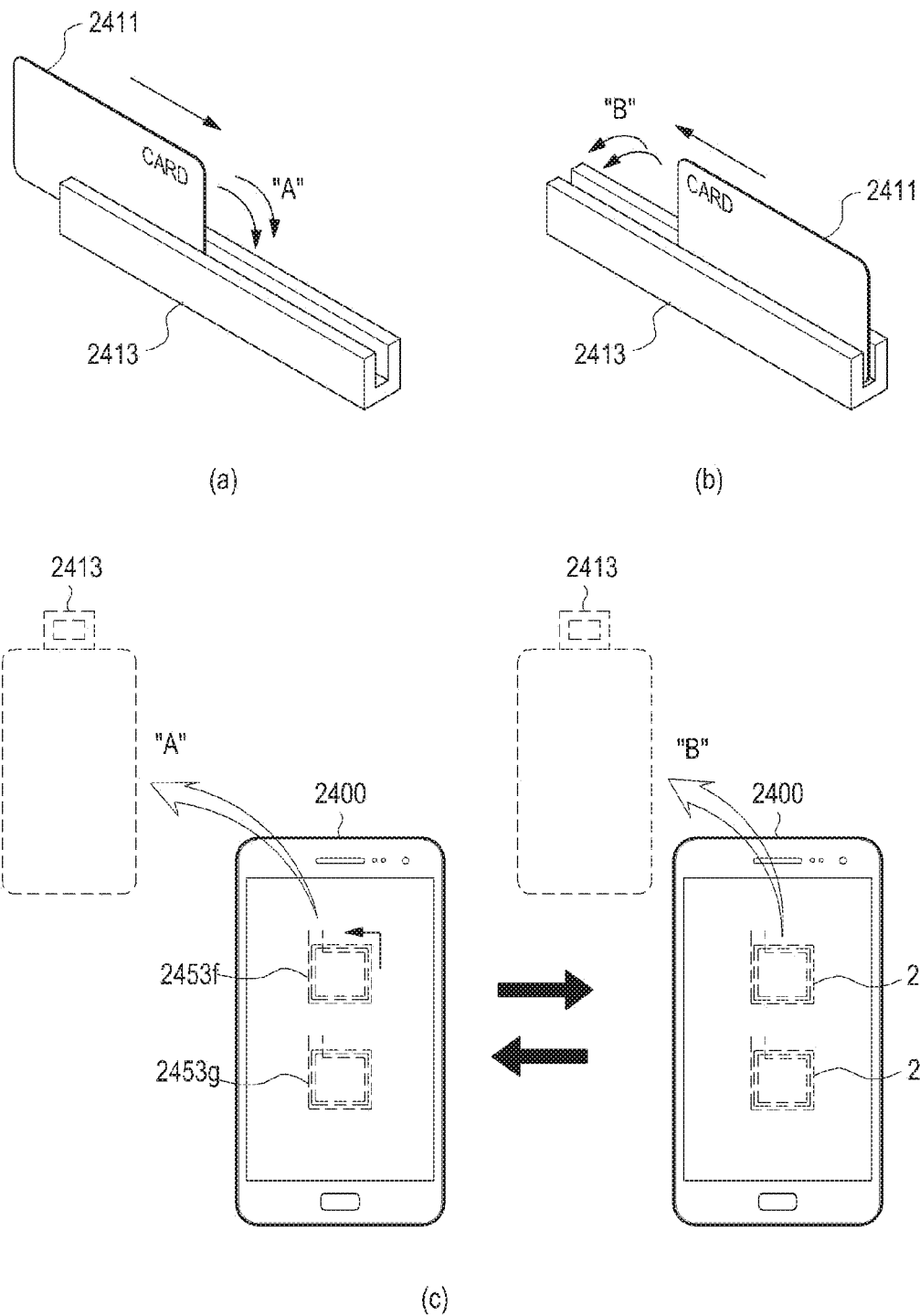

FIG. 24E is a view illustrating another method of transmitting transaction information according to various embodiments of the present disclosure.

Referring to FIG. 24E(a), according to various embodiments, when a card 2411 is swiped through a POS terminal 2413 in a first direction (e.g., from top to bottom), the POS terminal 2413 can receive first transaction information called "A" from the card 2411. Referring to FIG. 24E(b), when the card 2411 is swiped through the POS terminal 2413 in a second direction (e.g., from bottom to top), the POS terminal 2413 can receive second transaction information called "B" from the card 2411.

Referring to FIG. 24E(c), according to various embodiments, in order to cause the electronic device 2400 to transmit the first transaction information "A" and the second transaction information "B", the first coil 2453f and the second coil 2453g of the electronic device 2400 can be alternately selected. Upon being selected, the first coil 2453f can transmit transaction information including at least a part of the first transaction information "A" to the POS terminal 2413, and the second coil 2453g can transmit transaction information including at least a part of the second transaction information "B" to the POS terminal 2413. According to one embodiment, each of the alternately selected coils can select transaction information of one or more of the first transaction information "A" and the second transaction information "B" according to a pre-set condition, and can transmit the transaction information to the POS terminal.

Figure 24F:
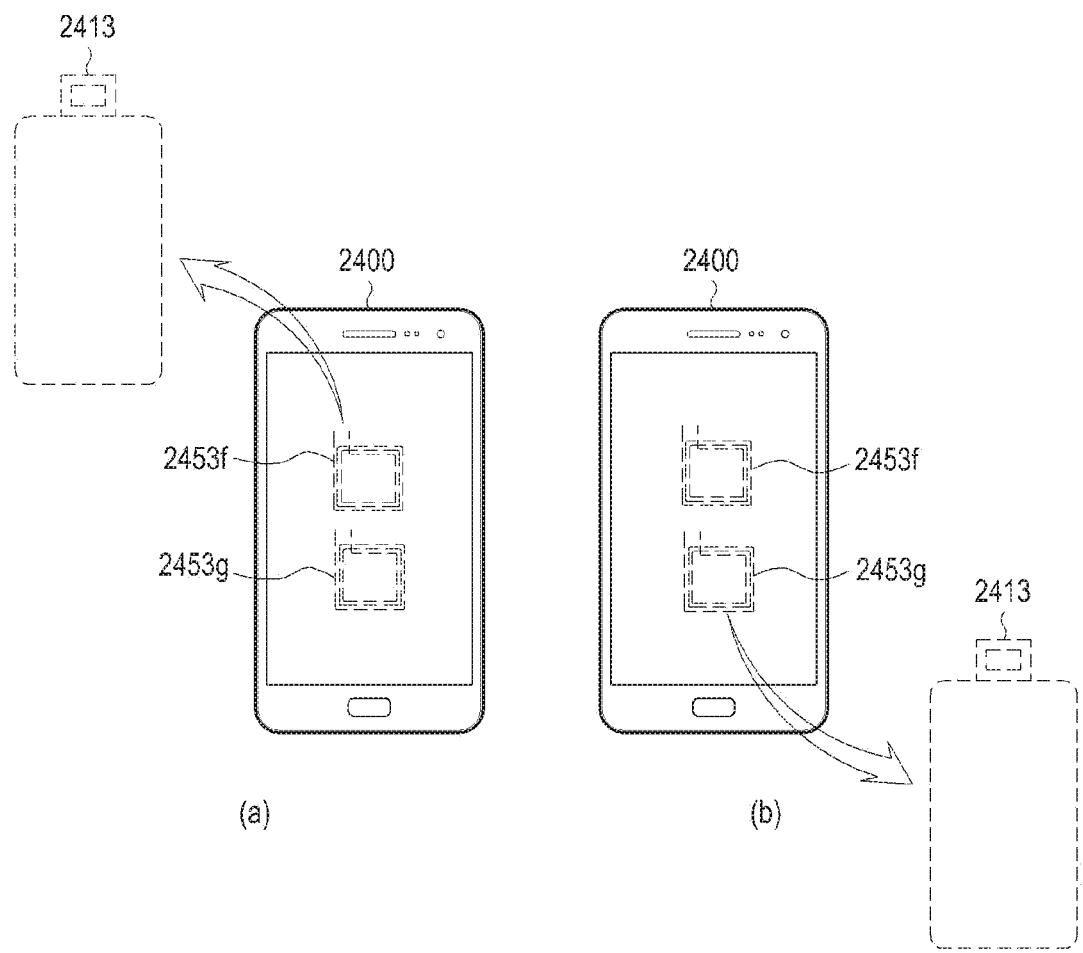

FIG. 24F is a view illustrating still another method of transmitting transaction information according to various embodiments of the present disclosure.

As illustrated in FIGS. 24F(a) and 24F(b), the electronic device 2400 can select one of the first coil 2453f and the second coil 2453g according to a relative position or the distance between the electronic device 2400 and the POS terminal 2413, or according to a relative position or the distance between the first coil 2453f or the second coil 2453g and the POS terminal 2413. For example, as illustrated in FIG. 24F(a), when the distance between the first coil 2453f and the POS terminal 2413 is shorter than the distance between the second coil 2453g and the POS terminal 2413, the electronic device 2400 can select the first coil 2453f and can transmit transaction information to the POS terminal 2413 through the selected first coil 2453f. Unlike this, for example, as illustrated in FIG. 24F(b), when the distance between the second coil 2453g and the POS terminal 2413 is shorter than the distance between the first coil 2453f and the POS terminal 2413, the electronic device 2400 can select the second coil 2453g and can transmit transaction information to the POS terminal 2413 through the selected second coil 2453g. All the above-described transaction information transmission methods can be used by being variously combined.

Figure 25:
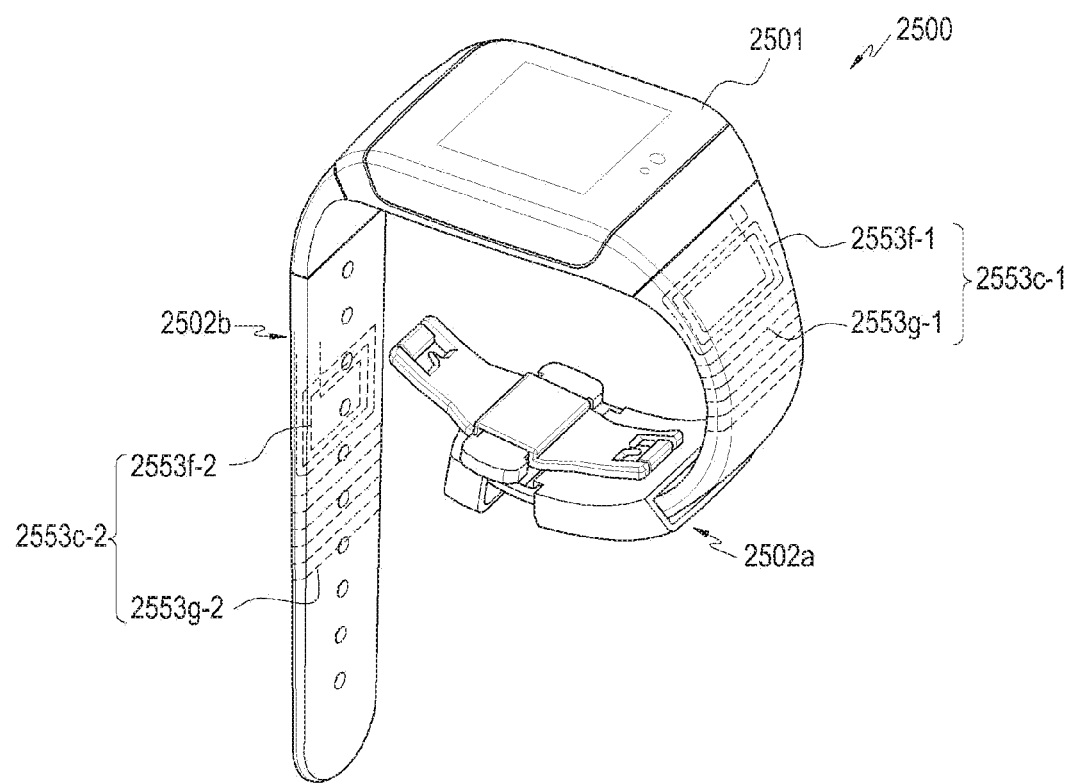
FIG. 25 is a perspective view illustrating an electronic device according to another embodiment among various embodiments of the present disclosure.

FIG. 25 is a perspective view illustrating an electronic device 2500 according to another embodiment among various embodiments of the present disclosure. The electronic device 2500 can be the electronic device 101 of FIG. 1.

Referring to FIG. 25, the electronic device 2500 can include a main body 2501 and wearing members 2502a and 2502b that extend from opposite sides of the main body 2501, respectively to be capable of being worn on the user's body portion (e.g., a wrist). The electronic device 2500 can include conductive patterns 2553c-1 and 2553c-2 that radiate magnetic fluxes. The conductive patterns 2553c-1 and 2553c-2 can be formed by a part or the entirety of one of the conductive patterns or coils of the above-described embodiments, or can be formed of a combination of two or more of the conductive patterns or coils of the above-described embodiments. In the present embodiment, a plurality of conductive patterns 2553c-1 and 2553c-2 can be arranged in the wearing members 2502a and 2502b, respectively.

Among the conductive patterns, a first conductive pattern 2553c-1 can include a flat coil 2553f-1 and a solenoid coil 2553g-1 that are arranged to be adjacent to each other (without overlapping with each other). Among the conductive patterns, a second conductive pattern 2553c-2 can include a flat coil 2553f-2 and a solenoid coil 2553g-2 that are arranged to partially overlap with each other. Each of the conductive patterns 2553c-1 and 2553c-2 can receive a signal current applied through a control circuit embedded in the main body 2501 to radiate magnetic fluxes, and can transmit information (e.g., transaction information) to an external device (e.g., a magnetic reading type POS terminal) through the radiated magnetic fluxes.

According to various embodiments, another conductive pattern can be embedded in the main body 2501. The conductive pattern embedded in the main body 2501 can include a flat coil arranged on a display device or a solenoid coil wound on the outer peripheral surface of the main body 2501.

Figure 26:
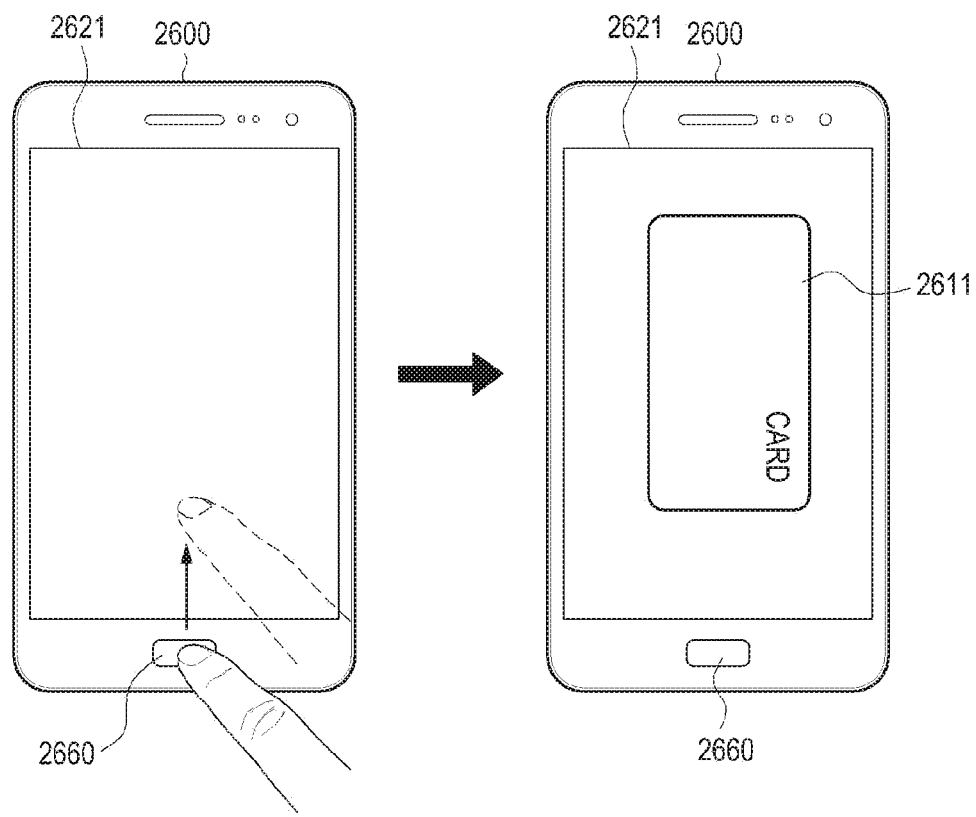
FIG. 26 is a view illustrating a method of displaying a transaction screen according to various embodiments of the present disclosure.

FIG. 26 is a view illustrating a method of displaying a transaction screen according to various embodiments of the present disclosure.

As illustrated in FIG. 26, the electronic device 2600 can include a conductive bezel area 2660 that encloses at least a part of the electronic device so as to receive an input. According to one embodiment, the electronic device 2600 can include one or more keys (or buttons) instead of the conductive bezel area. For example, among the first coil (e.g., the first coil 2453f of FIG. 24D or the like) and the second coil (e.g., the second coil 2453g of FIG. 24D or the like), at least one coil can include at least a part of the conductive bezel (or key) that encloses at least a part of the electronic device 2600. For example, the electronic device can execute a transaction application (e.g., Samsung Pay) through a user's input by swiping toward the display from the lower bezel area of the electronic device. In another example, when a user's input (e.g., an input of dragging the user's fingerprint from bottom to top) is received through the conductive bezel (or key) area 2660, the electronic device 2600 can display at least one card 2611 previously registered in the electronic device, through the display 2621 based on the user's input. In still another example, the displayed screen can be a transaction screen in which the card is included.

Figure 27:
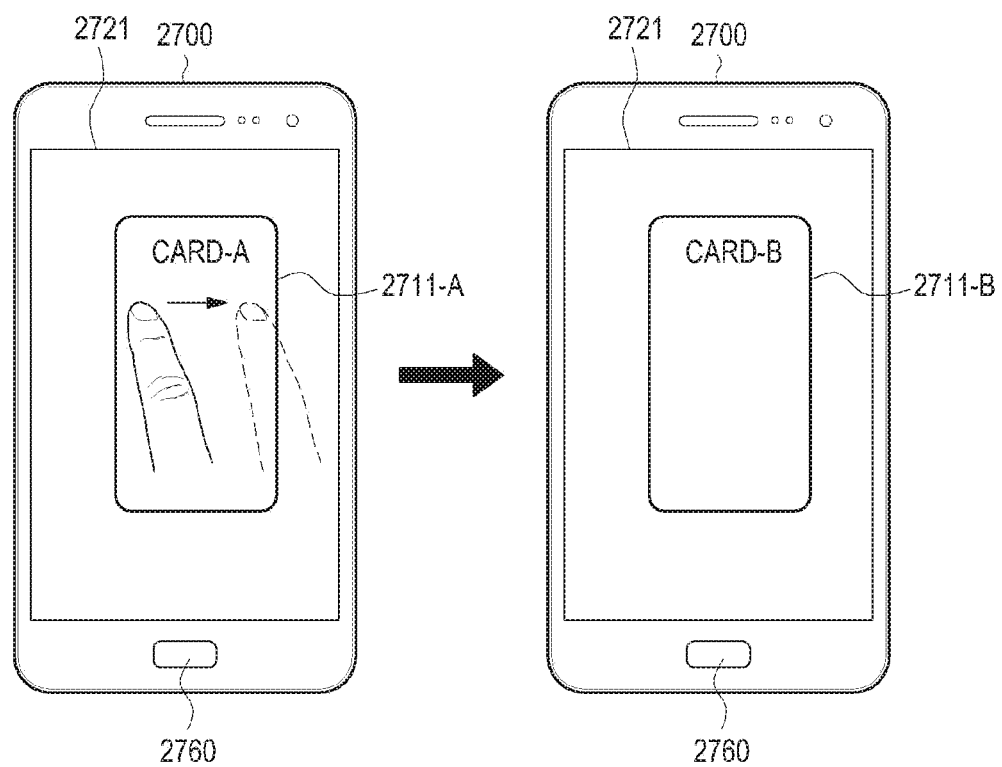
FIG. 27 is a view illustrating a method of displaying a transaction screen according to various embodiments of the present disclosure.

FIG. 27 is a view illustrating a method of displaying a transaction screen according to various embodiments of the present disclosure.

As illustrated in FIG. 27, the electronic device 2700 includes a home button 2760, and, in a state where a first card "CARD-A" 2711-A is displayed on a display 2721, when an input executed from left to right (or, right to left) (not limited thereto) is received through the display 2721, the electronic device 2700 can display a second card "CARD-B" 2711-B through the display 2721. In this way, the user can easily change the transaction card from the first card to the second card.

Figure 28:
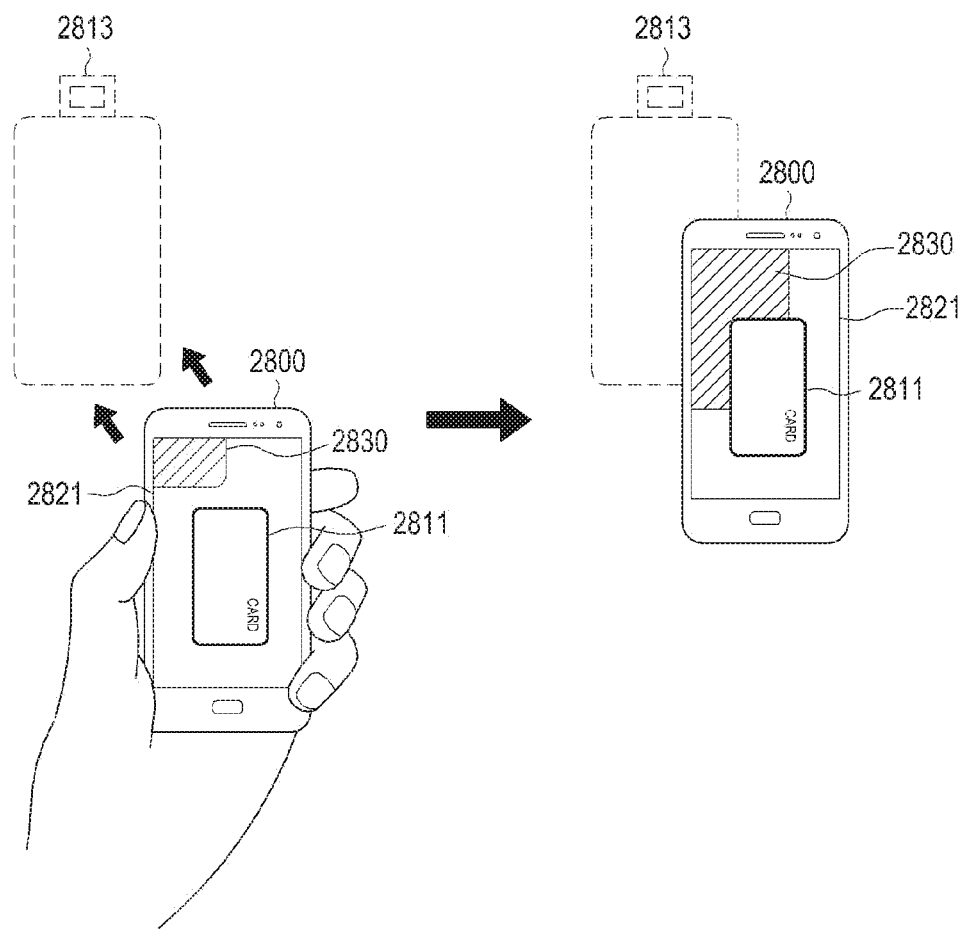
FIG. 28 is a view illustrating a method of displaying a transaction screen according to various embodiments of the present disclosure.

FIG. 28 is a view illustrating a method of displaying a transaction screen according to various embodiments of the present disclosure.

Referring to FIG. 28, an electronic device 2800 located in a pre-set distance from a POS terminal 2813 can display, through a display 2821, POS terminal position information 2830 corresponding to the POS terminal and card information 2811, which is information for a selected transaction means. For example, the POS terminal position information 2830 can include information concerning a relative position or a relative distance between the electronic device 2800 and the POS terminal 2813. For example, when the position of the electronic device 2800 comes close to the position of the POS terminal 2813, the display 2821 can reduce distance between a location in which the card information 2811 is displayed and a location in which the POS terminal position information 2830 is displayed. For example, the electronic device 2800 can acquire a relative position or a relative distance between the electronic device 2800 and the POS terminal 2813 through a separate sensing device (e.g., an NFC module, a camera module, or a sensor module), and can control the display 2821 to change the location in which the POS terminal position information 2830 is displayed by the display 2821 or the size thereof using the acquired relative position or distance in relation to the POS terminal 2813. According to one embodiment, the electronic device 2800 can output the position information in relation to the POS terminal not only through the display, but also through an output unit or a haptic module. According to one embodiment, the POS terminal position information 2830 displayed by the display 2821 can include various sizes, various shapes, and various colors.

Figure 29:
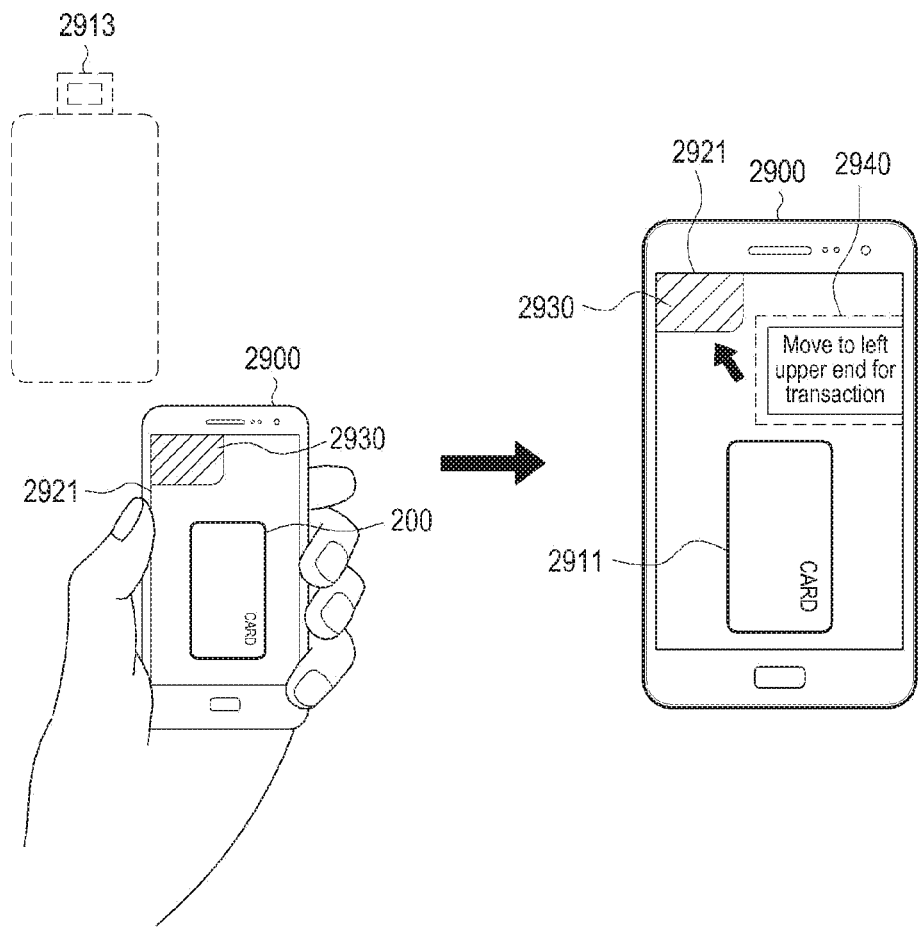
FIGS. 29 and 30 are views illustrating a method of displaying a transaction screen according to various embodiments of the present disclosure.
Figure 30:
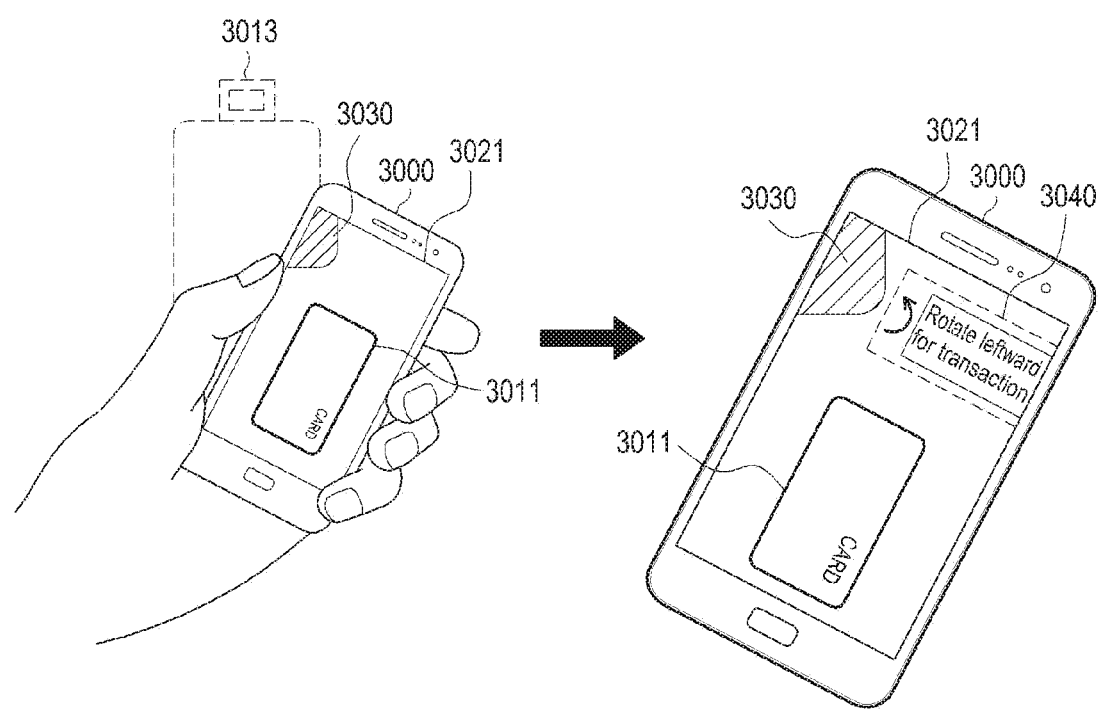

FIGS. 29 and 30 are views illustrating a method of displaying a transaction screen according to various embodiments of the present disclosure.

As illustrated in FIGS. 29 and 30, an electronic device 2900 or 3000 can display card information 2911 or 3011 and POS terminal position information 2930 or 3030 through a display 2921 or 3021. For example, the electronic device 2900 or 3000 can acquire a relative distance and a relative position between a POS terminal 2913 or 3013 and the electronic device 2900 or 3000, and can determine whether it is possible for the POS terminal 2913 or 3013 and a plurality of coils (e.g., the first coil 2453f and the second coil 2453g of FIG. 24D or the like) to exchange the transaction information with each other based on the acquired relative distance or relative position. As a result of determination, when the plurality of coils (e.g., the first coil 2453f and the second coil 2453g of FIG. 24D or the like) and the POS terminal 2913 or 3013 cannot exchange transaction information with each other, the electronic device 2900 or 3000 can display, through the display 2921 or 3021, device guide information that guides the electronic device 2900 or 3000 to the relative position or relative distance where the POS terminal 2913 or 3013 and the plurality of coils (the first coil 2453f and the 2453g of FIG. 24D or the like) can exchange the transaction information.

For example, as illustrated in FIG. 29, when the relative distance between the electronic device 2900 and the POS terminal 2913 is in a range that disables the exchange of transaction information, the electronic device 2900 can display, through the display 2921, device guide information to move the electronic device 2900 toward the POS terminal 2913 ("Move to left upper end for transaction" 2940). For example, as illustrated in FIG. 30, when the relative position between the electronic device 3000 and the POS terminal 3013 is in a range that disables the exchange of transaction information, the electronic device 3000 can display, through the display 3021, device guide information to guide the electronic device 3000 to be rotated toward the POS terminal 3013 ("Rotate leftward for transaction" 3040). The electronic device 3000 can output the position information in relation to the POS terminal not only through the display, but also through an output unit or a haptic module, and the POS terminal position information 3030 displayed by the display 3021 can include various sizes, various shapes, and various colors.

Figure 31:
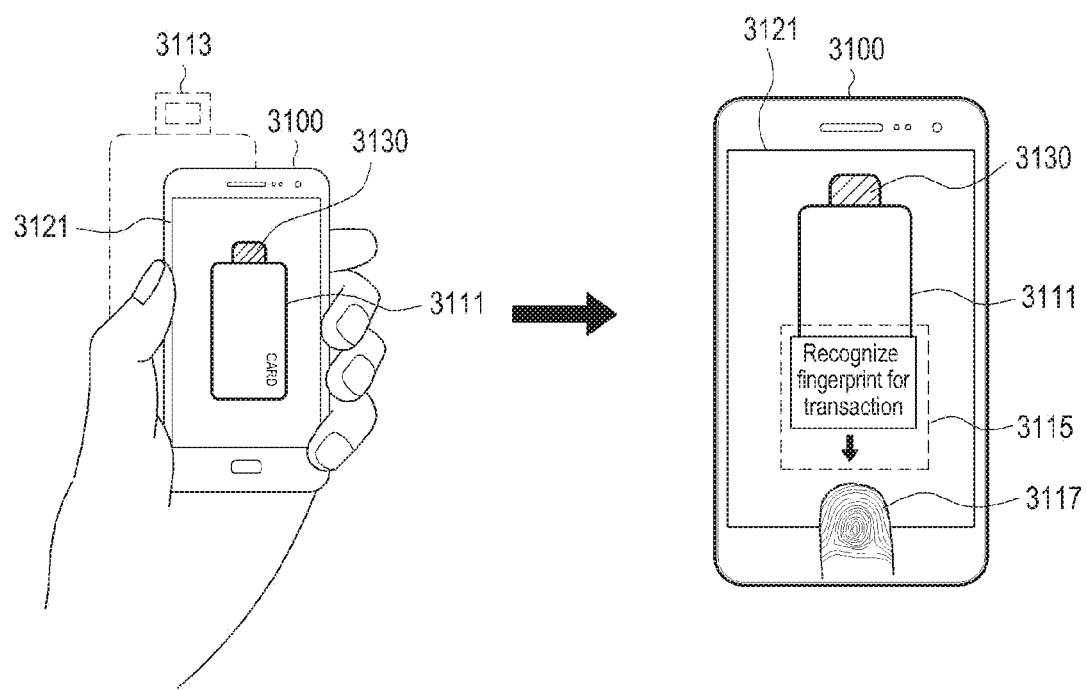
FIG. 31 is a view illustrating a method of displaying a transaction screen according to various embodiments of the present disclosure.

FIG. 31 is a view illustrating a method of displaying a transaction screen according to various embodiments of the present disclosure.

Referring to FIG. 31, when the relative distance between the POS terminal 3113 and the electronic device 3100 is in a range that enables the exchange of transaction information, the electronic device 3100 can display, through the display 3121, the POS terminal position information 3130 and card information 3111 to partially overlap with each other. For example, when the relative distance between the POS terminal 3113 and the electronic device 3100 is in the range that enables the exchange of transaction information, the electronic device 3100 can display, through the display 3121, transaction instruction guide information for guiding the input of a transaction instruction ("Recognize fingerprint for transaction" and a fingerprint recognition guide arrow 3115) and fingerprint guide information 3117.

Figure 32:
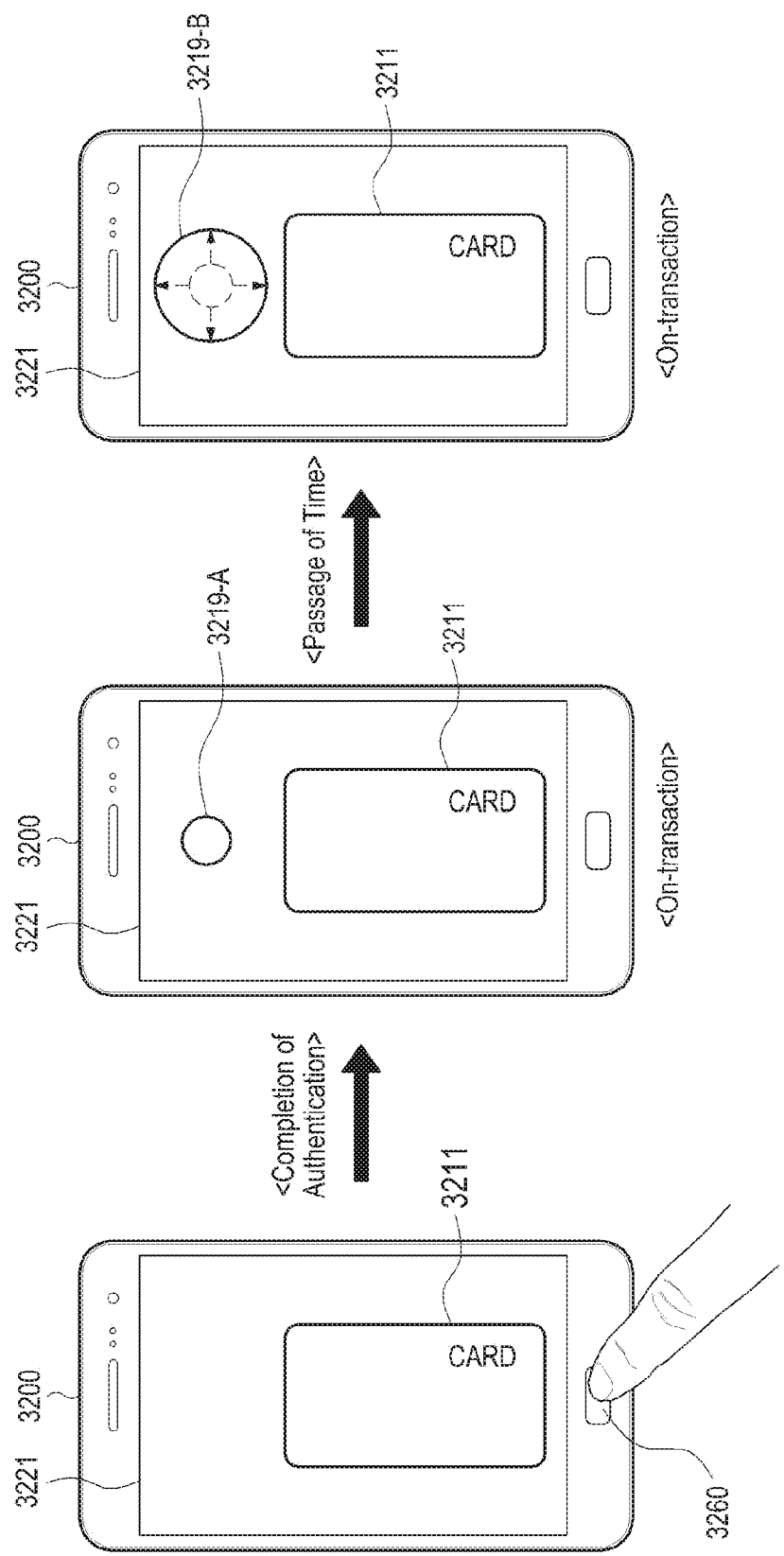
FIG. 32 is a view illustrating a method of displaying a transaction screen according to various embodiments of the present disclosure.

FIG. 32 is a view illustrating a method of displaying a transaction screen according to various embodiments of the present disclosure.

As illustrated in FIG. 32, the electronic device 3200 can display the card information 3211 through the display 3221, and can receive a fingerprint recognition or transaction decision instruction through the bezel area 3260. For example, when a fingerprint recognition or transaction decision instruction is received through the bezel area 3260, the electronic device 3200 can determine that authentication for transaction is completed.

When the authentication is completed, the electronic device 3200 can display, through the display 3221, transaction progressing information 3219-A indicating "in progress of processing transaction." The transaction progressing information 3219-A can include dot, circle, or various forms of planes.

When a pre-set length of time has elapsed in progress of processing a transaction after the authentication was completed, the electronic device 3200 can enlarge the transaction progressing information 3219-A in proportion to the elapsed length of time, and can display the enlarged transaction progressing information 3219-B through the display 3221.

The electronic device (e.g., the electronic device 101 of FIG. 1) can transmit an MST signal including the transaction information to the POS terminal at every designated period (e.g., 1 sec) and designated times (e.g., 16 times) alternately using the first coil (e.g., the first coil 2453f of 24D) and the second coil (e.g., the second coil 2453g of FIG. 24D) among the plurality of coils.

Figure 33:
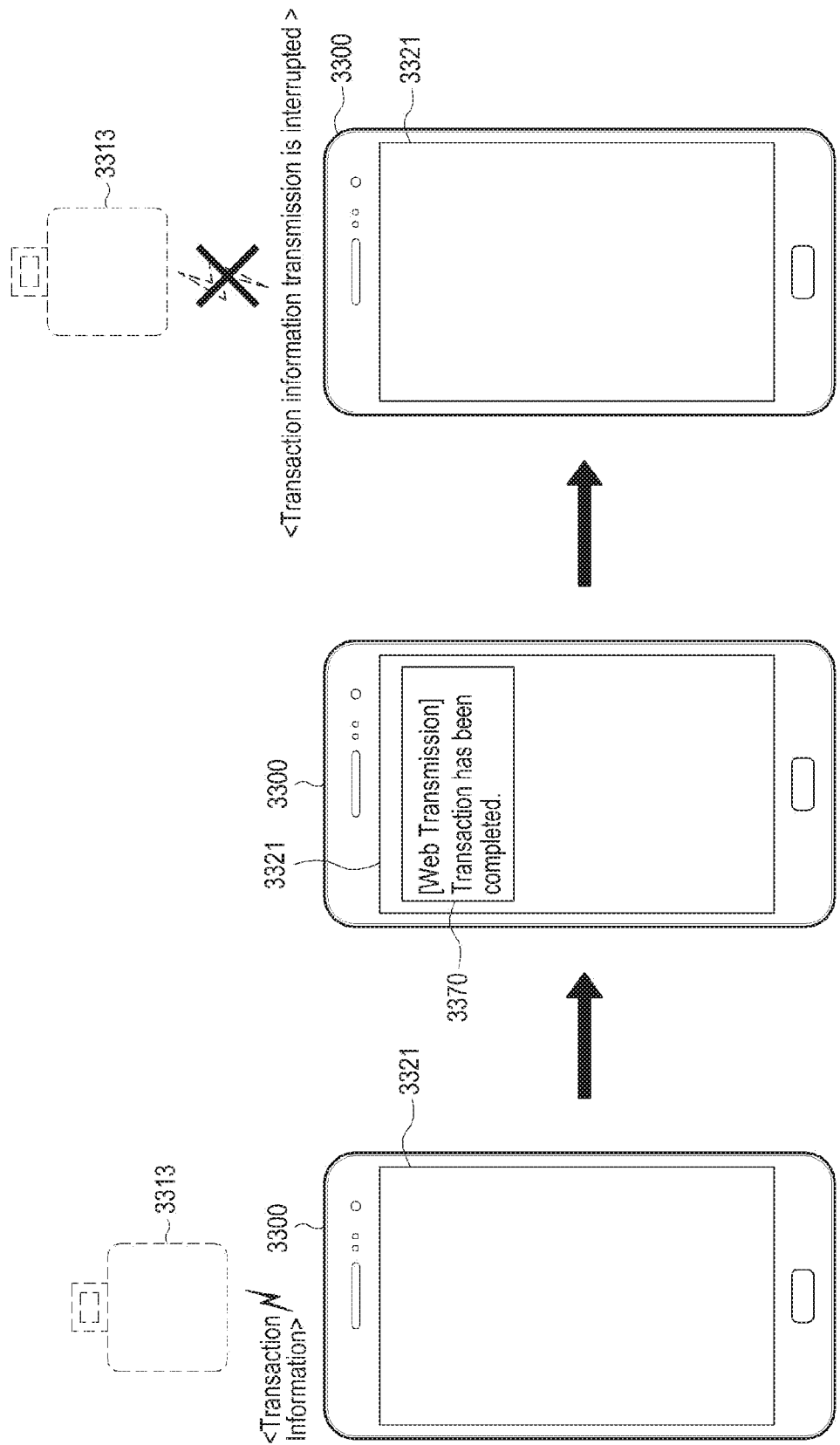
FIG. 33 is a view illustrating a method of displaying a transaction screen according to various embodiments of the present disclosure.

FIG. 33 is a view illustrating a method of displaying a transaction screen according to various embodiments of the present disclosure.

As illustrated in FIG. 33, the electronic device 3300 can be set to refrain from the transaction information transmission to the POS terminal 3313 when a transaction completion massage 3370 including information indicating "transaction has been completed" is received to the POS terminal 3313, and displayed on the display 3321.

Figure 34:
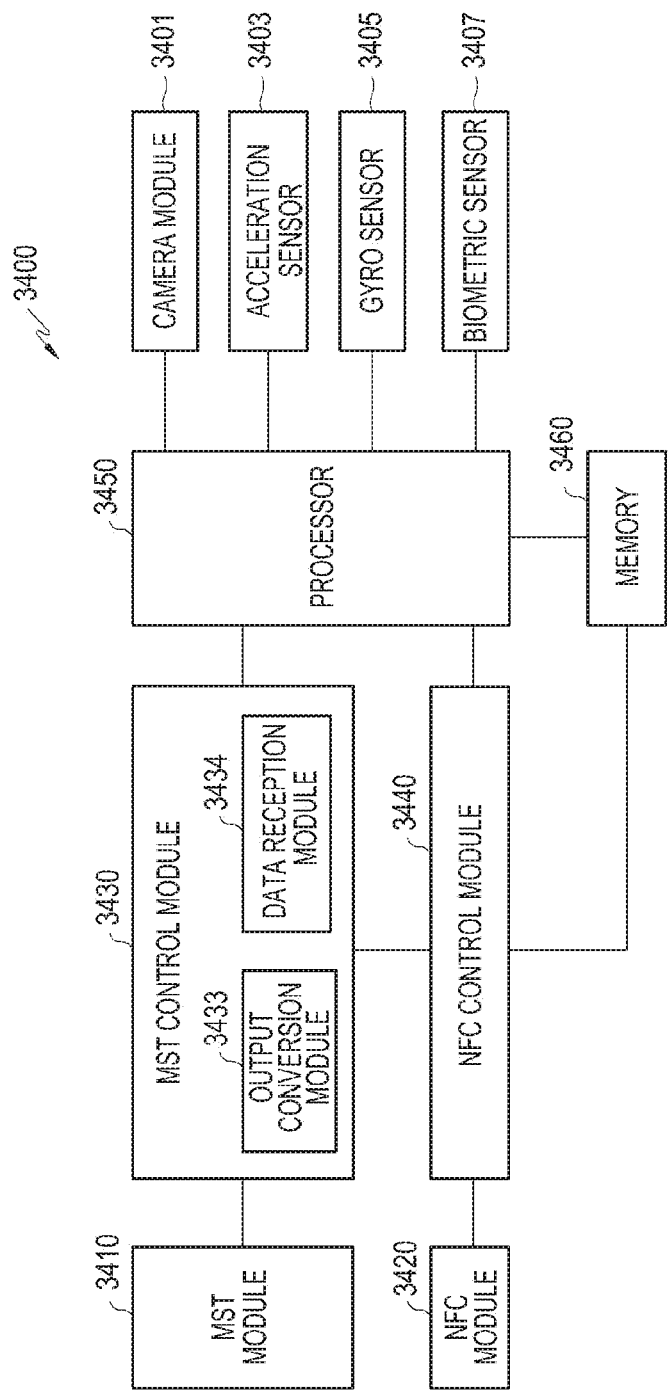
FIG. 34 is a block diagram illustrating a hardware structure of an electronic device that is capable of conducting a transaction function, according to various embodiments.

FIG. 34 is a block diagram illustrating a hardware structure of an electronic device 3400 (e.g., the electronic device 101 of FIG. 1) that is capable of conducting a transaction function, according to various embodiments.

According to one embodiment, the electronic device 3400 can include, for example, a camera module 3401, an acceleration sensor 3403, a gyro sensor 3405, a biometric sensor 3407, an MST module 3410, an NFC module 3420, an MST control module 3430, an NFC control module 3440, a processor 3450, and a memory 3460. The camera module 3401 can capture an image of a card required for transaction so as to acquire card information. The camera module 3401 can recognize card information indicated on the card (e.g., a card company, a card number, an effective date of the card, or a card owner name) through an Optical Character Reader (OCR) function. Alternatively, the user can input necessary card information using an input device (e.g., a touch panel, a pen sensor, a key, an ultrasonic input device, or a microphone input device) included in the electronic device (terminal).

According to one embodiment, the acceleration sensor 3403 or the gyro sensor 3405 can acquire a position state of the electronic device at the time of transaction. The acquired position information of the electronic device is transferred to the processor 3450, and the processor can adjust the intensity of a magnetic field (or the intensity of a current) sent to a POS terminal from the MST module 3410 based on the acquired position state of the electronic device, or in the case where there are a plurality of coil antennas, can select a coil antenna to be used.

According to one embodiment, the biometric sensor 3407 can acquire the user's biometric information (e.g., a fingerprint or an iris) in order to perform the authentication of a card or the user for transaction.

According to one embodiment, the MST module can include a coil antenna. The MST control module 3430 can supply voltages, of which the directions (or polarities) are different from each other, to the opposite ends of the coil antenna and can control the direction of a current flowing in the coil antenna according to data (e.g., 0 or 1 bit). A signal sent through the coil antenna (a magnetic signal generated by a coil in which the current flows) can generate an induced electromotive force in the POS terminal in a manner similar to an operation of causing a magnetic card to be practically read by the POS terminal.

According to one embodiment, the MST control module 3430 can include a data reception module 3434 and an output conversion module 3433. The data reception module 3434 can receive a pulse signal in a logical low/high form that includes transaction information transmitted by the processor 3450 or an internal security module.

The output conversion module 3433 can include a circuit to convert data, which is recognized by the data reception module 3434, into a form that is required for transmission to the MST module 3410. The circuit can include an H-bridge to control the directions of the voltages supplied to the opposite ends of the MST module 3410.

According to one embodiment, based on the card information input through the camera module or an input device (e.g., a touch panel or a pen sensor), the electronic device can receive transaction information (e.g., Track 1, Track 2, Track 3, or token information) included in a magnetic stripe of a magnetic card from a card company/a bank server through a communication module (not illustrated), and can store the transaction information in a form required for the processor or a separate internal security module. The output conversion module and the data reception module can be a single device.

Figure 35:
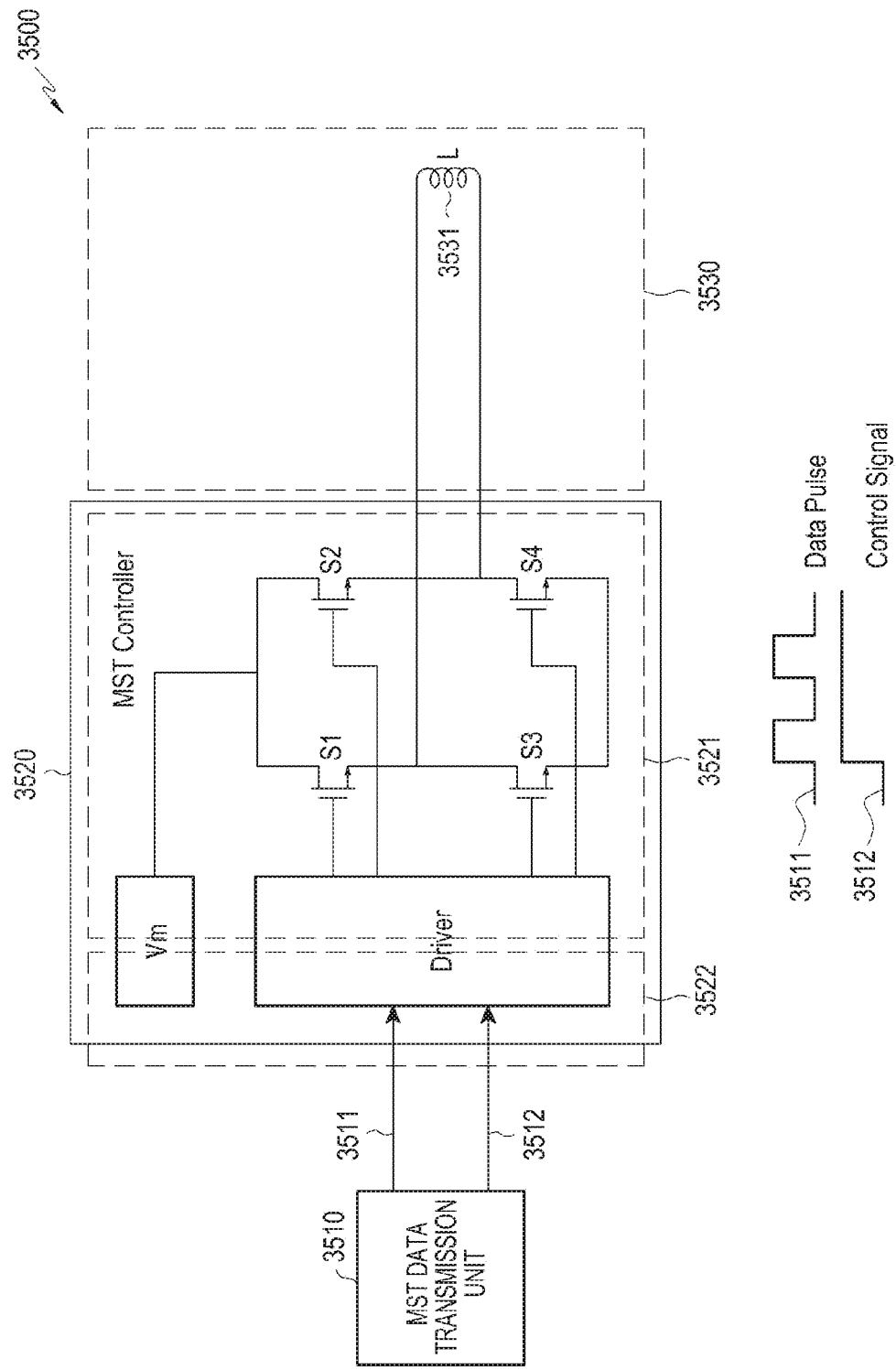
FIG. 35 is a view illustrating a configuration of an MST circuit according to various embodiments.

FIG. 35 is a view illustrating a configuration of an MST circuit according to various embodiments.

According to one embodiment, an MST data transmission unit 3510 can transmit information required at the time of transaction to an MST control module 3520. The MST data transmission unit can be a processor or a security region (Trust zone, Secure World) within the processor. The MST data transmission unit can be a separate internal security module (eSE/UICC) within the electronic device. The MST data transmission unit can transmit a control signal 3512 to be activated for a length of time required for the MST module 3530 together with a pulse signal 3511. According to another embodiment, the MST data transmission unit can transmit differential type data that have different phases, respectively. The MST data transmission unit can differentiate and sequentially transmit Track 1 data, Track 2 data, and Track 3 data included in the magnetic card on time base, or can arrange and transmit respective data to be intersected.

According to one embodiment, the electronic device (e.g., the electronic device 201 of FIG. 2) can simultaneously or sequentially transmit magnetic signals (e.g., an NFC signal and an MST signal) through the communication module 220. The NFC module 228 and the MST module can selectively send transaction information to an external device (e.g., the POS terminal) according to a designated schedule or a signal period (e.g., 0.2 sec). The NFC module 228 and the MST module can selectively operate in a designated time interval so as to reduce power consumption according to the signal transmission, and to prevent duplicate transactions. The user can conduct a transaction merely through an action of bringing the electronic device 201 to come in contact with or to be close to a designated transaction reception device, even if the user does not separately select a communication method.

According to one embodiment, the data reception module 3522 can recognize a low/high state of the transferred pulse signal as data (e.g., 0 bit or 1 bit). Alternatively, the data reception module 3522 can confirm the number of low-to-high transitions for a designated length of time, and can recognize the number as data. For example, when the number of low-to-high transitions for the designated length of time is one, it can be recognized as 0 (zero) bit, and when the number is two, it can be recognized as 1 (one) bit.

According to various embodiments, the output conversion module 3521 can include a circuit to convert the data recognized by the data reception module 3522 into a form required for transfer to the MST module 3530. The circuit can include a first switch S1, a second switch S2, a third switch S3, and a fourth switch S4. The first switch S1 and the fourth switch S4 can have the same control state, and the second switch S2 and the third switch S3 can have the same control state. According to the control states of the switches, the directions of the voltages supplied to the opposite ends of the coil antenna 3531 can be changed. At this time, the voltage level supplied to the antenna can be zero bit or one bit. For example, in the case of zero bit, the first switch and the fourth switch can be turned ON and the second switch and the third switch can be turned OFF, or vice versa. The output conversion module 3521 can change the directions of the voltages (the direction of the current) supplied to the opposite ends of the coil antenna L to be suitable for data recognized by the data reception module 3522, thereby changing the direction of the magnetic field transmitted to an external device (e.g., the POS terminal) through the coil antenna L. This can be similar to a magnetic field that is generated when a magnetic card is swiped through a POS card reader. Each of the switches S1, S2, S3, and S4 can include an N-type MOSFET, a P-type MOSFET, and a relay.

According to one embodiment, although not illustrated in FIG. 35, the MST output unit can include a coil antenna L. The MST output unit can further include an inductor, a capacitor, a resistor, or the like.

According to still another embodiment, although not illustrated in FIG. 35, the MST output unit can further include an amplifier to amplify a signal. The coil antenna can use the NFC antenna or the wireless charge coil antenna in common. According to still another embodiment, a plurality of coil antennas can be provided. Although not illustrated in FIG. 35, one or both of the opposite ends of the coil can be connected to a ground GND without being connected to the MST module.

Figure 36:
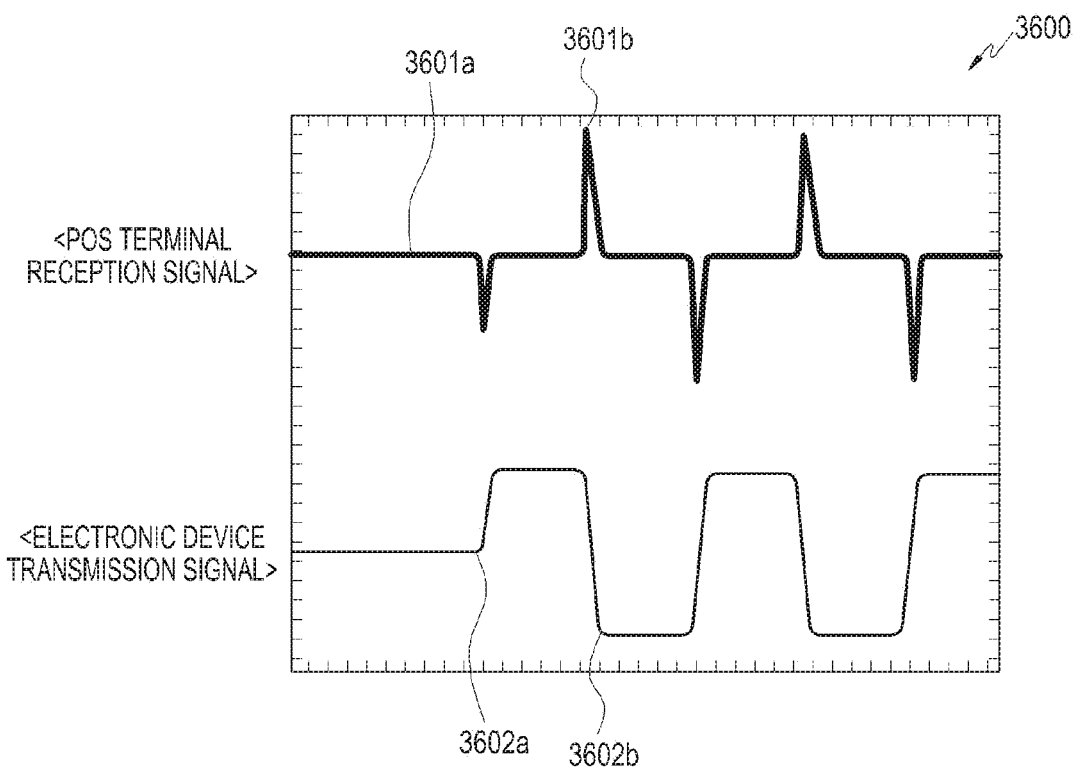
FIG. 36 illustrates a signal sent through the MST output unit and a signal received by an external device (POS terminal)

FIG. 36 illustrates a signal sent through the MST output unit and a signal 3600 received by an external device (POS terminal).

When a signal 3602a or 3602b including transaction data is sent through the MST output unit, the external device can recognize data based on a transition section (rise time) of the sent signal (3601b) among the steady state signal 3601a. In order to improve the recognition rate of the signal (data) transmitted to the external device (e.g., the POS terminal), the inductance value of the coil antenna of the MST output unit and the number of turns can be optimized. For example, the inductance value can be 10 pH or more.

Figure 37:
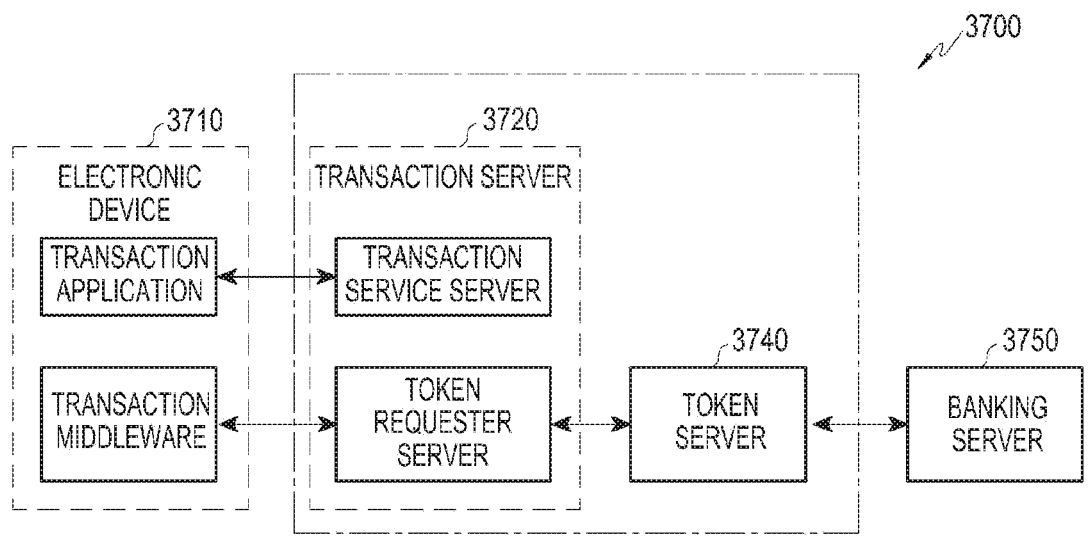
FIG. 37 illustrates a transaction system according to various embodiments.

FIG. 37 illustrates a transaction system 3700 according to various embodiments.

According to various embodiments, a transaction system can include an electronic device 3710 and/or a server. In addition, for example, the server can include a transaction server 3720, a token server (token service provider) 3740, and a banking server (issuer) 3750. The electronic device can include, for example, a transaction application (wallet application) and/or a transaction middleware. The transaction server can include, for example, a transaction service server and/or a token requester server.

According to various embodiments, the transaction application can include a transaction application (e.g., Samsung Pay application). The transaction application can provide, for example a user interface related to a transaction (e.g., a UI (user interface) or a UX (user experience)). The user interface related to the transaction can include a wallet user interface (wallet UI/UX). For example, the transaction application can provide a user interface related to a card registration, a payment, or a transaction. The transaction application can provide, for example, an interface related to the card registration through a character reader (e.g., OCR (optical character reader/recognition)) or an external input (e.g., a user input). In addition, the transaction application can provide, for example, an interface related to user authentication through [ID&V].

According to various embodiments, the transaction application can perform a transaction using the transaction application. For example, the transaction application can provide a transaction function to the user through the execution of Simple Pay, Quick Pay or a designated application. The user can conduct the transaction function using the transaction application, and can receive information related to the transaction function.

According to various embodiments, the transaction middleware can include information related to the card company. For example, the transaction middleware can include a card company software development kit (SDK).

According to various embodiments, the transaction service server can include a management server for an electronic transaction or a mobile transaction. The transaction service server can receive information related to a transaction from, for example, the electronic device and can transmit the information to the outside or can process the information in the transaction service server.

According to various embodiments, the transaction service server can transmit/receive information between the electronic device and the token server using the transaction service server and/or the token requester server. The transaction service server can include, for example, a transaction service server (e.g., Samsung transaction service server). The transaction service server can manage card information interlocked with, for example, a service account (e.g., Samsung account) or a user account. In addition, the transaction service server can include an Application Program Interface (API) server related to the transaction application. In addition, the transaction service server can provide, for example, the account management module (e.g., account integration or Samsung account integration).

According to various embodiments, the token requester server can include an interface for processing information related to a transaction. For example, the token requester server can perform issue, deletion, or activation of the information related to the transaction (e.g., token). Alternatively, the token requester server can be functionally connected to the transaction middleware to control information required for the transaction.

According to various embodiments, the transaction application included in the electronic device and the transaction service server included in the transaction service server can be functionally connected with each other. For example, the transaction application can transmit/receive the information related to the transaction with the transaction service server. According to one embodiment, the transaction middleware included in the electronic device and the token requester server included in the transaction service server can be functionally connected with each other. For example, the transaction middleware can transmit/receive the information related to the transaction with the token requester server.

According to various embodiments, the token server can issue information related to a transaction (e.g., token) or can manage the information related to the transaction. For example, the token server can control an operation period of the token (life cycle), and the operation period can include a generation, correction, or deletion function. In addition, the token server can include, for example, a token management server, and can perform token provision, [ID&V], replenishment, or life cycle management. In addition, the token server can perform banking server integration.

According to various embodiments, the transaction service server and/or the token server can be positioned in the same zone, similar regions, or separated regions. For example, the transaction service server can be included in a first server, and the token server can be included in a second server. In addition, for example, the transaction service server and the token server can be implemented to be separated from each other in a single server (e.g., the first server or the second server).

According to various embodiments, the banking server can perform card issuance. For example, the banking server can include a card issue bank. In addition, the banking server can generate information required for transaction, which is provided to the user. The user can store the information required for the transaction, which is generated by the banking server, in the electronic device using the transaction application. In addition, the banking server can be functionally connected to the token server so as to transmit/receive the information required for the transaction.

Although not illustrated, the electronic device can also transmit data required for transaction as bit values of track information (Track 1, Track 2, and Track 3) included in a practical magnetic card.

Figure 38:
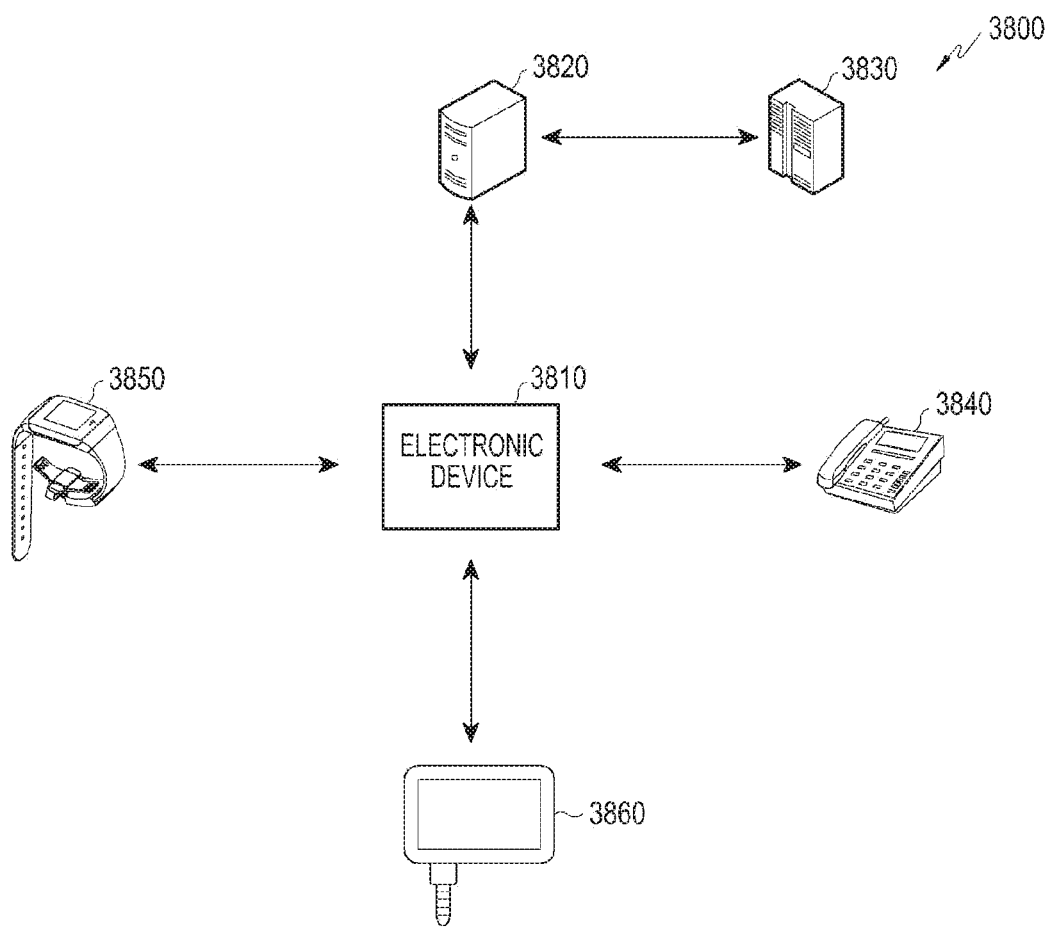
FIG. 38 is a block diagram illustrating a transaction system to perform a transaction, according to various embodiments.

FIG. 38 is a block diagram illustrating a transaction system 3800 to perform a transaction, according to various embodiments.

Referring to FIG. 38, the transaction system 3800 can include an electronic device 3810, a transaction service server 3820, a Token Service Provider (TSP) 3830, and a POS terminal 3840. According to one embodiment, the transaction system 3800 can include one or more additional electronic devices 3850 and 3860. The one or more additional electronic devices can include a wearable device 3850 (e.g., a smart watch) that is capable of being functionally (e.g., communication) connected to the electronic device 3810 and an accessory 3860 (e.g., loopy fob).

According to one embodiment, the transaction service server 3820 can acquire token information corresponding to the registered card information from the token service provider 3830 and can transmit the token information to the electronic device 3810. The transaction service server 3820 can include, for example, a transaction service server or a token requester server. The transaction service server can manage the user's card information. The transaction service server can provide a service related to a transaction based on an account. The token requester server can request token information required for a transaction operation from a token service provider 3830 to acquire the token information.

For example, the token service provider 3830 can issue a token to be used in the process of transaction. According to one embodiment, the token can be a value that replaces a Primary Account Number (PAN) which is card information. According to one embodiment, the token can be produced by using a Bank Identification Number (BIN).

According to one embodiment, the electronic device 3810 can perform a transaction operation. In order to perform the transaction function, the electronic device 3810 can register a card (e.g., Master Card or Visa Card) in the electronic device 3810 or a transaction service server (e.g., a first external device). Besides the card registered through the electronic device 3810, the transaction service server 3820 can manage information on a plurality of registered cards including a card registered through a user's other electronic device (e.g., a wearable device 3850) corresponding to the electronic device 3810 or another card registered through an electronic device of another user. According to one embodiment, the transaction service server 3820 can acquire token information corresponding to the registered card information from the token service provider 3830 (e.g., a second external device) and can transmit the token information to the electronic device 3810.

The token service provider 3830 can issue a token to be used in the process of transaction.

According to one embodiment, the transaction information transmitted by at least one coil (e.g., the flat coil 653 of FIG. 6) can include data of track units. The data of track units can include one or more fields among, for example, SS (Start Sentinel), FC (Format Code), PAN (Primary Account Number), FS (Field Separator), NM (Name), AD (Additional Data), DD (Discretionary Data), ES (End Sentinel), USD (Use and Security Data), and LRC (Longitude Redundancy Check). For example, first track data can include fields of SS, FC, PAN, NM, FS, AD, DD, ES, and LRC, second track data can include fields of SS, PAN, FS, AD, DD, ES, and LRC, and third track data can include fields of SS, FC, PAN, FS, USD, AD, ES, and LRC. At least one coil (e.g., the flat coil 653 of FIG. 6) can transmit data values, which are configured in the first track data, the second track data, and the third track data in bit units, to the POS terminal through a signal.

According to one embodiment, the transaction information transmitted by at least one coil can include data in a token form including information related to the transaction card. For example, the token type data can include token information and cryptogram information, the token information can include card identification (ID) information received from the card company, the cryptogram information can include transaction data, and the transaction data can include one or more of expiration date information of the card used at the time of transaction and member store identification (ID) information received from the POS terminal.

According to one embodiment, at least one coil can transmit the first track data, the second track data, and the third track data to the POS terminal in the form in which one or more track data are substituted with token information and cryptogram information by the control circuit. For example, among the track data, AD (Additional Data) and DD (Discretionary Data) can be substituted with the cryptogram information, and PAN information can be substituted with token information. In this case, there is an advantage in that because data of track units, which have been used when using the existing card, can be used in transmitting the transaction information, the transaction can be performed only with the token information without changing separate data on the POS terminal.

According to one embodiment, among the plurality of coils, the first coil (e.g., the first coil 2453*f* in FIG. 24C) can transmit the data of the first track to the POS terminal, and the second coil (e.g., the second coil 2453*g* of FIG. 24C) can transmit the data of the second track to the POS terminal.

According to one embodiment, a generated token can be encoded by the token service provider 3830, or can be transmitted to the transaction service server 3820 in the state where the token is not encoded and then can be encoded by the service server 3820. The encoded token information can be transferred to the electronic device 3810 through the transaction service server 3820, and then can be decoded in the electronic device 3810. According to one embodiment, the token can be generated and encoded in the token service provider 3830, and can be transferred to the electronic device 3810 without passing through the transaction service server 3820. According to another embodiment, the transaction service server 3820 can also include a token generation function. In such a case, the token service provider 3830 may not be separately used in the transaction system.

The electronic device 3810 can perform a transaction by using at least one of one or more other electronic devices 3850 and 3860 that are functionally connected based on, for example, short distance communication (e.g., Bluetooth or WiFi). According to one embodiment, the other electronic device 3850 (e.g., a third external device) can be a wearable device (e.g., a smart watch). According to one embodiment, the other electronic device 3860 (e.g., a fourth external device) can be an accessory (e.g., a loopy fob). In such a case, the electronic device 3810 can be functionally connected with the accessory (e.g., the loopy fob) through an input/output interface thereof (e.g., an earphone).

Figure 39:
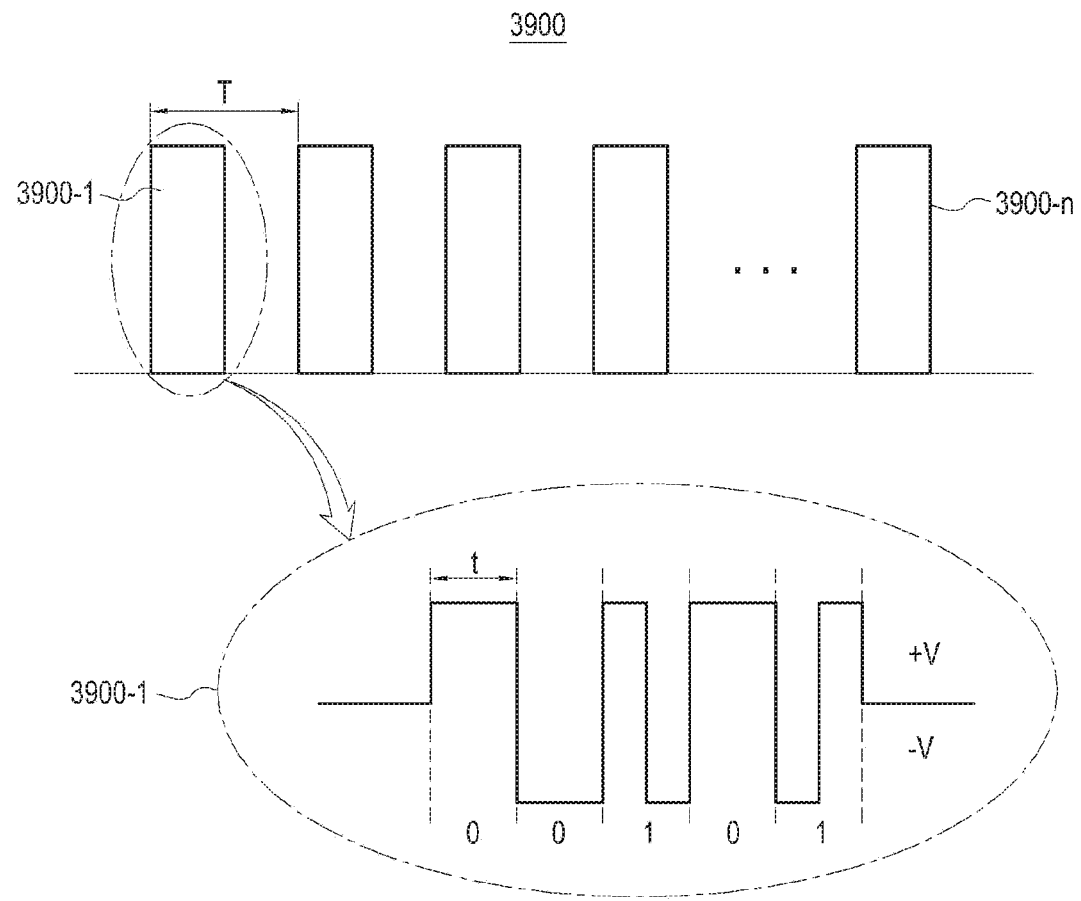
FIG. 39 is a graph illustrating a transmission form of transaction information according to various embodiments of the present disclosure.

FIG. 39 is a graph illustrating a transmission form of transaction information according to various embodiments of the present disclosure.

As in FIG. 39, the electronic device (e.g., the electronic device 101 of FIG. 1) can send a signal to the POS terminal (e.g., the POS terminal 3313 of FIG. 33) at least once through one or more coils, and can generate a sequence of a plurality of signals using first transaction information and/or second transaction information. For example, the electronic device can store instructions that cause a sequence of a plurality of signals to be magnetically set to the outside through a conductive pattern. For example, At least one signal in the sequence of the plurality of signals can include pulses indicating the entirety of first transaction information and/or second transaction information. In another example, the electronic device (e.g., the electronic device 101 of FIG. 1) can periodically send an MST signal containing transaction information through an MST module N times. Each of first to nth MST signals 3900-1 to 3900-*n* can include a pulse indicating 0 or 1. For example, when the voltage of the pulse is not changed for a predetermined length of time t, the time interval can indicate "0", and when the voltage is changed (when the phase is changed), the time interval can indicate "1." According to one embodiment, the MST module can periodically send an MST signal. For example, the MST signal can include transaction information included in at least a part of a card. For example, each of MST signals 3900 (e.g., first to nth MST signals 3900-1 to 3900-*n*) can include information of at least a part of Track 1, Track 2, Track 3, and a token of the card.

Figure 40A:
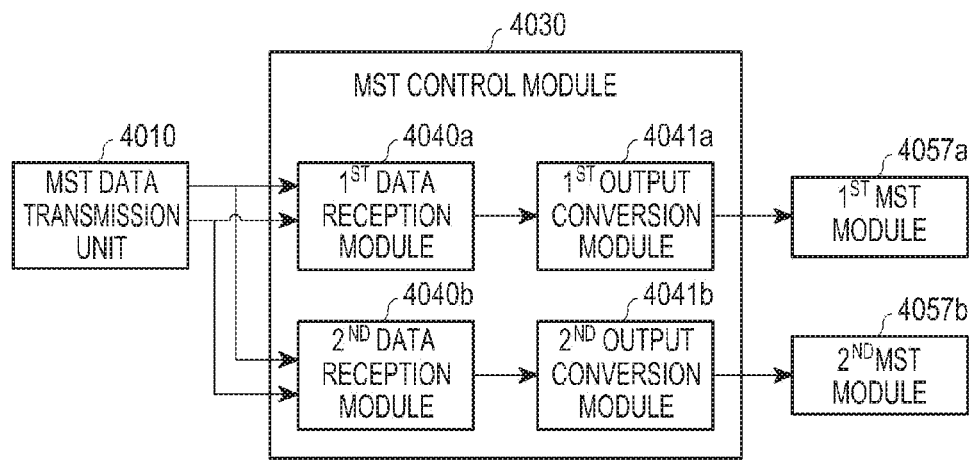
FIGS. 40A to 40C illustrate a hardware block diagram within an electronic device including a plurality of MST modules.
Figure 40B:
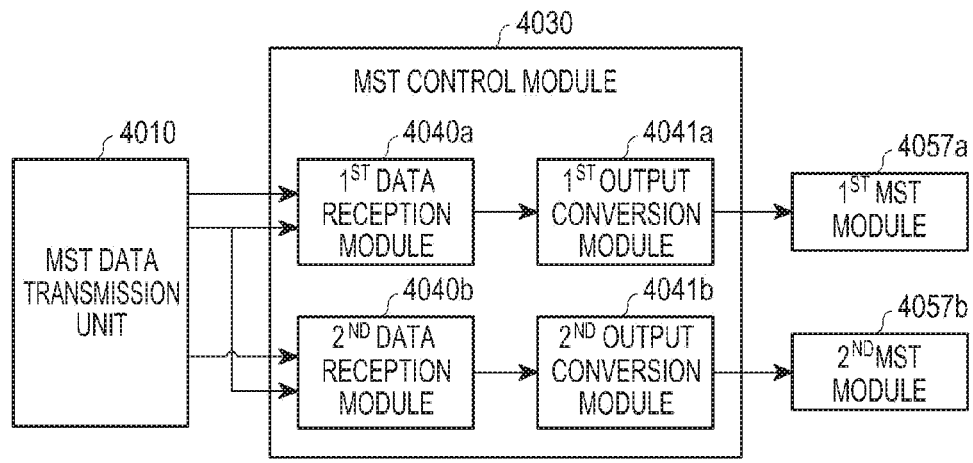
Figure 40C:
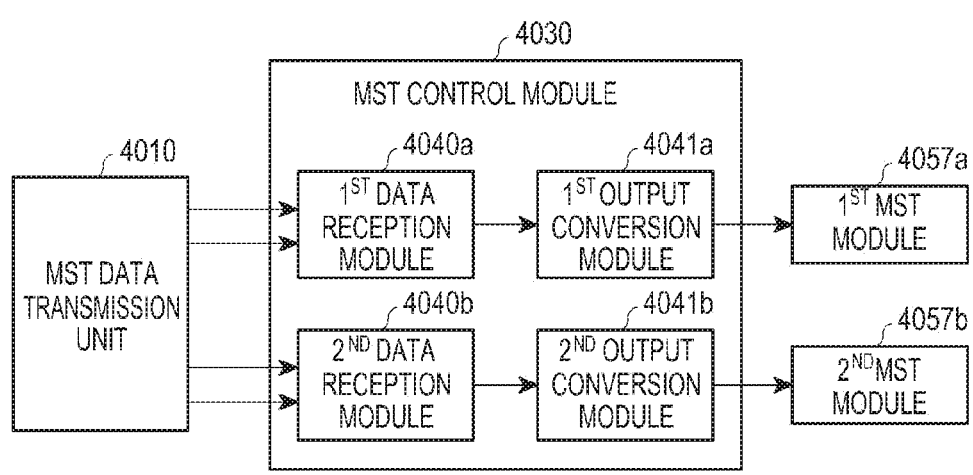

FIGS. 40A to 40C illustrate a hardware block diagram within an electronic device including a plurality of MST modules.

According to one embodiment, as in FIG. 40A, the first MST module 4057*a* and the second MST module 4057*b* can transmit the same data to an external device. For example, the first MST module 4057*a* and the second MST module 4057*b* can be different types of coil antennas. For example, the first MST module 4057*a* and the second MST module 4057*b* can be positioned to be spaced apart from each other. For example, the voltages or currents transferred to the first MST module 4057*a* and the second MST module 4057*b* can have different levels (magnitudes), respectively. For example, a first data reception module 4040*a* and a second data reception module 4040*b* within the MST control module 4030 can receive one or more same signals from an MST data transmission unit 4010. For example, the first output conversion module 4041*a* and the second output conversion module 4041*b* receive one or more same signals from the MST data transmission unit 4010 and transmits the received one or more same signals from the MST data transmission unit 4010. For example, the MST data transmission unit 4010 can transmit MST signals (not illustrated) including the same transaction information to the first data reception module 4040*a* and the second data reception module 4040*b*. In another example, the MST data transmission unit 4010 can transmit a control signal (not illustrated) to activate the first MST module 4057*a* and the second MST module 4057*b* equally to the first data reception module 4040*a* and the second data reception module 4040*b*. For example, in response to the reception of the control signal, the MST control module 4030 can control the first MST module 4057*a* and the second MST module 4057*b* to send the MST signals to the outside.

According to one embodiment, when a plurality of MST output conversion modules are provided as in FIG. 40B, the first data reception module 4040*a* and the second data reception module 4040*b* within the MST control module 4030 can receive one or more same signals from the MST data transmission unit 4010. For example, the first output conversion module 4041*a* and the second output conversion module 4041*b* receive one or more same signals from the MST data transmission unit 4010 and transmits the received one or more same signals from the MST data transmission unit 4010. The MST data transmission unit 4010 can transmit MST signals (not illustrated) including the same transaction information to the first data reception module 4040*a* and the second data reception module 4040*b*, and can transfer different control signals (not illustrated) to the first data reception module 4040*a* and the second data reception module 4040*b*, respectively, to independently control the first MST module 4057*a* and the second MST module 4057*b*, respectively. The first MST module 4057*a* and the second MST module 4057*b* can be sequentially activated based on the control signals and can send a part of the MST signals, respectively. For example, the first MST module 4057*a* can be activated first to sequentially transmit a plurality of sequences of signals. Then, the second MST module 4057*b* can be activated to sequentially transmit a plurality of sequences of signals.

According to one embodiment, the MST data transmission unit can transmit the same pulse signals (including the same transaction information) to the first data reception module and the second data reception module, and with respect to a control signal to activate each output conversion module, the MST data transmission unit can transfer different signals to the first data reception module and the second data reception module so that the first output conversion module and the second output conversion module can be independently controlled. For example, the first output conversion module and the second output conversion module can be sequentially activated based on the control signals. For example, the first output conversion module and the second output conversion module can be activated in an intersection manner to send signals to an external device (e.g., a POS terminal). For example, the first output conversion module and the second output conversion module can be simultaneously activated. For example, the first output conversion module and the second output conversion module can be selectively activated according to the state of the electronic device (terminal). For example, when NFC communication is activated in the electronic device (terminal) by using a loop antenna (or an antenna) adjacent to the first output conversion module, the MST data transmission unit can activate the second output conversion module to send the MST signals. For example, in the case where when a signal has been sent by activating at least one of the first output conversion module and the second output conversion module but the signal has not been recognized well, and thus the user wishes to cause the signal to be recognized again by moving the electronic device (terminal), the first output conversion module and the second output conversion module can be simultaneously activated. For example, when the electronic device (terminal) is vertically erected, the second output conversion module can be activated, and when the electronic device (terminal) is horizontally laid, the first output conversion module can be activated.

According to one embodiment, the MST data transmission unit can transmit a control signal to activate the first output conversion module and the second output conversion module equally to the first data reception module and the second data reception module, and can transmit different pulse signals (including different transaction information) to the first data reception module and the second data reception module, respectively. For example, Track 1 information and Track 2 information can be transferred to the first data reception module and the second data reception module, respectively.

According to one embodiment, when a plurality of MST modules are provided as in FIG. 40C, a first data reception module and a second data reception module within the MST control module can receive one or more same signals from the MST data transmission unit 4010, and the first output conversion module 4041a and the second output conversion module 4041b receive one or more same signals from the MST data transmission unit 4010 and transmits the received one or more same signals from the MST data transmission unit 4010.

According to one embodiment, the MST data transmission unit can transmit the same pulse signals (including the same transaction information) to the first data reception module and the second data reception module, respectively, and can transfer different control signals to the first data reception module and the second data reception module, respectively, to independently control the first MST module and the second MST module. For example, the first MST module and the second MST module can also be sequentially activated based on the control signals. For example, the first MST module and the second MST module can activate in an intersection manner to send signals to an external device (e.g., a POS terminal). For example, the first MST module and the second MST module can be simultaneously activated. The first MST module and the second MST module can be selectively activated according to the state of the electronic device. For example, when short distance wireless communication (e.g., NFC) is activated by using a coil antenna adjacent to the first MST module or when cellular network wireless communication is activated by using an adjacent antenna, the MST data transmission unit can activate the second MST module to send an MST signal. For example, when at least one of the first MST module and the second MST module is activated to send a signal but the signal is not recognized well, and thus the user moves the electronic device to cause the signal to be recognized again, (i.e., when tagging occurs repeatedly), this can be recognized by a sensor and the first MST module and the second MST module can be simultaneously activated.

According to one embodiment, the MST data transmission unit can transmit a control signal to activate the first MST module and the second MST module equally to the first data reception module and the second data reception module, and can transmit different pulse signals (including different transaction information) to the first data reception module and the second data reception module, respectively. For example, Track 1 information and Track 2 information can be transferred to the first data reception module and the second data reception module, respectively.

Figure 41A:
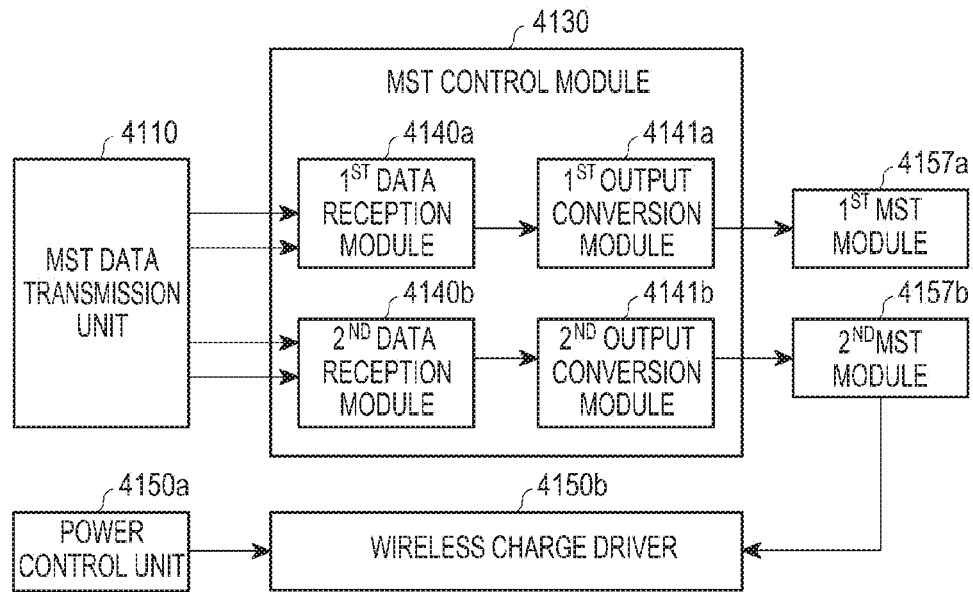
FIGS. 41A to 41C are hardware block diagrams within an electronic device.
Figure 41B:
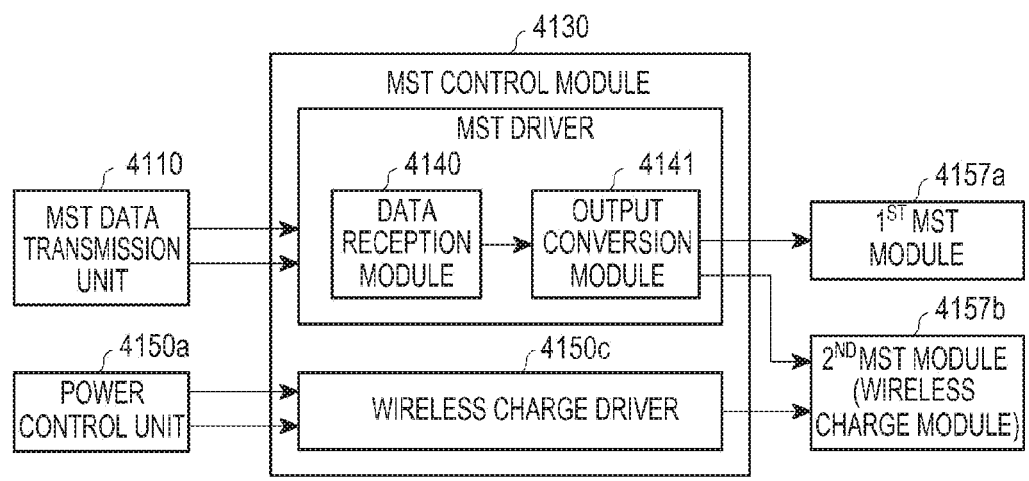
Figure 41C:
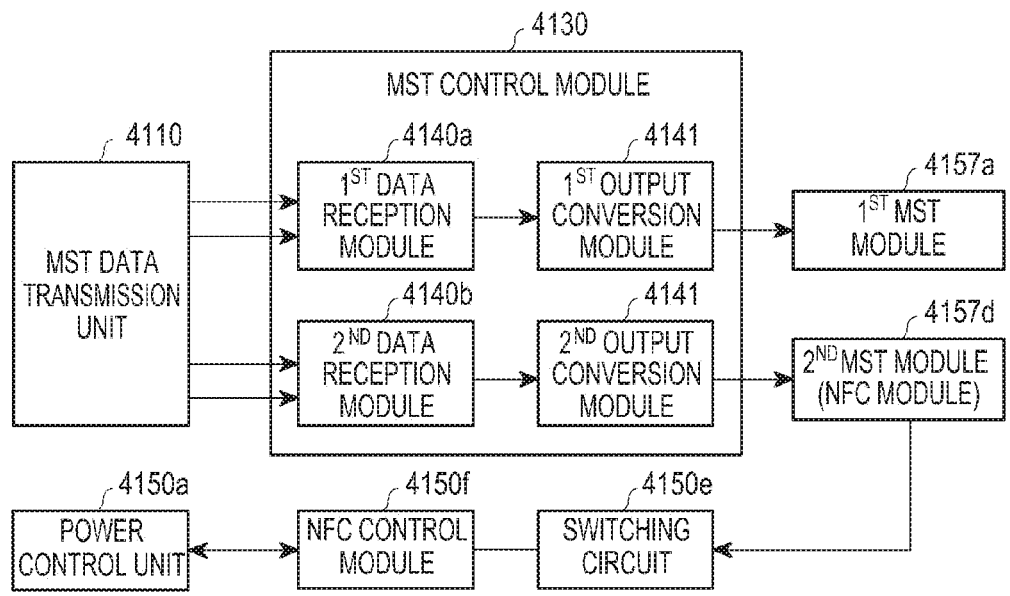

FIGS. 41A to 41C are hardware block diagrams within an electronic device.

Referring to FIG. 41A, a first data reception module 4140a and a second data reception module 4140b within the MST control module 4130 can receive one or more same signals from the MST data transmission unit 4110, and the first output conversion module 4141a and the second output conversion module 4141b receive one or more same signals from the MST data transmission unit 4110 and transmits the received one or more same signals from the MST data transmission unit 4110. For example, when the second MST module 4157b is connected to a wireless charge control module 4150b to operate as a wireless charge module (wireless charge coil antenna), the MST control module 4130 can further include a switching unit that causes the second MST module 4157b not to be connected to the MST control module 4130 (open state). The wireless charge control module can include an AC/DC converter, a rectifying unit, or the like. A power control unit 4150a can include a power management module (e.g., the power management module 295 of FIG. 2) included in an electronic device (terminal). According to one embodiment, the MST module (e.g., the first module 4157a and the second MST module 4157b) can include a coil antenna having an inductance value of, for example, about 10 pH.

Referring to FIG. 41B, the electronic device can use at least one MST module among a plurality of MST output units (e.g., the first MST module 4157a and the second MST module 4157b) that can be connected to the wireless charge driver 4150c. For example, the MST/wireless charge control module 4130 can include an MST data reception module 4140, an MST output conversion module 4141, or the wireless charge driver 4150c.

Referring to FIG. 41C, the electronic device (e.g., the electronic device 101) can use at least one MST module among a plurality of MST output units as an NFC coil antenna 4157d. For example, when the second MST module is used as the NFC coil antenna 4157d, the electronic device can further include a switching circuit 4150e in order to adjust the number of turns or the inductance value of the coil antenna. When another MST module among the MST modules is used for short distance wireless communication, the MST module can be implemented in a completely opened (high impedance) form through an internal switch. For example, the NFC control module 4150f controls the power control unit 4150a in accordance with the signal transmitted from the switching circuit 4150e.

Figure 42:
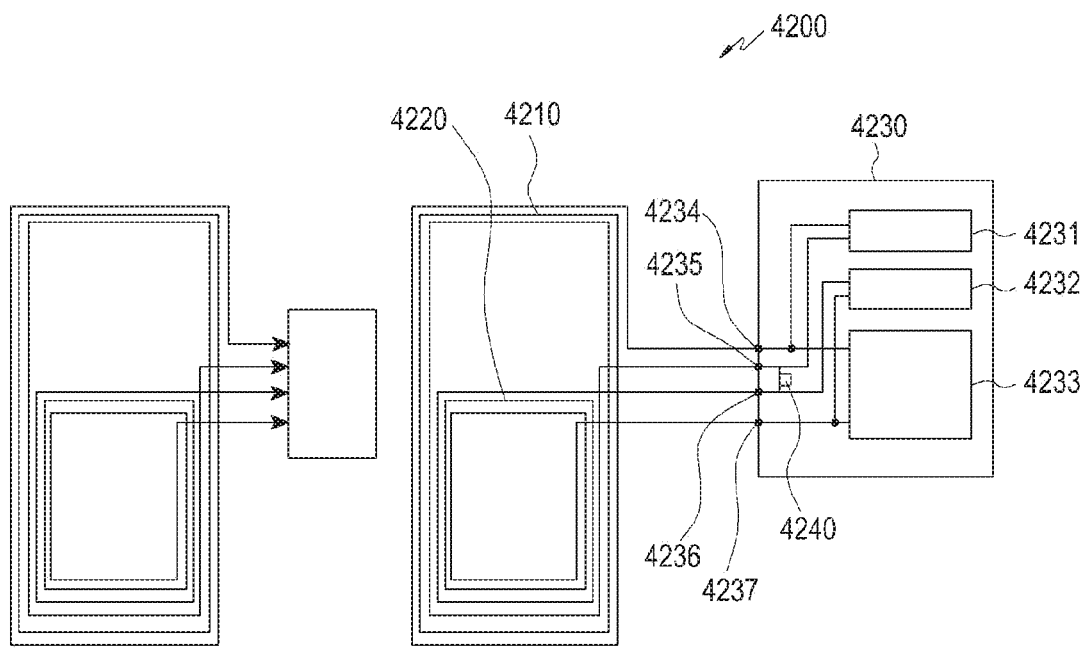
FIG. 42 is a view illustrating an internal structure of an electronic device according to various embodiments.

FIG. 42 is a view illustrating an internal structure of an electronic device according to various embodiments.

Referring to FIG. 42, in order to adjust the number of turns or an inductance value of a coil antenna, the electronic device can include a switching circuit. For example, the switching circuit can be included in a control module (e.g., a processor) within the electronic device. The switching circuit can be included in a part of a path of an antenna.

According to various embodiments of the present disclosure, an antenna device 4200 can be a component of the electronic device (e.g., the electronic device 101 of FIG. 1) and can include a first loop antenna 4210, a second loop antenna 4220, a communication module 4230, and a switch 4240. The communication module 4230 can include a first communication module 4231, a second communication module 4232, third communication module 4233, and four terminals 4234 to 4237.

According to various embodiments, the first communication module 4231 can be electronically connected to the first loop antenna 4210 through the first terminal 4234 and the second terminal 4235 so as to transmit/receive electromagnetic waves of short distance communication. For example, the first communication module 4231 can be a resonance charge (e.g., A4WP (Alliance for Wireless Power)) module, and can receive electromagnetic waves through the first loop antenna 4210.

According to various embodiments, the second communication module 4232 can be electrically connected to the second loop antenna 4220 through the third terminal 4236 and the fourth terminal 4237 so as to receive electromagnetic waves of short distance communication. For example, the second communication module 4232 can operate as an NFC module.

According to various embodiments, the third communication module 4233 can be electrically connected to the first loop antenna 4210 and the second loop antenna 4220 through the terminals 4234 to 4237 and the switch 4240 so as to send electromagnetic waves of short distance communication (e.g., MST or WPC (Wireless Power Consortium)). For example, in the state where the switch 4240 is turned ON, when a current is supplied from the third communication module 4233 to the first terminal 4234, the current flows into the second terminal 4235 through the first terminal 4234 and via the first loop antenna 4210, and subsequently, the current flows into the third communication module 4233 through the switch 4240, the third terminal 4236, and the second loop antenna 4220, and via the fourth terminal 4237. In this way, the first loop antenna 4210 and the second loop antenna 4220 form a path by the switch 4240, and the third communication module 4233 can transmit/receive electromagnetic waves through the path.

According to various embodiments of the present disclosure, the ON/OFF operation of the switch 4240 can be can be controlled by the communication module 4230 or a control module within the electronic device (e.g., AP). For example, the switch 4240 can be included in the communication module 4230 as illustrated. However, without being limited thereto, the switch 4240 can be provided in any place if it is possible to electrically connect the first loop antenna 4210 and the second loop antenna 4220. However, the position of the switch 4240 can be determined in consideration of the length of the path, the number of turns of the path, an inductance value, or the like such that a specific frequency of the third communication module 4233 can be selected (i.e., resonated).

FIGS. 43A to 43D are views illustrating different embodiments that use a plurality of coil antennas.

Figure 43A:
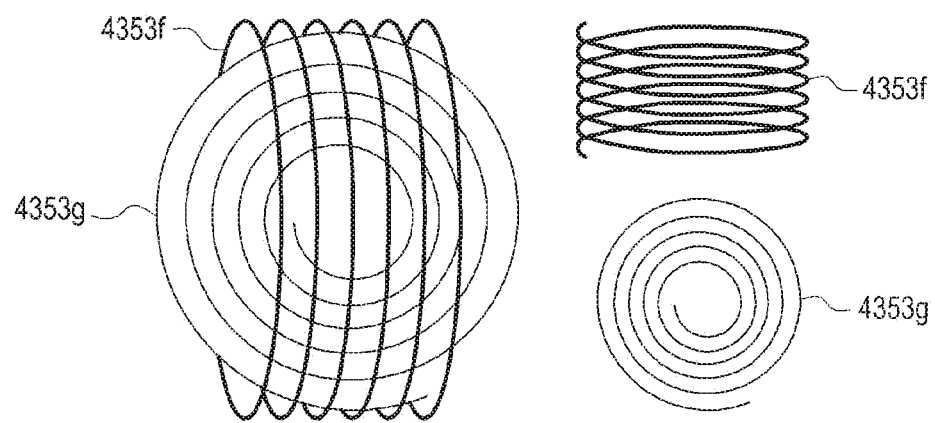
FIGS. 43A to 43D are views illustrating different embodiments that use a plurality of coil antennas.
Figure 43B:
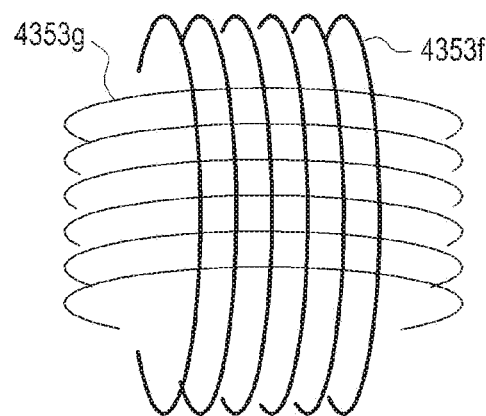

Referring to FIGS. 43A and 43B, the plurality of coil antennas can be implemented by various combinations of flat coil antennas and solenoid coil antennas.

Figure 43C:
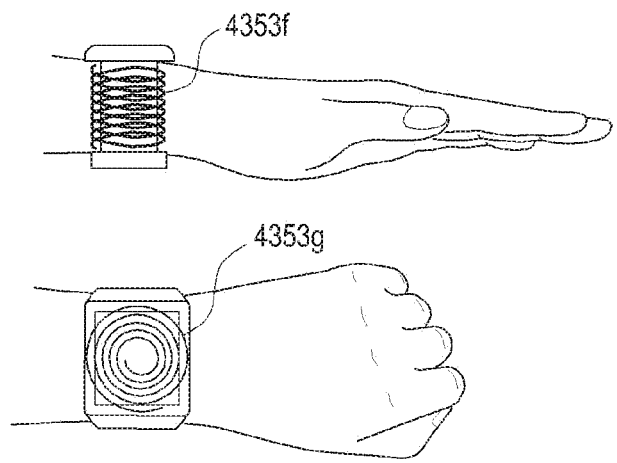
Figure 43D:
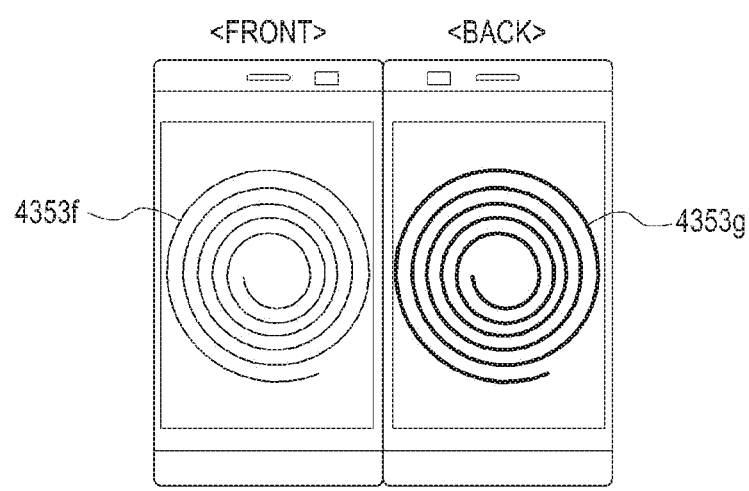

In the case where the plurality of coil antennas are used for a wearable terminal, a second coil antenna 4353g can be implemented on a rear surface of an LCD and a first coil antenna 4353f can be embedded in a wrist strap, as in FIG. 43C. According to another embodiment, a terminal, which includes two or more displays, can include, on the rear surfaces of the LCDs, coil antennas that are separated from each other, as illustrated in FIG. 43D.

In still another example, the plurality of coil antennas can simultaneously operate, or can separately operate in a time division manner. The coil antennas can be selectively used according to an angle of the terminal or a movement of the terminal (tagging information).

The terminal can guide, through an output device, an area in which recognition can be performed well. According to various embodiments, the terminal can receive data sent from an MST coil antenna of another electronic device by using an MST coil antenna.

As described above, according to various embodiments of the present disclosure, an electronic device may include: a housing; a conductive pattern that is arranged within the housing and is formed to generate a magnetic field; a plate that forms at least a part of a first surface of the housing and includes a material that at least partially transmits the magnetic field generated by the conductive pattern; and a communication circuit that is configured to transmit at least one transaction information to an external device by using the conductive pattern. The conductive pattern may include: a first end that is electrically connected to the communication circuit; a second end that is electrically connected to the communication circuit; and a coil that is connected between the first end and the second end and includes a plurality of turns that are substantially parallel to a surface of the plate. When viewed from the upper side of the plate, the coil may include: a first section that includes portions of conductive lines which extend substantially parallel to each other; and a second section that includes other portions of the conductive lines at a position that is different from that of the first section. The first section may have a structure that radiates a greater amount of magnetic fluxes than the second section.

According to various embodiments, when viewed from the upper side the plate, a width of the portions of the conductive lines within the first section may be wider than that of the other portions of the conductive lines within the second section.

According to various embodiments, the electronic device may further include a display that is exposed on a second surface of the housing, which faces a direction opposite to the plate.

According to various embodiment, when viewed from the upper side of the first surface of the housing, one of the first section and the second section may be arranged in a central portion of the coil.

According to various embodiments of the present disclosure, an electronic device may include: a housing; a conductive pattern that is arranged within the housing and includes a plurality of coils; a plate that forms at least a part of a first surface of the housing and includes a material that at least partially transmits a magnetic field or an electric field generated by the conductive pattern; and at least one control circuit that is electrically connected to the conductive pattern. The control circuit may be configured to: transmit at least one transaction information outwardly by generating the magnetic field by using at least one of the plurality of coils; transmit at least one transaction information by using near field communication (NFC) by using at least one of the plurality of coils; and receive power wirelessly from outside by using at least one of the plurality of coils.

According to various embodiments, the plurality of coils may include a first coil, a second coil, and a third coil, each of which includes a plurality of turns that are substantially parallel to the first surface of the housing.

According to various embodiments, when viewed from the upper side of the first surface, the first coil, the second coil, and the third coil may not at least partially overlap with each other.

According to various embodiments, when viewed from the upper side of the first surface, at least one of the first coil, a second coil, and a third coil may enclose another one of remaining coils.

According to various embodiments, at least two of the first coil, the second coil, and the third coil may be formed in a plane that is parallel to the surface of the plate.

According to various embodiments of the present disclosure, an electronic device may include: a magnetic secure transfer (MST) module; and at least one coil connected to the MST module. The at least one coil may form a first current loop that has a first shape and a first size and a second current loop that has a second shape and a second size.

According to various embodiments, the first current loop may be formed to rotate a current in a direction that is different from the second current loop.

According to various embodiments, at least a part of the first current loop may be formed within the second current loop.

According to various embodiments, the first current loop may be formed to have a number of turns that is smaller than that of the second current loop.

According to various embodiments, at least one of the first current loop and the second current loop may be formed to include a first portion having a first width and a second portion having a second width.

According to various embodiments, the first current loop may be capable of transmitting a magnetic signal that oscillates in a first direction, and the second current loop may be capable of transmitting a magnetic signal that oscillates in a second direction that is different from the first direction.

According to various embodiments, the electronic device may further include a housing that accommodates the coil. At least one of the first current loop and the second current loop may be formed on or in the housing.

According to various embodiments, the housing may include a plurality of surfaces including a first surface and a second surface. The first current loop may be formed on the first surface and the second current loop may be formed on the second surface.

According to various embodiments, at least one of the first current loop and the second current loop may include at least a part of a conductive bezel that at least partially encloses the electronic device.

According to various embodiments, the MST module may be set to transmit information related to a transaction through at least one of the first current loop and the second current loop.

According to various embodiments, at least one of the first current loop and the second current loop may be selected based on an orientation of the electronic device in relation to an external device that is to receive the information.

According to various embodiments of the present disclosure, an electronic device may include: at least one coil; a MST module connected to the at least one coil; and a touch screen that displays position information of another external electronic device and displays guide information so that transaction information can be transmitted/received between the another external electronic device and the MST module.

According to various embodiments, the touch screen may further display information related to a transaction state between the MST module and the another external electronic device.

According to various embodiments of the present disclosure, An electronic device may include: a housing; a conductive pattern that is arranged within the housing and is formed to generate a magnetic field; a plate that forms at least a part of a first surface of the housing and includes a material that at least partially transmits the magnetic field generated by the conductive pattern; and a control circuit that is configured to transmit at least one transaction information to an external device by using the conductive pattern. The conductive pattern may include: a first coil that includes a plurality of first turns that are substantially parallel to a surface of the plate; and a second coil that includes a plurality of second turns that are substantially parallel to the surface of the plate. When viewed from the upper side of the plate, the first coil and the second coil may not at least partially overlap with each other. For one transaction through the external device, the control circuit may be configured to provide a first signal and a second signal that include at least a part of the transaction information to the first coil and the second coil, respectively, for a selected period of time. The first signal and the second signal are provided sequentially or to be at least partially overlap with each other in time.

According to various embodiments, the first signal and the second signal may be substantially equal to each other.

According to various embodiments, the plurality of turns of the first coil may be wound in a first direction, and the plurality of turns of the second coil may be wound in a second direction that is opposite to the first direction.

According to various embodiments, the plurality of turns of the first coil may be arranged to occupy a wider area than the plurality of turns of the second coil.

According to various embodiments, for a first time interval, the first signal may be provided to the first coil and the second signal may not be provided to the second coil. For a second time interval, the first signal may not be provided to the first coil and the second signal may be provided to the second coil.

According to various embodiments, for a first time interval, a first current based on the first signal may be applied to the first coil such that the first current flows in a first direction, and a second coil based on the second signal may be applied to the second coil such that the second current flows in a second direction that is opposite to the first direction. For a second time interval, the first current may be applied to the first coil such that the first current flows in the first direction, and the second current may be applied to the second coil such that the second current flows in the first direction.

According to various embodiments, the control circuit may be configured to adjust a length of the first time interval or a length of the second time interval based on a selected condition.

According to various embodiments, the selected condition may include at least one of an orientation of the electronic device, a movement direction of the electronic device, and a user's gripping pattern of the electronic device.

According to various embodiments, the control circuit may further include a wireless charge module that is connected to one of the first coil and the second coil.

According to various embodiments, the control circuit may further include a near field communication (NFC) module that is connected to one of the first coil and the second coil, and at least one of the first coil and the second coil may be alternately connected to the wireless charge module and the NFC module.

According to various embodiments, at least a portion of the housing may include a conductive material, and at least one of the first coil and the second coil may be electrically connected to the portion of the housing that includes the conductive material.

According to various embodiments of the present disclosure, an electronic device may include: a plurality of coils that include a first coil and a second coil; a wireless charge module that is connected to the first coil; and a MST module that is connected to the second coil.

According to various embodiments, the MST module may be connected to the first coil.

According to various embodiments, the MST module may be set to transmit information related to a transaction through at least one of the first coil and the second coil.

According to various embodiments, the at least one of the first coil and the second coil may be selected based on a distance between an external device that is to receive the information and the electronic device.

According to various embodiments, the MST module may be set to perform first transmission by using selected one of the first coil and the second coil and to perform second transmission by using the first coil and the second coil.

According to various embodiments, the MST module may be set to perform the second transmission based on whether a response to the first transmission is received or based on a content of the response.

According to various embodiments, the MST module may be set to refrain from a connection with the first coil when a signal, which is received from another external electronic device through at least one of the first coil and the second coil, satisfies a designated condition.

According to various embodiments, at least one of the first coil and the second coil may include at least a part of a conductive bezel that at least partially encloses the electronic device.

According to various embodiments, an electronic device may include: a plurality of coils; a MST module connected to the plurality of coils; and a touch screen that displays position information of another external electronic device through the plurality of coils, and displays guide information so that transaction information can be transmitted/received between the another external electronic device and the MST module.

According to various embodiments, the touch screen may further display information related to a transaction state between the MST module and the another external electronic device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal apparatus comprising:
a display disposed at a first side of the mobile terminal apparatus;
a cover disposed at a second side of the mobile terminal apparatus opposite the first side;
a battery disposed between the display and the cover;
a printed circuit board (PCB) disposed between the battery and the cover;
a first coil disposed at the PCB, the first coil including a plurality of turns of a first conductive line for performing a magnetic secure transmission (MST) function;
a second coil disposed at the PCB, the second coil including a plurality of turns of a second conductive line for performing a near field communication (NFC) function;
a third coil disposed at the PCB, the third coil including a plurality of turns of a third conductive line for performing a wireless charging function, wherein, when viewed from a direction perpendicular to and facing the PCB, the plurality of turns of the first conductive line of the first coil are arranged outside of the plurality of turns of the third conductive line of the third coil; and
a communication circuit configured to transmit, via the first coil, a magnetic signal corresponding to information of a payment card to a card reader.

2. The mobile terminal apparatus of claim 1, wherein the PCB is a multi-layer PCB with each of the first coil, the second coil and the third coil being at least in part respectively disposed at a different layer of the multi-layer PCB.

3. The mobile terminal apparatus of claim 1,
wherein the first coil includes a first section and a second section,
wherein a same number of turn portions of the first conductive line are arranged in each of the first section and the second section, and
wherein turn portions of the first conductive line in the first section are distributed in a greater surface area than turn portions of the first conductive line in the second section.

4. The mobile terminal apparatus of claim 1, wherein at least a portion of the first coil overlaps at least a portion of the second coil.

5. The mobile terminal apparatus of claim 1, wherein each of the first coil, the second coil and the third coil are a substantially flat coil.

6. The mobile terminal apparatus of claim 1, wherein the first coil is asymmetrical.

7. The mobile terminal apparatus of claim 1, further comprising:
a processor operatively coupled to:
the first coil for performing the MST function,
the second coil for performing the NFC function, and
the third coil for performing the wireless charging function.

8. The mobile terminal apparatus of claim 1, wherein the PCB is a flexible PCB.

9. The mobile terminal apparatus of claim 1, wherein the PCB is asymmetrical.

10. The mobile terminal apparatus of claim 1, wherein the third coil comprises substantially uniform gaps between adjacent turns of the third conductive line.

11. A mobile terminal apparatus comprising:
a display disposed at a first side of the mobile terminal apparatus;
a cover disposed at a second side of the mobile terminal apparatus opposite the first side;
a battery disposed between the display and the cover;
a printed circuit board (PCB) disposed between the battery and the cover, the PCB comprising:
a first coil including a plurality of turns of a first conductive line for performing a magnetic secure transmission (MST) function, a second coil including a plurality of turns of a second conductive line for performing a near field communication (NFC) function, and a third coil including a plurality of turns of a third conductive line for performing a wireless charging function, wherein, when viewed from a direction perpendicular to and facing the PCB, the plurality of turns of the first conductive line of the first coil are arranged outside of the plurality of turns of the third conductive line of the third coil; and a communication circuit configured to transmit, via the first coil, a magnetic signal corresponding to information of a payment card to a card reader.

12. The mobile terminal apparatus of claim 11, wherein the PCB is a multi-layer PCB with each of the first coil, the second coil and the third coil being at least in part respectively disposed at a different layer of the multi-layer PCB.

13. The mobile terminal apparatus of claim 11,
wherein the first coil includes a first section and a second section,
wherein a same number of turn portions of the first conductive line are arranged in each of the first section and the second section, and
wherein turn portions of the first conductive line in the first section are distributed in a greater surface area than turn portions of the first conductive line in the second section.

14. The mobile terminal apparatus of claim 11, wherein at least a portion of the first coil overlaps at least a portion of the second coil.

15. The mobile terminal apparatus of claim 11, wherein each of the first coil, the second coil and the third coil are a substantially flat coil.

16. The mobile terminal apparatus of claim 11, wherein the first coil is asymmetrical.

17. The mobile terminal apparatus of claim 11, further comprising:

a processor operatively coupled to:

the first coil for performing the MST function, the second coil for performing the NFC function, and the third coil for performing the wireless charging function.

18. The mobile terminal apparatus of claim 11, wherein the PCB is a flexible PCB.

19. The mobile terminal apparatus of claim 11, wherein the PCB is asymmetrical.

20. The mobile terminal apparatus of claim 11, wherein the third coil comprises substantially uniform gaps between adjacent turns of the third conductive line.

* * * * *